(12) United States Patent
Johnson et al.

(10) Patent No.: US 11,447,402 B2
(45) Date of Patent: Sep. 20, 2022

(54) PROCESS FOR PRODUCTION OF SYNTHESIS GAS USING A COAXIAL FEED SYSTEM

(71) Applicant: Thermo Technologies, LLC, Centennial, CO (US)

(72) Inventors: Dennis E. J. Johnson, Colorado Springs, CO (US); Grigori A. Abramov, Littleton, CO (US); Richard A. Kleinke, Commerce City, CO (US); Marcus A. Wiley, Highlands Ranch, CO (US)

(73) Assignee: Thermo Technologies, LLC, Centennial, CO (US)

( * ) Notice: Subject to any disclaimer, the term of this patent is extended or adjusted under 35 U.S.C. 154(b) by 171 days.

(21) Appl. No.: 16/700,962

(22) Filed: Dec. 2, 2019

(65) Prior Publication Data

US 2020/0102230 A1 Apr. 2, 2020

Related U.S. Application Data

(63) Continuation of application No. 13/335,683, filed on Dec. 22, 2011, now Pat. No. 10,519,047, which is a
(Continued)

(51) Int. Cl.
*C02F 1/32* (2006.01)
*C10K 1/10* (2006.01)
(Continued)

(52) U.S. Cl.
CPC .................. *C02F 1/32* (2013.01); *C10B 1/10* (2013.01); *C10J 3/66* (2013.01); *C10K 1/101* (2013.01);
(Continued)

(58) Field of Classification Search
CPC .... C10J 2200/09; C10J 3/30; C10J 2200/154; C10B 31/06; C10B 31/02; C10B 31/00
See application file for complete search history.

(56) References Cited

U.S. PATENT DOCUMENTS

| 2,646,391 A | 7/1953 | Jules |
| 3,765,872 A | 10/1973 | Celada et al. |

(Continued)

FOREIGN PATENT DOCUMENTS

| AU | 2007238126 | 8/2013 |
| BR | PI0711548-2 A2 | 3/2012 |

(Continued)

OTHER PUBLICATIONS

U.S. Appl. No. 13/841,559, filed Mar. 15, 2013, titled: Gasifier Drive System Methods and Apparatus. First Named Inventor: Dennis EJ Johnson. Non-Final Rejection dated Feb. 10, 2017. 8 pages.

(Continued)

*Primary Examiner* — Imran Akram
(74) *Attorney, Agent, or Firm* — Santangelo Law Offices, P.C.

(57) ABSTRACT

Methods and apparatus may permit the generation of consistent output synthesis gas from highly variable input feedstock solids carbonaceous materials. A stoichiometric objectivistic chemic environment may be established to stoichiometrically control carbon content in a solid carbonaceous materials gasifier system. Processing of carbonaceous materials may include dominative pyrolytic decomposition and multiple coil carbonaceous reformation. Dynamically adjustable process determinative parameters may be utilized to refine processing, including process utilization of negatively electrostatically enhanced water species, process utilization of flue gas, and adjustment of process flow rate characteristics. Recycling may be
(Continued)

employed for internal reuse of process materials, including recycled negatively electrostatically enhanced water species, recycled flue gas, and recycled contaminants. Synthesis gas generation may involve predetermining a desired synthesis gas for output and creating high yields of such a predetermined desired synthesis gas.

12 Claims, 25 Drawing Sheets

Related U.S. Application Data continuation of application No. 13/110,784, filed on May 18, 2011, now Pat. No. 8,197,698, which is a continuation of application No. 12/246,395, filed on Oct. 6, 2008, now Pat. No. 7,968,006, which is a continuation of application No. PCT/US2007/066466, filed on Apr. 11, 2007, which is a continuation of application No. 12/296,202, filed as application No. PCT/US2007/066466 on Apr. 11, 2007, now Pat. No. 7,857,995.

(60) Provisional application No. 60/791,401, filed on Apr. 11, 2006.

(51) Int. Cl.
*C10J 3/66* (2006.01)
*C10B 1/10* (2006.01)

(52) U.S. Cl.
CPC .. *C10J 2300/0903* (2013.01); *C10J 2300/093* (2013.01); *C10J 2300/0916* (2013.01); *C10J 2300/0943* (2013.01); *C10J 2300/0946* (2013.01); *Y02E 50/30* (2013.01); *Y02P 20/145* (2015.11)

(56) References Cited

U.S. PATENT DOCUMENTS

| | | |
|---|---|---|
| 3,847,562 A | 11/1974 | Hamilton |
| 3,966,634 A | 6/1976 | Sacks |
| 4,007,129 A | 2/1977 | Naber et al. |
| 4,026,679 A | 5/1977 | Collin |
| 4,070,160 A | 1/1978 | Cottle |
| 4,090,622 A | 5/1978 | Smith et al. |
| 4,101,412 A * | 7/1978 | Choi ............... C10B 49/12 201/12 |
| 4,137,051 A | 1/1979 | Godwin |
| 4,166,830 A | 9/1979 | Guth et al. |
| 4,191,700 A | 3/1980 | Lebowitz et al. |
| 4,211,669 A | 7/1980 | Eakman |
| 4,220,454 A | 9/1980 | Ban et al. |
| 4,235,676 A | 11/1980 | Chambers |
| 4,260,456 A | 4/1981 | Schulman |
| 4,274,839 A | 6/1981 | Leas |
| 4,278,445 A | 7/1981 | Stickler et al. |
| 4,278,446 A | 7/1981 | Von Rosenberg et al. |
| 4,386,940 A | 6/1983 | Sacks et al. |
| 4,387,652 A * | 6/1983 | Cooke ............... B29B 17/04 110/224 |
| 4,435,374 A | 3/1984 | Helm, Jr. |
| 4,497,637 A | 2/1985 | Purdy et al. |
| 4,536,278 A | 8/1985 | Tatterson |
| 4,578,175 A | 3/1986 | Gorin |
| 4,583,992 A | 4/1986 | Rogers |
| 4,592,762 A | 6/1986 | Babu et al. |
| 4,659,340 A | 4/1987 | Weaver |
| 4,690,690 A | 9/1987 | Andrew et al. |
| 4,699,632 A | 10/1987 | Babu et al. |
| 4,764,184 A | 8/1988 | Meyer |
| 4,852,303 A | 8/1989 | Rolek |
| 4,857,077 A | 8/1989 | Potter |
| 4,954,137 A | 9/1990 | Potter |
| 4,966,348 A | 10/1990 | Schneider |
| 5,145,491 A | 1/1992 | Sadowski |
| 5,104,419 A | 4/1992 | Funk |
| 5,143,647 A | 9/1992 | Say et al. |
| 5,152,975 A | 10/1992 | Fong et al. |
| 5,152,976 A | 10/1992 | Fong et al. |
| 5,154,836 A | 10/1992 | Clough |
| 5,186,740 A | 2/1993 | Sacinelli |
| 5,227,026 A | 7/1993 | Hogan |
| 5,228,850 A | 7/1993 | Hoetzl |
| 5,306,481 A | 4/1994 | Mansour et al. |
| 5,355,782 A | 10/1994 | Blanchard |
| 5,401,282 A | 3/1995 | Leininger et al. |
| 5,443,719 A | 8/1995 | Johnson et al. |
| 5,538,706 A | 7/1996 | Kapoor et al. |
| 5,597,479 A | 1/1997 | Johnson |
| 5,616,250 A | 4/1997 | Johnson et al. |
| 5,622,622 A | 4/1997 | Johnson |
| 5,635,059 A | 6/1997 | Johnson |
| 5,685,994 A | 11/1997 | Johnson |
| 5,749,722 A | 5/1998 | Driscoll et al. |
| 5,792,369 A | 8/1998 | Johnson |
| 5,820,747 A * | 10/1998 | Lenglet ............... C10G 9/16 208/130 |
| 5,957,066 A * | 9/1999 | Nagato ............... F23C 10/20 110/245 |
| 6,024,032 A * | 2/2000 | Sharpe ............... C10B 31/06 110/109 |
| 6,174,507 B1 | 1/2001 | Wallace et al. |
| 6,476,084 B2 | 11/2002 | Whitney |
| 6,485,296 B1 | 11/2002 | Bender |
| 6,565,824 B1 | 5/2003 | Lightner |
| 6,664,302 B2 | 12/2003 | French et al. |
| 6,740,245 B2 | 5/2004 | Johnson |
| 6,790,383 B2 | 9/2004 | Kim |
| 6,808,543 B2 | 10/2004 | Paisley |
| 6,863,878 B2 | 3/2005 | Klepper |
| 6,923,901 B2 | 8/2005 | Leffler et al. |
| 6,960,234 B2 | 11/2005 | Hassett |
| 6,997,118 B2 | 2/2006 | Chandran et al. |
| 6,997,965 B2 | 2/2006 | Katayama |
| 7,638,070 B2 | 12/2009 | Johnson et al. |
| 7,670,586 B2 | 3/2010 | Wang et al. |
| 7,718,832 B1 | 5/2010 | Hurley et al. |
| 7,780,750 B2 | 8/2010 | Carman |
| 7,857,995 B2 | 12/2010 | Johnson et al. |
| 7,967,880 B2 | 6/2011 | Wunning |
| 7,968,006 B2 | 6/2011 | Johnson et al. |
| 8,017,040 B2 | 9/2011 | Johnson et al. |
| 8,017,041 B2 | 9/2011 | Johnson et al. |
| 8,021,557 B2 | 9/2011 | Johnson et al. |
| 8,021,577 B2 | 9/2011 | Johnson et al. |
| 8,361,384 B1 | 1/2013 | Kolstad |
| 8,574,405 B1 * | 11/2013 | Cheiky ............... C10B 47/12 202/96 |
| 9,068,121 B1 * | 6/2015 | Tharpe, Jr. ............... C10K 1/04 |
| 9,187,344 B2 | 11/2015 | Kolstad |
| 9,321,665 B2 | 4/2016 | Kolstad |
| 9,617,177 B2 | 4/2017 | Kolstad |
| 10,519,047 B2 | 12/2019 | Johnson et al. |
| 2002/0046686 A1 | 4/2002 | Sunter |
| 2002/0113228 A1 | 8/2002 | Kim et al. |
| 2003/0008928 A1 | 1/2003 | Klepper |
| 2003/0034311 A1 | 3/2003 | Miller |
| 2003/0160004 A1 | 8/2003 | Martin |
| 2003/0160005 A1 | 8/2003 | Martin |
| 2004/0159269 A1 | 8/2004 | Williams |
| 2004/0170210 A1 | 9/2004 | Do |
| 2006/0283806 A1 | 12/2006 | Kojima et al. |
| 2007/0221582 A1 | 9/2007 | Holland et al. |
| 2007/0266914 A1 | 11/2007 | Graham |
| 2008/0209968 A1 | 9/2008 | Drew et al. |
| 2009/0119990 A1 | 5/2009 | Johnson et al. |
| 2009/0119992 A1 | 5/2009 | Johnson et al. |
| 2009/0119994 A1 | 5/2009 | Johnson et al. |
| 2009/0126276 A1 | 5/2009 | Johnson et al. |
| 2010/0175320 A1 | 7/2010 | Schuetzle et al. |

(56) References Cited

U.S. PATENT DOCUMENTS

| | | |
|---|---|---|
| 2010/0319255 A1 | 12/2010 | Struble et al. |
| 2011/0220584 A1 | 9/2011 | Johnson et al. |
| 2012/0000761 A1 | 1/2012 | Brohnstein et al. |
| 2012/0003594 A1 | 1/2012 | Faussone |
| 2012/0096768 A1 | 4/2012 | Johnson et al. |
| 2012/0125758 A1 | 5/2012 | Hoetzl |
| 2014/0048719 A1 | 2/2014 | Johnson et al. |

FOREIGN PATENT DOCUMENTS

| | | |
|---|---|---|
| CA | 2683237 | 8/2016 |
| CN | 101466634 A | 6/2009 |
| CO | 6141474 A2 | 3/2010 |
| DE | 10103602 A1 | 8/2002 |
| HK | 1131961 A1 | 9/2015 |
| KR | 20140010179 A | 1/2014 |
| KR | 20090030255 A | 9/2015 |
| MX | 2008013049 A | 2/2009 |
| WO | 2003070629 | 8/2003 |
| WO | 2005/095551 | 10/2005 |
| WO | 2005095551 | 10/2005 |
| WO | 2007121268 A2 | 10/2007 |
| WO | 2010148233 | 12/2010 |
| WO | 2010148241 | 12/2010 |
| WO | 2010148242 A1 | 12/2010 |
| ZA | 200809580 B | 12/2009 |

OTHER PUBLICATIONS

U.S. Appl. No. 13/841,559, filed Mar. 15, 2013, titled: Gasifier Drive System Methods and Apparatus. First Named Inventor: Dennis EJ Johnson. Final Rejection dated Dec. 21, 2015. 8 pages.
U.S. Appl. No. 13/841,559, filed Mar. 15, 2013, titled: Gasifier Drive System Methods and Apparatus. First Named Inventor: Dennis EJ Johnson. Non-Final Rejection dated May 21, 2015. 7 pages.
U.S. Appl. No. 13/841,559, filed Mar. 15, 2013, titled: Gasifier Drive System Methods and Apparatus. First Named Inventor: Dennis EJ Johnson. Final Rejection dated Oct. 28, 2014. 7 pages.
U.S. Appl. No. 13/841,559, filed Mar. 15, 2013, titled: Gasifier Drive System Methods and Apparatus. First Named Inventor: Dennis EJ Johnson. Non-Final Rejection dated Apr. 4, 2014. 7 pages.
U.S. Appl. No. 13/841,559, filed Mar. 15, 2013, titled: Gasifier Drive System Methods and Apparatus. First Named Inventor: Dennis EJ Johnson. Restriction Requirement dated Sep. 13, 2013. 7 pages.
U.S. Appl. No. 14/056,854, filed Oct. 17, 2013, titled: Water Treatment Methods and Apparatus. First Named Inventor: Dennis EJ Johnson. Restriction Requirement dated Nov. 28, 2016. 7 pages.
Parallel Australian Application No. 2007238126, Notice of Acceptance dated Aug. 2, 2013. 3 pages.
Parallel South African Application No. 2008-09580, Notice of Acceptance dated Oct. 22, 2009. 1 page.
Parallel European Application No. 07760514.5, Communication Pursuant to Article 34(3) EPC, dated May 23, 2016. 6 pages.
Parallel Australian Application No. 2007238126, Examiner's First Report dated Nov. 28, 2011. 4 pages.
Parallel Australian Application No. 2007238126, Patent Examination Report 2, dated Jan. 22, 2013, 4 pages.
Parallel Canadian Application No. 2683237, Notice of Allowance dated Nov. 13, 2015, 1 page.
Parallel Canadian Application No. 2683237, Office Action dated Feb. 19, 2015, 3 pages.
Parallel Canadian Application No. 2683237, Office Action dated Jun. 25, 2013, 2 pages.
Parallel U.S. Appl. No. 12/246,437; Notice of Allowance dated Jun. 28, 2011.
Parallel U.S. Appl. No. 12/246,464; Notice of Allowance dated Jul. 12, 2011.
Parallel U.S. Appl. No. 12/246,483; Notice of Allowance dated Jul. 14, 2011.
"Coal Energy Systems;" Penn State Energy Institute; Bruce G. Miller; Elsevier Academic Press, Boston, US, 2005.
"Combustion and Gasification of Coal;" Department of Fuel & Energy; University of Leeds, UK; A. Williams, M. Pourkashanian, J.M. Jones; Taylor & Francis, NY, US, 2000.
"Singlet Molecular Oxygen;" Wayne State University; A. Paul Schaap; Dowden, Hutchinson & Ross, Inc.; PA, US, 1976.
'Biomass Gasification Overview;' White Paper, National Renewable Energy Laboratory; Golden, CO; Richard L. Bain; Jan. 2004.
"Superoxide Chemistry;" McGraw-Hill Encyclopedia Science & Technology; 7th Edition; pp. 667-668.
U.S. Appl. No. 60/791,401, filed Apr. 11, 2006, Entitled: Select synthesis gas generation apparatus and method.
PCT International Search Report for PCT/US07/66466; dated May 8, 2008.
PCT Written Opinion of the International Searching Authority for PCT/US07/66466; dated May 8, 2008.
Examiner Interview Summary Record for PCT/US07/66466 by Examiner Langel; dated Jul. 30, 2008.
International Preliminary Report on Patentability for PCT/US07/66466; Completed Sep. 24, 2008.
Parallel U.S. Appl. No. 12/296,202; Interview Summary dated Mar. 11, 2010.
Parallel U.S. Appl. No. 12/296,202; Nonfinal Office Action dated Apr. 14, 2010.
Parallel U.S. Appl. No. 12/296,202; Interview Summary dated Jun. 24, 2010.
Parallel U.S. Appl. No. 12/246,437; Office Action dated Jan. 12, 2011.
Parallel U.S. Appl. No. 12/246,464; Office Action dated Jan. 14, 2011.
Parallel U.S. Appl. No. 12/246,483; Office Action dated Jan. 13, 2011.
Researchers Discover Use for Carbon Dioxide in Conversion of Biomass Into Biofuel; http://www.physorg.com/print177179481.html (1 of 2) Nov. 17, 2009.
Martin, F.J., et al., Green-Freedom (TM) A Concept for Producing Carbon-Neutral Synthetic Fuels and Chemicals, Los Alamos National Laboratory, Nov. 2007.
Parallel U.S. Appl. No. 12/246,337; Issue Notification dated Dec. 9, 2009.
Parallel U.S. Appl. No. 12/246,337; Notice of Allowance and Fees due dated Sep. 25, 2009.
Parallel U.S. Appl. No. 12/246,337; Examiner Initiated Interview Summary dated Sep. 22, 2009.
Parallel U.S. Appl. No. 12/246,337; Interview Summary dated Aug. 26, 2009.
Parallel U.S. Appl. No. 12/246,337; Office Action dated Apr. 13, 2009.
Parallel U.S. Appl. No. 12/246,337; Interview Summary dated Mar. 20, 2009.
Parallel U.S. Appl. No. 12/296,202; Notice of Allowance dated Nov. 15, 2010.
Parallel U.S. Appl. No. 12/246,464; Examiner's Interview Summary dated Dec. 16, 2010.
Parallel CN Application No. 200780021109.1; Office Action dated Nov. 16, 2010.
Parallel U.S. Appl. No. 12/246,483; Interview Summary dated Feb. 18, 2011.
Parallel U.S. Appl. No. 12/246,464; Interview Summary dated Feb. 18, 2011.
Parallel U.S. Appl. No. 12/246,437; Interview Summary dated Feb. 18, 2011.
European Patent Application No. 07760514.5. Communication Pursuant to Article 94(3) EPC, dated Nov. 11, 2019. 7 pages.
European Patent Application No. 07760514.5. Communication Pursuant to Article 94(3) EPC, dated Apr. 30, 2020. 7 pages.

* cited by examiner

PROCESS FOR PRODUCTION OF SYNTHESIS GAS USING A COAXIAL FEED SYSTEM

This Application is a continuation of, and claims benefit of and priority to, U.S. patent application Ser. No. 13/335,683, filed Dec. 22, 2011 (published as Publication No. US 2012/0096768 A1 on Apr. 26, 2012), which is a continuation of, and claims benefit of and priority to, U.S. patent application Ser. No. 13/110,784, filed May 18, 2011 (published as Publication No. US 2011/0220584 A1 on Sep. 15, 2011 and issued on Jun. 12, 2012 as U.S. Pat. No. 8,197,698), which is a continuation of, and claims benefit of and priority to, U.S. patent application Ser. No. 12/246,395, filed Oct. 6, 2008 (published as Publication No. US 2009/0126270 A1 on May 21, 2009 and issued on Jun. 28, 2011 as U.S. Pat. No. 7,968,006), which itself is: (a) a continuation of International Patent Application No. PCT/US2007/066466, filed Apr. 11, 2007 (published as Publication No. WO 2007/121268 on Oct. 25, 2007), which claims priority to and the benefit of U.S. Provisional Application No. 60/791,401, filed Apr. 11, 2006; and (b) a continuation of U.S. patent application Ser. No. 12/296,202, filed Oct. 6, 2008 (published as Publication No. US 2009/0126276 A1 on May 21, 2009 and issued on Dec. 28, 2010 as U.S. Pat. No. 7,857,995), which itself is the National Stage of International Patent Application No. PCT/US2007/066466, filed Apr. 11, 2007 (published as Publication No. WO 2007/121268 on Oct. 25, 2007), said International Patent Application claiming priority to and the benefit of U.S. Provisional Application No. 60/791,401, filed Apr. 11, 2006, each said application hereby incorporated herein by reference in its entirety.

TECHNICAL FIELD

The inventive technology described herein relates to gasifier systems utilizing solid carbonaceous materials to generate synthesis gases. More specifically, such gasifier systems may be configured to utilize one or more of a variety of process control parameters, perhaps singly or in combinations, to achieve high degrees of efficiency and control in such synthesis gas generation. The inventive technology may be particularly suited to receive a great variety of solid carbonaceous materials as feedstock for the gasifier system and to generate synthesis gases of variable types suitable for a great variety of subsequent applications.

BACKGROUND

Pyrolysis, or controlled heating of feedstock in the absence of oxygen, resulting in thermal decomposition of the feedstock fuel into volatile gases and solid carbon material by-product, was first practiced on a commercial scale in 1812, when a city gas company in London started the production of town gas applications.

The first commercial gasifier (updraft type) for continuous gasification of solid fuels, representing an air-blown process, was installed in 1839 producing what is known as "producer gas" combustion type gasifiers. They were further developed for different input fuel feedstocks and were in widespread use in specific industrial power and heat applications throughout the late 1800's and into the mid-1920's, when petroleum fueled systems gradually took over the producer gas fuel markets.

Between 1920 and 1940, small and compact gasifier systems for automotive applications were developed in Europe. During the Second World War, perhaps tens of thousands of these combustion type gasifiers were used in Europe and across other scattered market applications. Shortly after the War most gasifiers were decommissioned because of widespread availability of commercial gasoline and diesel fuels.

Gasification emphasis again came to the forefront due to the energy crisis of the 1970's. Gasifier technology was perceived as a relatively cheap alternative for small-scale industrial and utility power generation, especially when sufficient sustainable biomass resources were available. By the beginning of the 1980's nearly a dozen (mainly European) manufacturers were offering small-scale wood and charcoal fired "steam generation" power plants.

In Western countries, coal gasification systems began to experience expanded interest during the 1980's as an alternative for the utilization of natural gas and oil as the base energy resource. Technology development perhaps mainly evolved as fluidized bed gasification systems for coal, but also for the gasification of biomass. Over the last 15 years, there may have been much development of gasification systems as directed toward the production of electricity and generation of heat in advanced gas turbine based co-generation units.

Gasification of biomass perhaps can appear deceptively simple in principle and many types of gasifiers have been developed. The production of combustible syn-gas from biomass input fuel may have attractive potential benefits perhaps such as ridding the environment of noxious waste disposal problems, possible ease of handling, and perhaps providing alternative energy production with possibly the release of low levels of atmospheric environmental contaminants. Further, cheap electricity generation and the application of the produced syn-gas as an economical energy source for the manufacture of liquid fuels may also often make gasification very appealing.

However, the biomass input feedstock which is used in gasifiers may challenge perceptions of uncomplicated design simplicity since the feedstock material may represent varying chemical characteristic and physical properties, perhaps as inherent and unique to each individual biomass feedstock material. The chemical reactions involved in gasification, relative to processing the different varieties of available biomass materials, may involve many different reactants and many possible reaction pathways. The reaction rates are often relatively high; all these variable factors may contribute to the perhaps very complex and complicating nature of gasification processes. All too often uncontrollable variables may exist that may make gasifiers hard to mass balance control and perhaps to operate satisfactorily within known preventive maintenance procedures, steady-state output constants, and manageable environmental control compliance areas.

Numerous U.S. patents have been issued relating to alternative or renewable energy technology descriptions involving gasification or syn-gas technologies. The present inventive technology perhaps may overcome many of the operational disadvantages associated with and perhaps commonplace to current and commercially viable processes involving existing gasification systems. The various types of available market updraft, downdraft, air-blown, fixed bed, fluidized bed, circulating fluidized bed, pulsed-bed, encapsulated entrained flow, and other gasification systems may often have one or more serious disadvantages that perhaps may be overcome by the present inventive technology.

In conventional gasification systems, disadvantages often may exist that may create problems in perhaps a variety of areas, including but not limited to areas such as: process control stability related to input feedstock changes, steady state loading, blockage and overall system throughput limitations; slagging potential and challenges; scale-up sizing challenges; moisture limitations; system gas and internal vapor leak challenges; carry-through impurities and contamination challenges, system plugging challenges (such as with excess char, tars or phenols); problems with generated hydrocarbon volatiles and other corrosive sulfur vapor carry-through contaminants being released into produced synthesis gas; decreased BTU energy values in final produced synthesis gas (such as due to excess $CO_2$, $N_2$, or particulate contamination); and the like.

For example, conventional gasification systems may use horizontal-plane screw for moving feedstock material, at controlled throughput feed rates, into other competitive gasification thermal reactor systems and also for simultaneously utilizing the enclosed auger pipe housing (often using more than one auger system in a one-to-the-other configuration) as an enclosed temperature stage initial devolatilization zone. However, these combined double-duty auger system designs may often be plagued with numerous and sporadic mechanical, unpredictable and uncontrollable process (negative) variables. Such variables can be considered as centering around problems associated with input feed solids that can often rope/lock disproportionally together or that can otherwise cause plugging or binding of the auger shaft, helical flights and/or blind the auger close tolerance receiver pipe cylinder openings. This can in-turn warp the auger drive shaft into a bent and/or an elliptical configuration. Auger shaft warpage can cause a high side rotational internal friction wear and can rapidly create stress cracks in an auger-pipe cylinder housing unit. This can cause constant process pressure variation and can cause vapor leaks. Excess friction drag can also break shafts. Further, intermittent carbonaceous material bulk jams can occur whereby the throughput devolatilization reactivity can be either lost or slowed. Feedstock decomposition and devolatilization reactions can also begin to occur at the surface of the plug/jam, therefore releasing, and perhaps slowly devolatilizing, char solids, phenols, tars, surfactants and other surface chemical hydrocarbon constituents that can further liquefy and wax or seal the outer bulk-mass surface of the plug materials into an even tighter and more cementaceous plug. Incoming feedstock "plug mass" can quickly fill into and blind the relatively small cross-section diameter surface area narrower openings within typical auger screw pipe cylinder housings. This can also begin to close off the auger screw conduit that also serves as an initial devolatilization chamber.

The foregoing problems regarding conventional technologies may represent a long-felt need for an effective solution to the same. While implementing elements may have been available, actual attempts to meet this need to the degree now accomplished may have been lacking to some degree. This may have been due to a failure of those having ordinary skill in the art to fully appreciate or understand the nature of the problems and challenges involved. As a result of this lack of understanding, attempts to meet these long-felt needs may have failed to effectively solve one or more of the problems or challenges here identified. These attempts may even have led away from the technical directions taken by the present inventive technology and may even result in the achievements of the present inventive technology being considered to some degree an unexpected result of the approach taken by some in the field.

SUMMARY DISCLOSURE OF INVENTION

The inventive technology relates to methods and apparatus for solid carbonaceous materials synthesis gas generation and embodiments may include the following features: techniques for affirmatively establishing a stoichiometric objectivistic chemic environment in a solid carbonaceous materials gasifier system; techniques for stoichiometrically controlling carbon content in a solid carbonaceous materials gasifier system; techniques for multiple coil carbonaceous reformation in a solid carbonaceous materials gasifier system; techniques for utilizing negatively electrostatically enhanced water species in a solid carbonaceous materials gasifier system; techniques for recycling materials within a solid carbonaceous materials gasifier system; techniques for dominative pyrolytic decomposition of carbonaceous materials within a solid carbonaceous materials gasifier system; techniques for solubilizing contaminants in a solid carbonaceous materials gasifier system; techniques for recycling solubilized contaminants within a solid carbonaceous materials gasifier system; techniques for creating a high energy content select product gas from a solid carbonaceous materials gasifier system; techniques for dynamically adjusting process determinative parameters within a solid carbonaceous materials gasifier system; techniques for predetermining a desired select product gas for output from a solid carbonaceous materials gasifier system; techniques for high yield output of a select product gas from a solid carbonaceous materials gasifier system; techniques for magnetic isolation of feedstock solids carbonaceous materials constituent components in a solid carbonaceous materials gasifier system; techniques for displacing oxygen from feedstock solids carbonaceous materials in a solid carbonaceous materials gasifier system; techniques for adjusting process flow rates within a solid carbonaceous materials gasifier system; and techniques for flue gas and/or product gas generation and recycling within a solid carbonaceous materials gasifier system. Accordingly, the objects of the methods and apparatus for solid carbonaceous materials synthesis gas generation described herein address each of the foregoing in a practical manner. Naturally, further objects of the inventive technology will become apparent from the description and drawings below.

MODES FOR CARRYING OUT THE INVENTION

Figure 1:
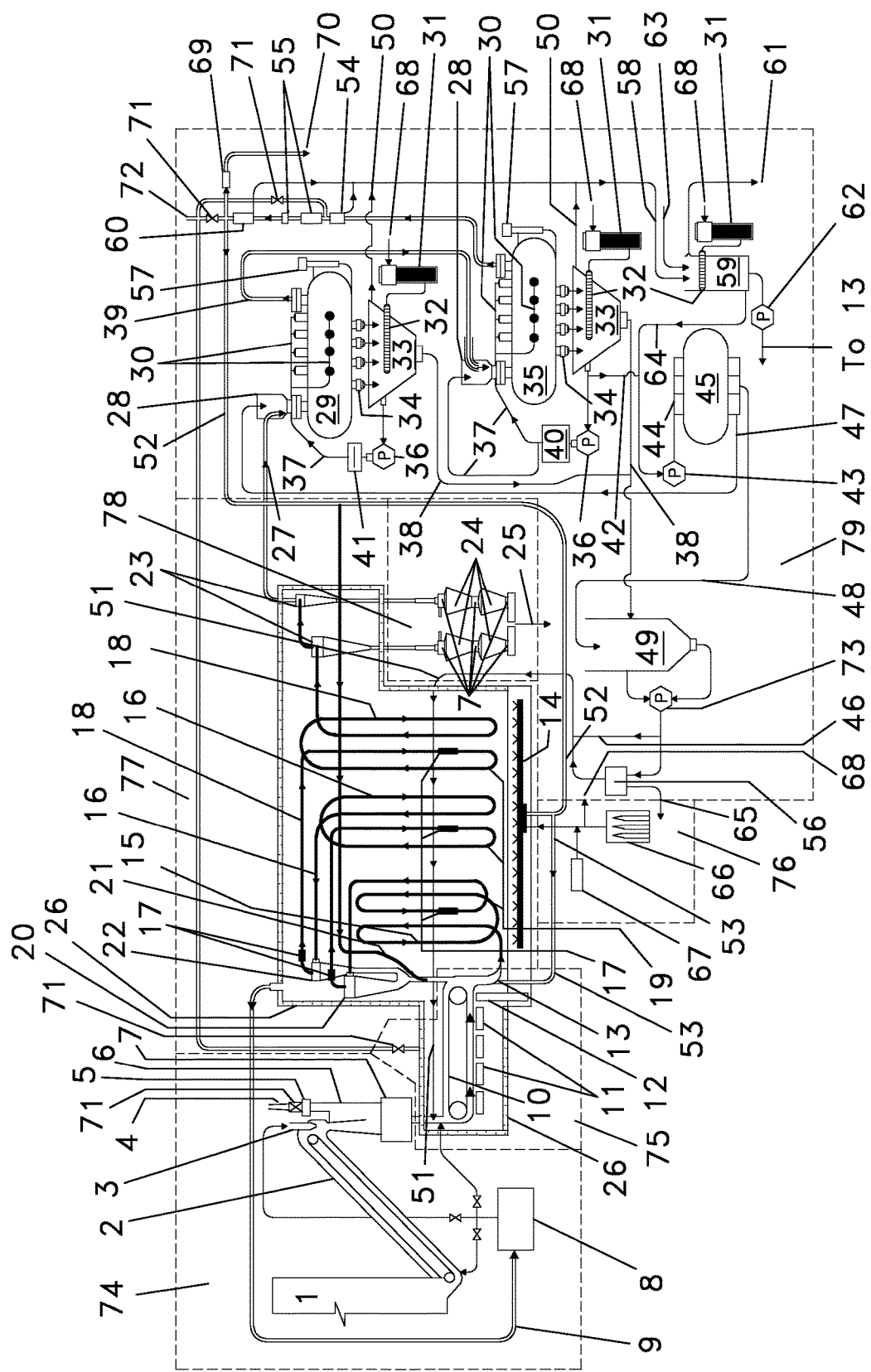
FIG. 1 is a conceptual view of a gasifier process flow path with delimited functional areas in one embodiment.

The present inventive technology includes a variety of aspects, which may be combined in different ways. The following descriptions are provided to list elements and describe some of the embodiments of the present inventive technology. These elements are listed with initial embodiments, however it should be understood that they may be combined in any manner and in any number to create additional embodiments. The variously described examples and preferred embodiments should not be construed to limit the present inventive technology to only the explicitly described systems, techniques, and applications. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application. As International Patent Application No. PCT/US2007/066466 in incorporated herein in its entirety, including all claims filed therein, such claims form part of this disclosure. In particular, such claims describe a variety of features, steps, conditions, etc. that may be combined in any arrangement with the claims that appear explicitly at the end of this specification.

A solid carbonaceous materials gasifier system in various embodiments perhaps may be configured to modular sections. Embodiments may involve a system having functional areas (FIGS. 1; 4) perhaps such as:

a pretreatment area (74), perhaps to include bulk handling of input feedstock solid carbonaceous material, displacement at least some oxygen content from the feedstock solid carbonaceous material, and perhaps other preparation handling for subsequent processing of the feedstock solid carbonaceous material;

a pyrolytic decomposition area (75), perhaps to include varying a retention time of feedstock solid carbonaceous material in a temperature varied environment, as in perhaps a pyrolysis chamber;

a carbonaceous materials reformation area (77), perhaps to include carbonaceous reformation of pyrolytically decomposed carbonaceous materials, such as in a multiple coil reformation vessel or perhaps even in a helically nested configuration of reformation coils in a multiple coil reformation vessel;

an ash removal area (78), perhaps to include ash removal such as by downdraft cool-down and pulse-evacuation containment;

a scrubber area (79), perhaps to include removal of contaminants from a generated select product gas, such as by combined chill and spray of a negative electrostatically enhanced water species and even polarized media polish filtration;

an auxiliary treatment area (76), perhaps to include select product gas preparation for gasifier embodiment combustion heating, such as with oxygen enrichment and reduction of nitrogen content, perhaps utilizing an air separation unit.

Of course, these areas merely exemplify one possible modular configuration for a solid carbonaceous materials gasifier system to illustrate the concept of modularity in perhaps one embodiment, and should not be regarded as limiting the possible modular configurations of such a gasifier system, the distribution of various gasification functions within modular sections of a gasifier system, or indeed even to limit the inventive technology to modular embodiments, consistent with the inventive principles discussed herein.

The inventive technology may involve processes for carbon conversion that perhaps may be categorized as gasification. Carbon conversion may involve the conversion of carbon content in a feedstock solids carbonaceous material, perhaps including a majority or possibly even substantially all of such carbon content, into select product gas components or even a select product gas. In embodiments, such processes may include thermal processes, perhaps including elevated temperatures in reducing conditions or with little or no free oxygen present, to produce a select product gas, such as a permanent and combustible synthesis gas. Such a select product gas often may include predominantly CO and $H_2$, with some $CH_4$ volume output, though the process control parameters may allow significant control over the make-up of a produced select product gas in particular applications. The process also may involve minor by-products of various types, perhaps such as char ash, condensable inorganics and organics, or trace hydrocarbons.

In some embodiments, a solid carbonaceous materials gasifier system may be initially started with an auxiliary fuel, such as an external source of propane, as may be supplied to a gasifier system process enclosure, for example such as to a box furnace enclosure (26) (FIGS. 1; 2; 13) at a combustive burner (14) (FIGS. 1; 2). This may be used, for example, perhaps until the reformation coils (19) (FIGS. 1; 2; 3; 4) of a multiple coil reformation vessel reach a suitable operational temperature, for example perhaps about 1600° F. to 1800° F. In some embodiments, this may take approximately 24 hours. At this point some embodiments may be capable of producing a select product gas whereby a fractional portion may be returned to the combustive burner to sustain combustion and maintain a desired process operational temperature. In this manner, the system perhaps may become self-sustaining and auxiliary fuel support may be shut off, perhaps with input delivery of feedstock solids carbonaceous materials for processing to be started or continued into the gasifier system.

A solid carbonaceous materials gasifier system in various embodiments may include a gasifier process flow path originating at a feedstock solids carbonaceous materials input and routed through the solid carbonaceous materials process gasifier system. A process flow path may provide a path by which solid carbonaceous materials input into the gasifier system may be routed to various processing areas of the gasifier system, perhaps ultimately for output of a select product gas at a terminus of the gasifier process flow path. Moreover, such a gasifier system perhaps may be characterized as capable of receiving solid carbonaceous materials at the input of the gasifier process flow path, which carbonaceous materials may be solid in nature, perhaps as distinguished from fluidized bed and updraft or downdraft gasifiers which often utilize liquid feedstocks, slurried feedstocks, or other feedstock having substantially non-solidified compositions. For example, such solid carbonaceous material in some embodiments may include solid carbonaceous particles milled to a size appropriate for throughput through the gasifier system's process flow path, such as perhaps to less than about 2 cubic inches in particle size. Moreover, the dynamic adjustability of various process control parameters may permit the gasifier system to accept a great variety of solid carbonaceous materials for input, with the dynamic adjustability of the gasifier system compensating for variations in the input make-up to permit consistent output of desired select product gas. For example, solid carbonaceous materials suitable for input may include, but of course are not limited to, varied carbon content, varied oxygen content, varied hydrogen content, varied water content, varied particle sizes, varied hardness, varied density, and the like, perhaps such as including varied wood waste content, varied municipal solid waste content, varied garbage content, varied sewage solids content, varied manure content, varied biomass content, varied rubber content, varied coal content, varied petroleum coke content, varied food waste content, varied agricultural waste content, and the like.

A solid carbonaceous materials gasifier system in various embodiments may be configured to process feedstock solids carbonaceous materials in a variety of manners. Processing may involve perhaps simply treating a carbonaceous material in some capacity. For example, processing in various embodiments may include pretreating a feedstock solids carbonaceous material within a pretreatment area, pyrolytically decomposing in a pyrolysis chamber, carbonaceously reforming in a multiple coil carbonaceous reformation vessel, preliminarily carbonaceously reforming in a preliminary carbonaceous reformation coil, secondarily carbonaceously reforming in a secondary carbonaceous reformation coil, tertiarily carbonaceously reforming in a tertiary carbonaceous reformation coil, vaporizing a carbonaceous material including perhaps vaporizing hydrocarbons or perhaps vaporizing select product gas components, processing with a negatively electrostatically enhanced water species, processing with negatively electrostatically enhanced steam, processing with a flue gas, processing with a pressurized flue gas, processing with a preheated flue gas, processing with a scrubber recycled tar, processing with a scrubber recycled phenol, processing with a scrubber recycled solid, processing with a select product gas, processing with a wet select product gas, processing with a dry select product gas, processing with a recycled select product gas, or other appropriate steps of treating carbonaceous materials appropriate for gasification processes. Moreover, embodiments may include multiple processing steps, which may be related as steps of initial processing, subsequent processing, and the like. Of course, such steps of processing may be accomplished by an appropriate processor, for example a pretreatment area processor, a pyrolysis chamber, a multiple coil carbonaceous reformation vessel, a preliminary carbonaceous reformation coil of a multiple coil carbonaceous reformation vessel, a secondary carbonaceous reformation coil of a multiple coil carbonaceous reformation vessel, a tertiary carbonaceous reformation coil of a multiple coil carbonaceous reformation vessel, and the like.

A feedstock solids carbonaceous materials input in some embodiments may include a walking floor or other raw feedstock holding bin (1) (FIGS. 1; 2; 12), perhaps with a continuous volume of input feedstock solids carbonaceous material that has been previously milled or shredded to an input particle size not to exceed as desired. Further, in embodiments, an inventory storage volume may be selected, for example perhaps a five day inventory storage volume, to ensure a consistent supply of feedstock carbonaceous materials for input. In embodiments, gasifier system exhaust flue gas (9) (FIGS. 1; 2; 12), produced for example perhaps by combustive burners, may be directed to a compressor, such as a high temperature delivery compressor (8) (FIGS. 1; 2; 12), whereby the flue gas temperature may be reduced from a high temperature, perhaps approximately 700° F., to a lower temperature. This may occur via an in-line heat exchanger or the like, not shown. In embodiments, temperature reduction may be down to about 300° F. Further, the compressor may also pressure regulate small volume and may also intermittently inject hot flue gas into a holding bin to additionally dry out moisture within the feedstock solids carbonaceous material, if required. A suitable feedstock delivery system, such as a variable speed horizontal metering screw (not shown), may be used to deliver a controlled rate volume feed of feedstock solids carbonaceous material to a variable speed inclined conveyor (2) (FIGS. 1; 2; 3; 4; 12) or the like.

A pressure system in some embodiments may be joined to a gasifier process flow path to pressurize the feedstock solids carbonaceous material as appropriate, for example perhaps by configuring the variable speed inclined conveyor to be sealed, perhaps such as in a pressure-tight unit cylinder. Such a pressure system also may include a flue gas delivery compressor to perhaps also pressure regulate a small but continuous volume delivery of hot flue gas into a conveyor unit, perhaps sealed cylinder, with perhaps an about 40 psi pressure being maintained throughout the conveyor feed cylinder. This may be fed into an inlet feed plenum assembly (6) (FIGS. 1; 2; 3; 12). The pressure system further may involve a conveyor unit cylinder pressure (perhaps flanged) sealed to an inlet plenum assembly, and the conveyor drive motor perhaps may be mounted outside the conveyor pressure unit cylinder. Further, a motor drive shaft may also be pressure sealed as part of a pressure system perhaps through the wall of a conveyor housing cylinder. Flue gas may be further compressed and pressure regulated and injected at the top of an inlet, perhaps airtight, plenum. This may occur such as at injection position (3) (FIGS. 1; 2; 12). Location and amount may be selected to ensure that a desired continuous pre-heat temperature, such as approximately 300° F. and 40 psi positive pressure, is maintained in the inlet plenum chamber.

In addition to the benefit of hot flue gas drying out excess feedstock moisture, hot flue gas may be used to displace and starve excess air out of the input feedstock materials. Such use of hot flue gas may be employed as part of an oxygen displacement system, which may represent a meaningful process control variable to limit air content, including perhaps oxygen levels, in the inlet plenum feed assembly. Such an oxygen displacement system may be employed gravimetrically, for example perhaps by injecting flue gas at the bottom of an incline, perhaps via an incline base input, through which a feedstock solids carbonaceous material may be moved and releasing oxygen content from the top of the incline, for example perhaps via an incline apex output. In some process configurations hot product gas may be substitute added, instead of utilizing flue gas, to achieve the same drying and displacement benefits and add more carbon element return. In some embodiments, such an incline may be a variable speed inclined conveyor (2) (FIGS. 1; 2; 3; 4; 12) or the like. Gravimetric displacement may occur as the injected flue gas rises gravimetrically through the incline, perhaps physically displacing air content and oxygen content along the way. Release of the displaced air or oxygen content may be affected through use of a suitable port, valve, outlet, or the like, at the top of the incline. Moreover, while injected flue gas may suffice for oxygen displacement, it may be appreciated that any suitable substance may be injected consistent with the gravimetric principles herein described, including for example using flue gas, using pressurized flue gas, using preheated flue gas, using recycled flue gas, using select product gas, using wet select product gas, using dry select product gas, using recycled select product gas, and the like. Of course, temperature and pressure characteristics of these injected substances may be selected as appropriate to achieve oxygen displacement, including for example pressurizing to at least 40 psi and preheating to at least 300 degrees Fahrenheit.

Further, the flue gas may consist of large concentrations of CO which may assist in the conversion of volatile gases to release free carbon. Periodic small volumes of plenum flue gas may also be auto-vented as a safety relief perhaps such as through an exhaust filter (5) (FIGS. 1; 2; 12) and a pressure relief/control valve (71) (FIGS. 1; 2; 13) which may be configured at the top of a plenum exhaust bleed outlet (4) (FIGS. 1; 2; 12). This may also be directed to an external flare system.

A gasifier flow path may be routed through one or more suitable airlock components to maintain pressure in a pressure system, for example a rotary type airlock material feed-through valve (not shown). Such airlock components may be configured to ensure that a desired pressure, for example perhaps a constant 40 psi pressure, can be held among the pressurized components of the system, for example perhaps at the plenum delivery system. Such maintained pressure also may prevent the back-feed of materials from subsequent processing areas of the gasifier system. In addition, by maintaining a perhaps 40 psi or so positive plenum pressure, the downward injection of feedstock solids carbonaceous materials into subsequent processing areas may be pressure assisted. In embodiments, the feedstock solids carbonaceous materials may transfer by gravity through a suitable airlock component, for example perhaps through wide throat airlock valves. In this arrangement, one valve may sequence into an open position while the other valve remains in a closed position, thereby allowing a volume of feedstock material to be retained in a holding chamber between the two valves. In this, or other manners, when the lower valve opens, the feedstock material may drop into a connecting conduit, perhaps through a box furnace enclosure (26) (FIGS. 1; 2) and into a subsequent processing areas of the gasifier system (FIGS. 1; 2).

Of course, a pressure system through which a gasifier process flow path is routed should not be construed as limited merely to the foregoing examples described herein. Rather, a pressure system perhaps simply may involve maintaining one or more areas within a solid carbonaceous materials gasifier system at a different pressure than that outside of the solid carbonaceous materials gasifier system. Such pressure maintenance may be accomplished in any suitable manner consistent with the principles described herein, for example perhaps through the use of an airlock, a double airlock, an injector that injects a pressurized substance such as a pressurized flue gas or pressurized select product gas, or perhaps even an inductor configured to maintain a pressure. Moreover, a pressure system may be applied to any gasifier system enclosures for which pressurization may be required, such as perhaps a pretreatment environment enclosure, a pyrolysis chamber enclosure, a multiple coil carbonaceous reformation vessel enclosure, any or all parts of a gasifier process flow path routed through a solid carbonaceous materials gasifier system, and the like. In some embodiments, a pressure system may be sealed, for example as to prevent communication between the pressurized environment and an unpressurized environment or perhaps to seal a feedstock solids carbonaceous material within the solid carbonaceous materials gasifier system.

Various embodiments may involve joining a heater system to a gasifier process flow path. Joining may be understood to involve perhaps simply brining two elements into some degree of mutual relation, for example, a heater system joined to a gasifier process flow path simply may permit the heater system to heat at least some of the gasifier process flow path. Heating in this manner may be effected in any suitable manner, for example perhaps by a combustive burner, an electric heater or the like. In various embodiments, a heater system may be configured to supply heat appropriate for a particular processing stage. In this manner, a heater system in various embodiments may include pyrolysis temperature heater system, a carbonaceous reformation temperature heater system, a variable temperature zone heater system, a heater system configured to establish a temperature from 125° F. to 135° F., a heater system configured to establish a temperature from 135° F. to 300° F., a heater system configured to establish a temperature from 300° F. to 1,000° F., a heater system configured to establish a temperature from 1,000° F. to 1,640° F., and a heater system configured to establish a temperature from 1,640° F. to 1,850° F.

In various embodiments, a gasifier process flow path may be routed through a temperature varied environment. A temperature varied environment may include a contiguous portion of a gasifier process flow path heated to varied temperatures, as for example by a variable temperature zone heater system. Some embodiments may use a gravity drop flow of feedstock material such as from the bottom of airlock valve (7) (FIGS. 1; 2; 3; 4; 12) and through the wall of a box furnace enclosure (26) (FIGS. 1; 2; 13). This perhaps may be arranged directly into a temperature varied environment, perhaps where one or more dynamically adjustable process flow parameters may be utilized to process the feedstock solids carbonaceous material. Overall operational temperature such as within a temperature varied environment may be regulated so that an inlet conduit entering from a previous processing area may provide incoming feedstock solids carbonaceous materials at an elevated temperature, perhaps such as at approximately 250° F. to 300° F., and perhaps as dependant upon any of various suitable dynamically adjustable process determinative parameters, such as the volume of a negatively electrostatically enhanced water species or the temperature of an injected flue gas. A temperature gradient may be established within the temperature varied environment perhaps from about 300° F. at an input area and reaching about 900° F. to 1000° F. toward an output area. Of course, any suitable heater system capable of variable heat output may be used to achieve such variable temperature zones. In some embodiments, for example, a series of electric heaters, combustive burners, or the like may be configured to produce a temperature varied environment.

A temperature varied environment in various embodiments may include a liquefaction zone. A liquefaction zone may be a temperature zone of a varied temperature environment in which feedstock solids carbonaceous materials may tend to liquefy, for example such as by being heated to their liquefaction temperature. Embodiments may include a plurality of movement guides in a temperature varied environment, perhaps temperature variable movement guides capable of being heated to varied temperatures as a result of being moved through said temperature varied environment, perhaps including trans-liquefaction movement guides disposed through the temperature varied environment that may engage a feedstock solids carbonaceous material for transport through the temperature varied environment and liquefaction zone. Such movement through the liquefaction zone may include receiving a feedstock solids carbonaceous material at a pre-liquefaction temperature zone of the temperature varied environment, which may perhaps be a cooler temperature than required to liquefy the feedstock solids carbonaceous material, moving the feedstock solids carbonaceous material through the liquefaction zone, at which point the feedstock solids carbonaceous material may liquefy, and moving the liquefied feedstock solids carbonaceous material into a post-liquefaction temperature zone, which may perhaps be a hotter temperature than the liquefaction temperature of the feedstock solids carbonaceous material.

In some embodiments, a plurality of trans-liquefaction movement guides may be joined to a temperature varied cyclical return. Such a temperature varied cyclical return may permit the trans-liquefaction movement guides to move through the temperature varied environment on a cyclical path. A trans-liquefaction movement guide undergoing such cyclical motion, for example, may begin within one temperature zone of the temperature varied environment, move through one or more other temperature zones of the temperature varied environment, and be returned to its original starting position within the first temperature zone of the temperature varied environment, where the cycle may be repeated. Of course, any of a variety of appropriate devices may accomplish such cycling. In some embodiments, for example, a temperature varied cyclical return may include an endless loop conveyor system, perhaps such as a track feeder (10) (FIGS. 1; 2; 3; 4; 13). Embodiments also may include varying the speed at which a temperature varied cyclical return is operated, perhaps to vary a retention time at which feedstock solid carbonaceous materials engaged by a plurality of trans-liquefaction movement guides may be retained within a temperature varied environment. In this manner, a track feeder (10) (FIGS. 1; 2; 3; 4; 13) may be provided with a variable return cycle.

In some embodiments, movement guides may be translatable movement guides. Configuring movement guides to be translatable may involve moving a feedstock solids carbonaceous material engaged to the movement guide by physically translating the movement guide itself. For example, where movement guides in embodiments may be joined to a temperature varied cyclical return, the cyclical motion of the return may act to physically translate the position of the movement guides, as perhaps through the cyclical motion of the return. Moreover, such a translatable nature of movement guides may be compared to non-translating motion systems, for example perhaps rotating screw systems, wherein the position of the screw itself may not translate and motion may be imparted simply by the rotation of the screw. In some embodiments, the translatable nature of the movement guides may assist in preventing binding of the movement guides by liquefied feedstock solids carbonaceous materials, perhaps in as much as translating the position of the movement guides may serve to translationally push liquefying feedstock into a higher temperature zone, and even possibly by cyclically varying the temperature of the movement guides themselves to avoid holding them at a liquefaction temperature.

Cycling movement guides in a temperature varied environment further may include automatically periodically clearing the movement guides of feedstock solids carbonaceous materials that may have liquefied when moved through a liquefaction zone. For example, cycling may involve continuously varying the temperature of the movement guides, perhaps including cyclically raising and lowering the temperature of the movement guides as they are cycled through a varied temperature regime. Such temperature change of the movement guides may be alternately through a pre-liquefaction temperature and a post-liquefaction temperature, avoiding holding of the movement guides at a liquefaction temperature, and in this manner it may be seen that liquefied feedstock solids carbonaceous material to which individual movement guides are engaged may be vaporized as the movement guides cycle through their post-liquefaction temperatures. Accordingly, the movement guides may be automatically periodically cleared as a result of such cycling, and binding of the movement guides may be avoided in as much as the liquefied dry solids carbonaceous feedstock may be systematically vaporized. In this manner, the movement guides may be considered as configured to avoid a sustained liquefaction temperature, configured for cyclical elevation and reduction in temperature, configured for cyclical liquefaction and vaporization of feedstock solids carbonaceous material, and may even be considered to be binding resistant movement guides.

A track feeder and plurality of trans-liquefaction movement guides in some embodiments may be configured to include a track-heat-scraper plate. For example, in some embodiments, along the bottom longitudinal centerline underside of a track heat-scraper plate (not shown) may be located a parallel row of progressive electric heaters (11) (FIGS. 1; 2; 13) that may even sequentially control a temperature gradient. Similarly, in some embodiments a select product gas burner manifold may be used as a heating source and perhaps may be located external and adjacent to the track feeder embodiment. A scraper wear plate may be periodically replaced as required and may even be fabricated and cast from hardened high temperature metallic material. A counter-clockwise rotation of a feeder track may be used to move feedstock solids carbonaceous material to the bottom underside of the track feeder.

Moreover, in some embodiments, such varied temperatures may include pyrolysis temperatures suitable to pyrolytically decompose at least some of a feedstock solids carbonaceous material routed through the temperature varied environment along a gasifier process flow path. Pyrolysis may involve heating the feedstock solids carbonaceous material in the absence of reactively significant amounts of oxygen to induce decomposition of the feedstock solids carbonaceous material, as perhaps by consequential thermal reactions, chemical reactions, and volatilization reactions. The absence of such reactively significant amounts of oxygen perhaps need not require the total absence of oxygen (although this condition certainly may be included), but rather perhaps may include merely an amount of oxygen that produces merely insubstantial or perhaps even nonexistent combustion when said feedstock solids carbonaceous material is subjected to the temperature varied environment. In various embodiments, pyrolytically decomposing may involve vaporizing a carbonaceous material, for example perhaps vaporizing hydrocarbons or perhaps vaporizing select product gas components. Further, in some embodiments, portions of a temperature varied environment in which pyrolytic decomposition may occur accordingly may be considered to include a pyrolysis chamber.

In some embodiments, pyrolytically decomposing a feedstock solids carbonaceous material in a temperature varied environment may include dominatively pyrolytically decomposing the feedstock solids carbonaceous material. Such dominative pyrolysis may involve pyrolyzing to a high degree, perhaps by subjecting the feedstock solids carbonaceous material to prolonged pyrolyzing conditions. For example, embodiments may include retaining a feedstock solids carbonaceous material within a pyrolysis chamber of a temperature varied environment for at least 2 minutes, at least 3 minutes, at least 4 minutes, at least 5 minutes, at least 6 minutes, at least 7 minutes, at least 8 minutes, at least 9 minutes, at least 10 minutes, at least 11 minutes, at least 12 minutes, at least 13 minutes, at least 14 minutes, at least 15 minutes, at least 16 minutes, at least 17 minutes, at least 18 minutes, at least 19 minutes, or at least 20 minutes, for example perhaps by varying the speed of a temperature varied cyclical return and a plurality of movement guides joined to the temperature varied cyclical return. Such retention times perhaps may be substantially longer than conventional pyrolysis times, and perhaps may be achievable by minimizing or perhaps even eliminating binding caused by liquefaction that perhaps may plague conventional pyrolysis systems.

Moreover, pyrolysis or even dominative pyrolysis may be facilitated in various embodiments by maximizing the surface area of a track feeder to increase the surface area contact of a feedstock solids carbonaceous material to the pyrolysis conditions of a pyrolysis chamber. For example, embodiments may include maximizing the surface area of a track feeder (10) (FIGS. 1; 2; 3; 4; 13), for example including perhaps dimensioning the track feeder to at least 24 inches in width, to at least 30 inches in width, to at least 36 inches in width, to at least 42 inches in width, to at least 48 inches in width, to at least 54 inches in width, to at least 60 inches in width, to at least 66 inches in width, to at least 72 inches in width, to at least 3 feet in length, to at least 6 feet in length, to at least 9 feet in length, to at least 12 feet in length, to at least 15 feet in length, to at least 18 feet in length, and to at least 21 feet in length. Such dimensions may be perhaps at ten to twenty times greater surface area exposure than a conventional 3 or 4 stage auger feed pyrolysis system design, and may be without the binding or plugging probabilities mentioned earlier.

A track feeder in various embodiments may represent an integrated process control module, perhaps with sequenced computer automation. Process flow embodiments may be monitored to provide an adjustable time period to extend or shorten pyrolytic decomposition times for throughput feedstock solids carbonaceous material to undergo perhaps complete reaction contact with heat, flue gas CO, negatively electrostatically enhanced water species, and the like. A track feeder system design in various embodiments may be sized to automatically process perhaps about 50 tons/day and up to 500 tons/day of input feedstock solids carbonaceous materials. Of course, multiple track feeders, perhaps routed through multiple temperature varied environments perhaps including pyrolysis chambers, may be utilized in some embodiments to increase total feedstock solids carbonaceous materials throughput. Track feeder maximized surface areas, adjustable temperatures, progressive time controls, and track speed control variables may be included in embodiments such as to allow extended pyrolysis time or the like and to provide a capability to near completely pyrolytically decompose the feedstock solid carbonaceous material, including perhaps tars and phenolic chemistry fractions. In some embodiments, small volume additions of calcined dolomite also may be added, for example at a pretreatment area, such to speed up and catalyze the sulfurs or tars and phenols initial cracking process that may occur in the pyrolysis chamber. Track feeder operational up-time may even approach 100%, except perhaps for short 2-3 day periods of monthly preventive maintenance. The components of a track feeder, such as chains, sprockets, and drive shafts, perhaps may be manufactured from high temperature Inconel® alloy metal stock or the like, or other alternate and appropriate metallic materials, and in addition, components such as track flights and bottom track scraper wear and heater plates (not shown) may be custom cast with high temperature metallurgy or the like. Track feeder drive bearings may be standard nuclear industry high temperature sealed units, perhaps with an outboard variable speed motor drive unit that may provide a track rotational movement selection of one to five revolutions per minute. An additional auto-vent safety-relief pressure control and relief valve (71) (FIGS. 1; 2; 13; 14) may be installed and perhaps even centered through the top of a box furnace enclosure (26) (FIGS. 1; 2; 13). Of course, the use of a temperature varied cyclical return as described herein may preclude the need for any type of auger screw or perhaps even any screw type movement system through a pyrolysis chamber of a temperature varied environment as described herein.

Various embodiments further may include a magnetic materials removal system (12) (FIGS. 1; 2) through which a gasifier process flow path is routed, perhaps to magnetically isolate at least one constituent component of a feedstock solids carbonaceous material. Such a magnetic materials removal system may use a magnet to magnetically attract metallic constituent components of a feedstock solids carbonaceous material. Where a nonmetallic constituent component is desired to be removed, embodiments perhaps may still achieve removal of such nonmetallic constituent components perhaps by creating a metal oxide of the nonmetallic constituent components, perhaps in a metals oxidation area, and magnetically attracting the created metal oxide. In some embodiments, oxidation may be achieved by reacting such constituent components with a negatively electrostatically enhanced water species, perhaps as injected into a gasifier process materials flow path, and magnetically attracting the reacted constituent component. Moreover, such magnetically isolated constituent components may be removed from a gasifier process flow path, for example perhaps by being gravimetrically deflected away from a gasifier process flow path and received into an electromagnetic drop well. Such gravimetric deflection of course may be enhanced by a magnet. In various embodiments, such an electromagnetic drop well may be located to receive removed constituent components prior to exit from a temperature varied environment, perhaps even after pyrolytic decomposition of a feedstock solids carbonaceous material. Removal of such magnetically isolated constituent components further may reduce abrasion within the solid carbonaceous materials gasifier system that otherwise may have been caused by the constituent component. Such removal also may assist in increasing the purity of a select product gas, increasing the BTU content of a select product gas, minimizing contaminants within a select product gas, or perhaps even creating a magnetic materials demagnetized select product gas.

In some embodiments, pyrolytically decomposed carbonaceous material, such as perhaps generated, devolatilized reactive vapor and atomized particulate material, may pass into and through a venturi injector (13) (FIGS. 1; 2; 4; 8; 14). This in turn may have a pressure-tight fitting to the inlet of multiple coil carbonaceous reformation vessel (19) (FIGS. 1; 2; 3; 4; 14). A venturi injector (13) (FIGS. 1; 2; 4; 8; 14) may be connected directly to an input, perhaps an inlet pipe opening, of the innermost reformation coil (15) (FIGS. 1; 2; 5; 6; 7; 14), perhaps preliminary reformation coil, of a multiple coil carbonaceous reformation vessel. Venturi side-entry inputs may provide the option of produced select product gas, generated negatively electrostatically enhanced water species, or perhaps both to be injected into the reformation coils, for example perhaps at the initial entry opening of the first innermost reformation coil (15) (FIGS. 1; 2; 5; 6; 7; 14). As an additional process safeguard, a side-stream small volume of select product gas may be made available for return injection such as into the multiple coil carbonaceous reformation vessel (19) (FIGS. 1; 2; 3; 4; 14), perhaps even such as into and through the venturi injector (13) or through venturi injector (17) (FIGS. 1; 2; 8; 9; 14). This may provide for additional select product gas motive velocity and pressure perhaps to move carbonaceous materials entrained in a gasifier process flow continuously into and through all reformation coils (15), (16) and (18) (FIGS. 1; 2; 5; 6; 7; 14) of a multiple coil carbonaceous reformation vessel 19. In the event of a momentary mechanical or process depletion availability of accessible flue gas, select product gas, or perhaps both, a rapid shutdown purge may be made available for providing a complete multiple coil carbonaceous reformation vessel vent-cleaning, perhaps by back-feeding system process water into the multiple coil carbonaceous reformation vessel (19) (FIGS. 1; 2; 3; 4; 14). Coil latent heat may provide thermal energy to produce an immediate steam cleaning action, if and when required due to an emergency shutdown circumstance. The availability of providing negatively electrostatically enhanced mist injection directly into the initial reformation coil, at the point of venturi injection (13) (FIGS. 1; 2; 4; 8; 14), and/or venturi injector (17) (FIGS. 1; 2; 8; 9; 14), may further provide near instantaneous and immediate steam reformation reaction-control. If either high surfactant or tarry or waxy chemistry exists, or if very dry input feedstock solids carbonaceous material is to be processed, or even if additional, perhaps merely more flexible, process control variables may be desired, an element such as a venturi injector (17) (FIGS. 1; 2; 8; 9; 14) may be applied with an alternate embodiment for venturi injector (13) also shown.

In some embodiments, a negatively electrostatically enhanced water species, possibly including negatively electrostatically enhanced steam, may be added to a temperature varied environment. Such addition of a negatively electrostatically enhanced water species may represent a dynamically adjustable process determinative parameter implemented in the temperature varied environment. The negatively electrostatically enhanced water species perhaps may be routed through a return injection line (51) (FIGS. 1; 2), and perhaps may be preheated to an elevated temperature, such as perhaps about 1,800° F., and may possibly be preheated via routing through a box furnace enclosure (26) (FIGS. 1; 2; 13; 14). Adding the negatively electrostatically enhanced water species may involve mist spraying, perhaps using a venturi (not shown), upon incoming feedstock solid carbonaceous material that may be engaged by a track feeder (10) (FIGS. 1; 2; 3; 4; 13). External valve control may be included to allow the addition of the negatively electrostatically enhanced water species to be metered for determining an optimum process control set-point.

Embodiments may further involve adding a flue gas to the temperature varied environment, perhaps such a pressurized flue gas, a flue gas pressurized to at least 80 psi, or a flue gas in motion at a rate of about 75-100 cfm. Such addition of a flue gas may represent a dynamically adjustable process determinative parameter. For example, such addition of a flue gas may be used to further affect temperature of a feedstock solids carbonaceous material, and may provide motive force pressurization within the temperature varied environment. For example, perhaps simultaneous to the point of negatively electrostatically enhanced water species injection into the temperature varied environment, additional hot flue gas may be compressed and pressure regulated, perhaps to at least about 80 psi, from an exhaust flue gas compressor (8) (FIGS. 1; 2; 12). This may be coactively venturi-injected (not shown) such as to perhaps join a spray of the negatively electrostatically enhanced water species mixing with incoming feedstock solids carbonaceous material. This may not only establish further process determinative parameters that may allow the negatively electrostatically enhanced water species to react and assist in accelerating more complete pyrolytic decomposition, but may also provide for the injection of additional reactive flue gas carbon monoxide content, perhaps to accelerate vapor pressure reactions. The injection of pressurized flue gas also may assist in regulating and perhaps maintaining pressure within the temperature varied environment, for example perhaps 80 psi or higher control pressure if desired. Also, heat from an added preheated flue gas may be employed to contribute to the overall heat balance, perhaps reducing heat requirements from other gasifier system elements.

Moreover, embodiments further may provide for adding select product gas to achieve the same process control benefits as adding flue gas, adding wet select product gas, adding dry select product gas, adding recycled select product gas, adding a scrubber recycled tar, adding a scrubber recycled phenol, adding scrubber recycled carbon dioxide, and adding a scrubber recycled solid to a temperature varied environment. Such additions of course also may represent dynamically adjustable process determinative parameters.

Accordingly, in various embodiments, a temperature varied environment may incorporate one or more dynamically adjustable process determinative parameters, perhaps utilized singly or in combination. Initial feedstock solids carbonaceous materials decomposition, perhaps pyrolytic decomposition, may occur perhaps across a moving track feeder bottom-side length of progressive temperature increase through a temperature gradient. In embodiments, this may range from approximately 300° F. to 900° F., and may even occur as movement guides, perhaps track flights, scrape forward carbonaceous material, as perhaps along a surface of a track feed heater contact plate (not shown). Feedstock solids carbonaceous material may move forward and may gradually both dissociate and volatilize into smaller solids and particulates, and initial carbon conversion gases may be released. Further, the feedstock solids carbonaceous material may partially liquefy, perhaps along with organic content beginning to volatilize into hydrogen gas, carbon monoxide gas, hydrocarbon vapors, and perhaps other select product gas components. By controlling and adjusting the retention time, perhaps through track feeder speed variation, the feedstock solids carbonaceous material may be subjected to and may pass through the majority of any or all char decomposition reactions, and perhaps liquefaction stages. There may even be a near 100% throughput delivery of decomposed, perhaps pyrolytically decomposed, carbon-bearing fine particulate material and initial devolatilized gas cross-over into a subsequent gasifier system processing stage, such as perhaps a multiple coil carbonaceous reformation vessel. Any residual amount of remaining larger-particle char, solids, or inorganic metallic or inert material, including perhaps para-magnetic organic or metal compounds, may become attracted and isolated into a electromagnetic drop well (12) (FIGS. 1; 2; 13). These isolated, perhaps smaller volume materials may be intermittently transferred through an airlock receiver (not shown) to an external container. Any incompletely decomposed carbonaceous material of larger particle size perhaps may be screen classified and separated away from other drop-well silica or magnetic debris and recycle returned, such as back to a walking floor feed hopper.

Not only may the physical kinetics of changing track feeder speed allow the decomposition completion time to become optimized for various chemistries of different feedstock solids carbonaceous materials, but other synergistic dynamically adjustable process determinative parameters may be applied, either individually or collectively, perhaps to optimize near total decomposition, and perhaps to maximize initial devolatilization gaseous transfer such as to subsequent gasifier system processors. Dynamically adjustable process determinative parameters may exist, perhaps such as: heat and temperature variations which may be altered or increased; flue gas injected concentrations, perhaps carbon monoxide ratios, may be adjusted; negatively electrostatically enhanced water species dilution and injection ratios may be modified to accelerate carbon shift and steam reformation; throughput select product gas components pressure reaction velocities may be altered; and resultant carry-through vapor and fine, perhaps carbon-bearing, particulate or ash mass balance ratios may be modified and adjusted to achieve optimum select product gas production volumes.

A solid carbonaceous materials gasifier system in various embodiments may be configured to recycle various substances routed through a gasifier process flow path. Such recycling may involve returning materials put through or perhaps generated at a later processing stage within the carbonaceous materials gasifier system to an earlier processing stage of the carbonaceous materials gasifier system. In various embodiments, such return may be via a recycle path appended to the later processing stage and routed to a recycle input joined to the gasifier process flow path at an earlier processing stage. Moreover, recycling in various embodiments may involve significantly internally recycling, for example where a substantial majority of the recycle material may be retained within the solid carbonaceous materials gasifier system, including perhaps all or nearly all of such a recycle material. Recycling in various embodiments perhaps even may include exceeding an environmental standard for recycling such materials.

For example, a generalized process flow for a solid carbonaceous materials gasifier system in some embodiments may involve initially processing at least a portion of a feedstock solids carbonaceous material, creating an initially processed carbonaceous material, subsequently processing the initially processed carbonaceous material, perhaps to generate at least some components of a select product gas, and creating a subsequently processed carbonaceous material. The subsequently processed carbonaceous material perhaps may be selectively separated, as into a first processed material portion and a second processed materials portion. The first processed materials portion then perhaps may be returned, for example perhaps utilizing an appended recycle path to a recycle input of the gasifier process flow path. Some embodiments perhaps may involve mixing the returned first processed materials portion with an additionally input carbonaceous material, for example perhaps with a feedstock solids carbonaceous materials re-mixer, and reprocessing.

Of course, the steps of initially processing, subsequently processing, and reprocessing may involve any appropriate kind of processing of carbonaceous material consistent with the gasification principles discussed herein—all that may be required is that the step of initially processing occur before the step of subsequently processing, and that the step of subsequently processing occur before the step of reprocessing. For example, these steps of processing may include pretreating a carbonaceous material, pyrolytically decomposing a carbonaceous material, carbonaceously reforming a carbonaceous material in a multiple coil carbonaceous reformation vessel, preliminarily carbonaceously reforming a carbonaceous material in a preliminary reformation coil, secondarily carbonaceously reforming a carbonaceous material in a secondary reformation coil, and tertiarily reforming a carbonaceous material in a tertiary reformation coil. In addition, returning in various embodiments may be implemented perhaps by a venturi, or perhaps even a venturi injector, for example perhaps to maintain pressure conditions or flow rate conditions through a recycle path, for example such as a pressure from about 50 psi to about 100 psi or a flow rate from about 2,000 fpm to about 8,000 fpm.

Moreover, recycling in various embodiments may involve selecting a recycle path, perhaps as from a multiply routable path. Such a multiply routable path may provide two or more recycle path options through which recycled materials may be returned. For example, with reference to the generalized process flow described herein, one example of a multiply routable path may involve initially processing in a pyrolysis chamber, subsequently processing in a preliminary reformation coil, returning a first processed materials portion to the pyrolysis chamber, and reprocessing in the pyrolysis chamber. Another example may involve initially processing in a preliminary reformation coil, subsequently processing in a secondary reformation coil, returning the first processed materials portion to the preliminary reformation coil, and reprocessing in the preliminary reformation coil. Of course, these are merely examples illustrative of some possible configurations for a multiply routable path in some embodiments, and should not be construed to limit the possible configurations for a multiply routable path consistent with the principles described herein.

In various embodiments, materials routed through a gasifier process flow path may be selectively separated. Such selective separation perhaps may involve selecting a property of the material to be separated and effecting separation by utilizing that property. Examples of such selective separation perhaps may include screening, solubilization, magnetism, or the like. In some embodiments, selective separation may be accomplished through the vortex action of a cyclone. For example, embodiments may include operating a cyclone at conditions including perhaps from 50 psi to 100 psi, 1,640° F. to 1,800° F., and 2,000 fpm to 8,000 fpm, and achieving the selective separation of gasifier process flow path materials accordingly. Moreover, selectively separating may include on the basis of particle size, for example perhaps selectively separating carbonaceous particles of at least 350 micron particle size, selectively separating carbonaceous particles of at least 150 micron particle size, selectively separating carbonaceous particles of at least 130 micron particle size, selectively separating carbonaceous particles of at least 80 micron particle size, selectively separating carbonaceous particles of at least 50 micron particle size, selectively separating carbonaceous particles of at least 11 micron particle size, selectively separating carbonaceous particles of at least 3 micron particle size, and selectively separating ash. Other modes of selectively separating may include physically separating, separating by phase, separating by density, separating by screening, separating by incompletely pyrolytically decomposed carbonaceous material, separating by incompletely carbonaceously reformed material, separating by heterogeneous composition, and the like. Moreover, selectively separating consistent with the techniques described herein may remove certain impurities from a gasifier process flow, perhaps with the result of increasing the purity of a select product gas, increasing the BTU value of a select product gas, or perhaps minimizing contaminants within a select product gas. In various embodiments, such resulting products may be considered to be separation products resulting from the act of selectively separating as described herein.

A gasifier process flow path in various embodiments may be routed through a multiple coil carbonaceous reformation vessel (19) (FIGS. 1; 2; 3; 4; 14). For example, a process flow may include pyrolytically decomposed carbonaceous materials from a pyrolysis chamber, perhaps such as released gas and carbon-bearing particulate matter pressurized out of a temperature varied environment. A multiple coil reformation vessel may include two or more reformation coils through which a process flow may be routed. Carbonaceous materials entrained in the process flow may be reformed within each such reformation coil. Such carbonaceous reformation may encompass perhaps simply changing the form of such carbonaceous materials, as for example perhaps from or into select product gas components, from or into incompletely reformed carbonaceous materials, from or into ash, or perhaps from or into various types of contaminants. In some embodiments, carbonaceous reformation may involve vaporizing a carbonaceous material, for example such as vaporizing hydrocarbons or vaporizing select product gas components. Moreover, reformation coils perhaps may simply provide a coiled path through which a process flow may be routed during a carbonaceous reformation stage in a solid carbonaceous materials gasifier system, in some embodiments for example as perhaps through a coiled tube, pipe, conduit, or the like. A multiple coil carbonaceous reformation vessel may include a preliminary reformation coil, a secondary reformation coil, a tertiary reformation, and perhaps one or more additional reformation coils as may be desired to achieve carbonaceous reformation.

Embodiments may include complementarily configuring at least two reformation coils, which may involve positioning the reformation coils relative to each other to improve the efficacy of the carbonaceous reformation process. For example, some embodiments may involve helically nesting at least two carbonaceous reformation coils. Such a helically nested arrangement perhaps may improve the efficacy of the carbonaceous reformation process by reducing the size occupied by a multiple coil carbonaceous reformation vessel, or perhaps by permitting the selective distribution of heat applied to the helically nested configuration, such as wherein heat may be applied to one coil and radiated from that coil to another helically nested coil. In this manner, individual reformation coils may be seen to act as radiators. For example, embodiments may involve a preliminary reformation coil, a secondary reformation coil, and a tertiary reformation coil in a helically nested configuration, wherein heat applied to the helically nested configuration may be variably triply distributed from one coil to another, and the configuration may act as a tripart reformation coil radiator. Of course, it may be appreciated that the manner in which two or more reformation coils may be complementarily configured and the location and modality in which heat may be selectively applied may create a variety of arrangements that may represent selectively adjustable process control parameters, perhaps even dynamically adjustable process determinative parameters.

For example, in some embodiments, a horizontal helically nested configuration of multiple reformation coils such as one inside the other may be applied. Such a configuration may provide a high temperature helical coil reformation environment that may establish the longest length within the smallest cube design volume space and footprint, perhaps as shown in assembly (19) and embodiments (15), (16) & (18) (FIGS. 1; 2; 3; 4; 5; 6; 7; 14). As one example, assembly (19) may have a nesting configuration design that may provide an extremely efficient heat transfer cubical unit whereby the maximum amount of helical reformation coil lineal footage of pipe is packed into the smallest cubic volume of box furnace enclosure (26) (FIGS. 1; 2; 13; 14) space. This configuration may provide radiant heat transfer from the outermost coil (18) (FIGS. 1; 2; 5; 6; 7; 14) to the innermost coil (15) (FIGS. 1; 2; 5; 6; 7; 14) and vice versa. This may reduce an overall furnace BTU combustion heat and the input select product gas energy requirement as necessary such as perhaps to hold the furnace temperature constant in the 1,600° F. to 1,800° F. temperature range.

The helical reformation coil assembly (19) inside of the furnace may be heated and held at an elevated level, perhaps such as from about 1,600° F. to about 1,800° F. Further, the furnace may be heated by a computerized and auto-controlled combustive burner manifold system (14) (FIGS. 1; 2; 14; 9). A combustive burner may utilize recycled select product gas as the combustible fuel source, perhaps with an alternate connection to an external fuel source, perhaps a pressurized propane tank, to be supplied as an initial startup fuel source or the like. In the helical reformation coil assembly 19, a burner manifold forced air combustion system may hold the temperature of all three reformation coils (15), (16) and (18) (FIGS. 1; 2; 5; 6; 7; 14) elevated, perhaps such as at a minimum of about 1,600° F. in order to facilitate carbonaceous reformation, as for example where substantially all atomized carbon particulate material moving through the combined length of all three reformation coils may be substantially completely carbonaceously reformed (perhaps such as in the presence of steam) into select product gas components, such as perhaps carbon monoxide and hydrogen gases. In embodiments, a combustive burner manifold system (14) (FIGS. 1; 2; 14) may be placed on the inside of the box furnace enclosure (26), for example perhaps at the bottom inside wall and perhaps further extended one-third upward on two opposing sidewalls (not shown). Burner jet-nozzles may penetrate through the box furnace enclosure (26) (FIGS. 1; 2; 13; 14), perhaps with pressure-tight weldments, and perhaps may further penetrate through a perhaps twelve inch thickness of high temperature glass wool insulation (perhaps with ceramic heat shield cones placed around each burner jet-nozzle pipe). Nozzles may be strategically angle positioned to produce a selectively applied heat distribution, such as perhaps an evenly distributed blanket of heat across the entire reactor embodiment surfaces (and perhaps throughout the three-dimensional helical nest structure) of the helical reformation coil configuration (19) (FIGS. 1; 2; 3; 4; 14). To provide maximum heat and strength longevity, the reformation coils (15), (16) and (18) (FIGS. 1; 2; 5; 6; 7; 14) may be fabricated from high strength and high temperature Inconel® or other such metal pipe, or other alternate and appropriate metallic materials. Reformation coil (such as per each nesting coil) diameters may vary from about three inches to about eight inches in diameter and the pipe lengths may vary proportionally as dependent upon the daily tonnage of input feedstock volume that is to be processed, perhaps in order to maintain optimum process gas velocity throughout the multiple carbonaceous reformation coil vessel and any selective separators incorporated therein.

Operating conditions of a preliminary reformation coil, perhaps as exemplified within helical reformation coil assembly (19), may include an operating condition of at least 50 psi to 100 psi, 1,640° F. to 1,800° F., and a flow rate from 5,000 fpm to 20,000 fpm. Similarly, operating conditions of a secondary reformation coil, perhaps as exemplified within helical reformation coil assembly (19), may include an operating condition of at least 50 psi to 100 psi, 1,640° F. to 1,800° F., a flow rate from 5,000 fpm to 20,000 fpm, and perhaps a reformation time of up to about 5 seconds. Moreover, operating conditions of a tertiary reformation coil, perhaps as exemplified within helical reformation coil assembly (19), may include an operating condition of at least 50 psi to 100 psi, 1,750° F. to 1,850° F., a flow rate from 5,000 fpm to 20,000 fpm, and perhaps a reformation time of up to about 4 seconds. Total reformation time of a multiple coil carbonaceous reformation vessel, again as perhaps exemplified by helical reformation coil assembly (19), may be from about 4 seconds to about 10 seconds.

Moreover, embodiments may include adding reaction beneficial materials to at least one reformation coil of a multiple coil reformation vessel, for example such as adding before a preliminary reformation coil, adding between a preliminary reformation coil and a secondary reformation coil, adding between a secondary reformation coil and a tertiary reformation coil, adding after a tertiary reformation coil, utilizing a venturi injector, utilizing a flue gas, utilizing a pressurized flue gas, utilizing a preheated flue gas, and perhaps via a reaction beneficial materials input.

Carbonaceously reforming within a multiple coil carbonaceous reformation vessel in various embodiments may include selectively separating carbonaceous materials at various points within the vessel with a carbonaceously reformed materials selective separator, for example perhaps via vortex action using a cyclone. One or more selective separators perhaps may be employed and placed at suitable locations within the multiple coil carbonaceous reformation vessel, for example perhaps to achieve selective separation before a preliminary reformation coil, between a preliminary reformation coil and a secondary reformation coil, between a secondary reformation coil and a tertiary reformation coil, and perhaps after a tertiary reformation coil. Selectively separating in this manner perhaps may allow progressive refinement of a quality of a carbonaceous material as it is routed through the reformation coils of a multiple coil reformation vessel, for example, perhaps by progressively reducing the particle size of carbonaceous particles transiting from coil to coil. Moreover, such selectively separated carbonaceous materials may be recycled, for example via a carbonaceously reformed materials recycle path, to any suitable gasifier process flow path location, such as a pretreatment area, a pyrolysis chamber, a preliminary reformation coil, a secondary reformation coil, and perhaps by utilizing a venturi injector, utilizing a flue gas, utilizing a pressurized flue gas, utilizing a preheated flue gas, or the like.

Figure 3:
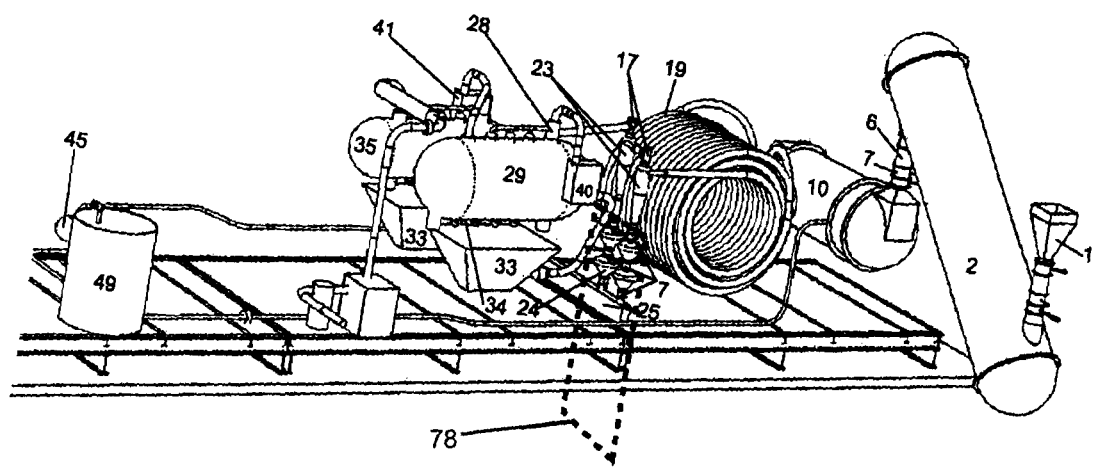
FIG. 3 is a front perspective view of a solid carbonaceous materials gasifier system in one embodiment.
Figure 4:
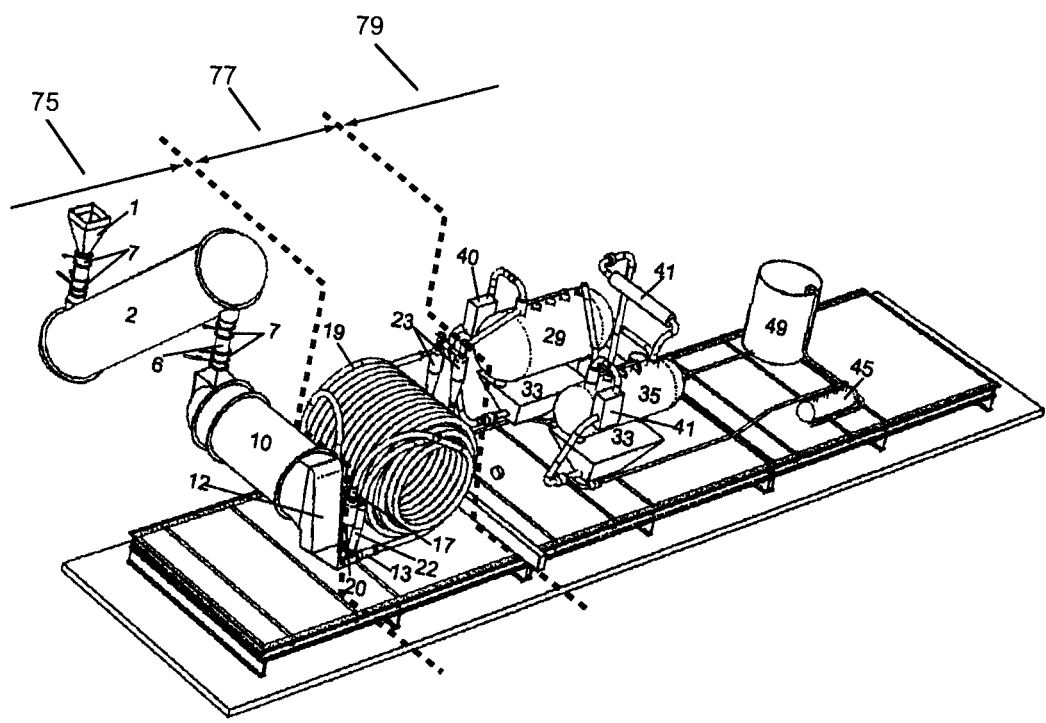
FIG. 4 is rear perspective view of a solid carbonaceous materials gasifier system in one embodiment.
Figure 5:
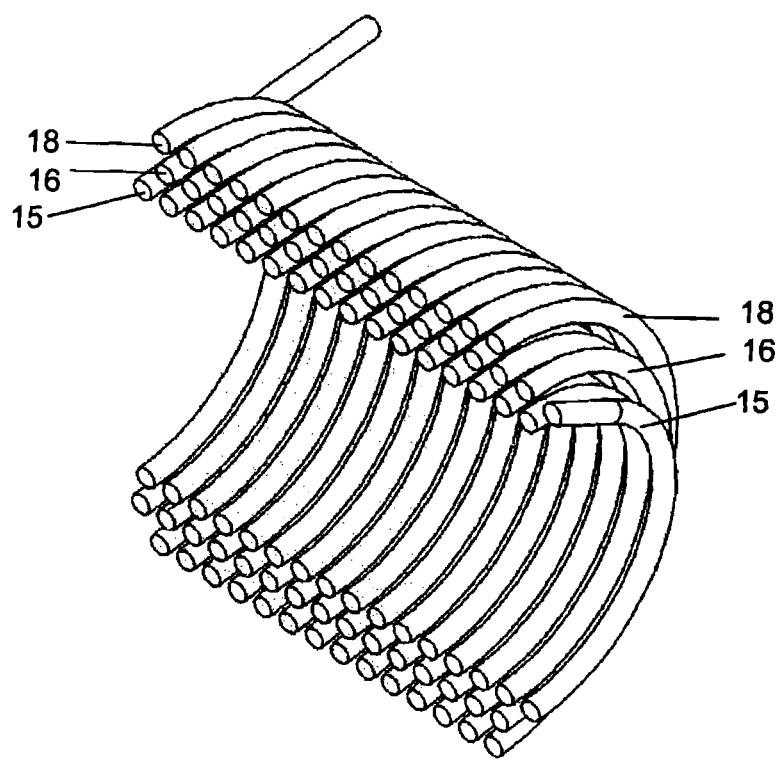
FIG. 5 is a sectional cutaway view of a multiple coil carbonaceous reformation vessel in one embodiment.
Figure 6:
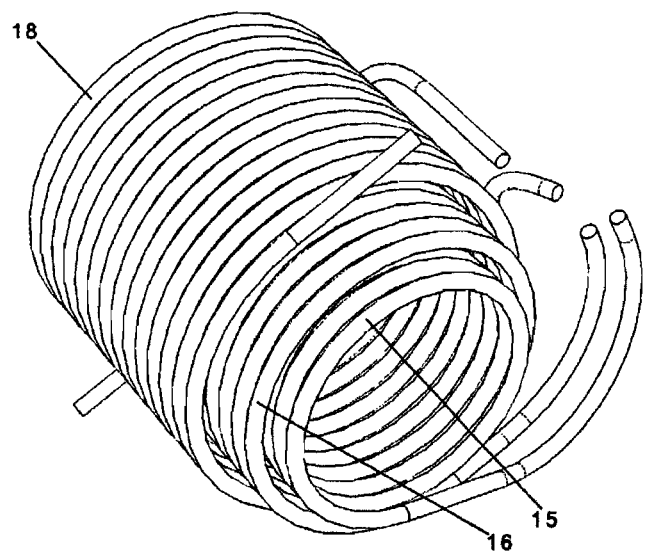
FIG. 6 is a perspective view of a multiple coil carbonaceous reformation vessel in one embodiment.
Figure 7:
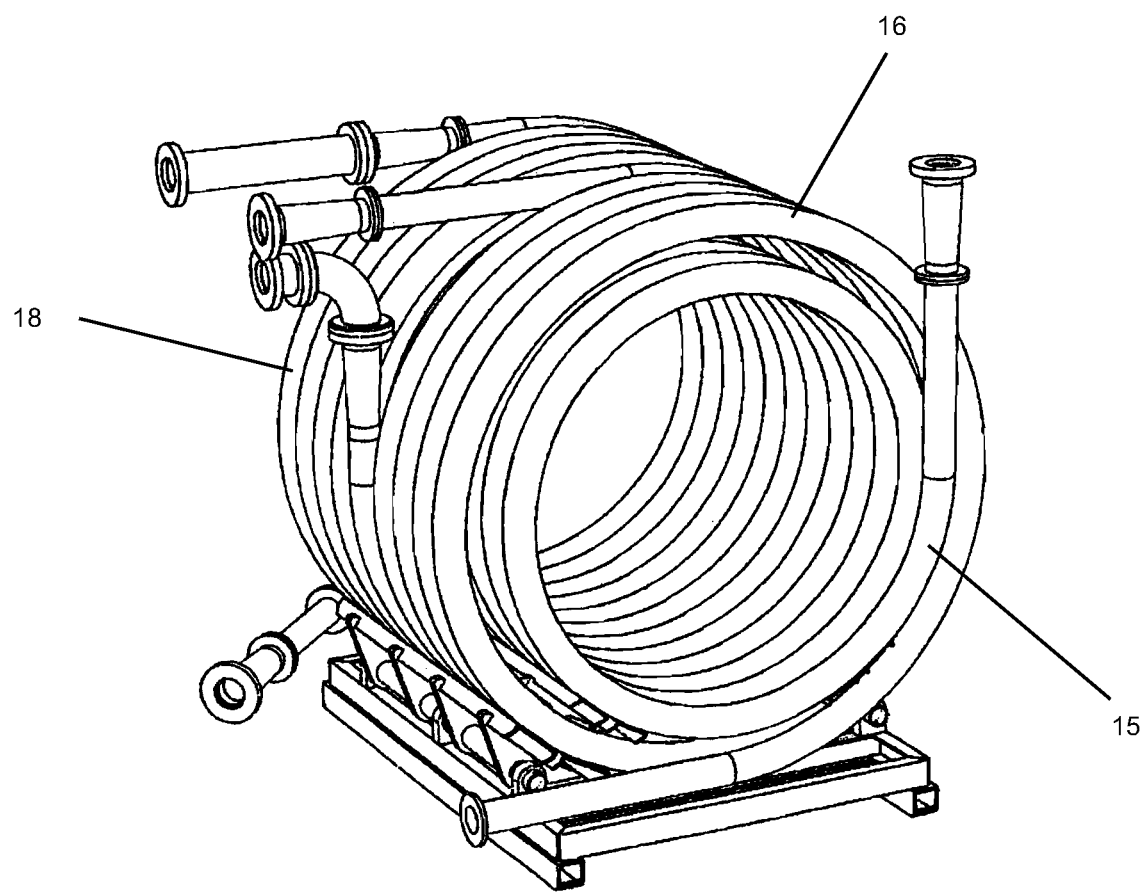
FIG. 7 is a perspective view of a multiple coil carbonaceous reformation vessel in one embodiment.

In some embodiments, for example, a cyclone (20) (FIGS. 1; 2; 14) perhaps may be fitted to an end outlet of a preliminary reformation coil (15) (FIGS. 1; 2; 5; 6; 7; 14). Such a cyclone may be fabricated from high temperature Inconel® or other alternate and appropriate metallic materials or the like. In embodiments, a cyclone perhaps may be engineered to remove carbonaceous materials, such as perhaps the majority of char carry-through particulate material such as that is about 80 to about 150 microns in particle size, or larger. A venturi, perhaps a venturi injector, may be joined at the cyclone bottom exit port, and perhaps may control a periodic emptying of accumulated selectively separated carbonaceous materials, perhaps such as char debris, for recycling back such as into a pyrolysis chamber. Such recycling perhaps may allow additional pyrolytic decomposition of the recycled carbonaceous material, for example carbon containing char particulates, to occur. The venturi, perhaps a venturi injector, may be provided with a side-stream injection port from a produced select product gas delivery manifold (21) (FIGS. 1; 2; 8; 9; 14) and may also provide perhaps a variable differential pressure that may assist in clearing the cyclone of selectively separated carbonaceous material. Moreover, a venturi injector unit (17) (FIG. 3) may be connected, perhaps flange connected, to the top outlet of the cyclone (20), and perhaps may utilize nuclear industry design high temperature flexatalic gaskets and bolt assemblies. A venturi injector (17) further may be connected, perhaps flange connected, such as to an inlet opening of a secondary reformation coil (16) (FIGS. 1; 2; 5; 6; 7; 14) and perhaps may provide additional turbulent flow steam reformation into the reformation coil (16).

A carbonaceous materials selective separation sequence perhaps may be repeated for a secondary reformation coil, perhaps relative to applying a cyclone (22) (FIGS. 1; 2; 14). A cyclone (22) may act to remove carbonaceous materials, perhaps such as carry-through char particulates down to about 50 to about 130 microns in particle size, perhaps by connecting, perhaps flange connecting, the cyclone from an exit opening of the secondary reformation coil (16) (FIGS. 1; 2; 5; 6; 7; 14) to the entry opening of the tertiary reformation coil (18) (FIGS. 1; 2; 5; 6; 7; 14). A venturi injector (17) (FIG. 1; 2; 8; 9; 14) may be also installed, as perhaps within pipe flange connections between the top exit of the cyclone classifier (22) and the entry point into the tertiary reformation coil (18). This additional installed location of a venturi injector (17) (FIG. 1; 2; 8; 9; 14) may further provide accelerated carbonaceous reformation, perhaps to additionally decrease $CO_2$ and other hydrocarbon concentrations in the select product gas stream being generated. As with the cyclone (20) (FIGS. 1; 2; 14), a bottom exit venturi, perhaps venturi injector possibly with recycled select product gas side-stream injection, may be provided that may work on differential pressure to periodically empty selectively separated carbonaceous material, such as char particulate material, perhaps recycled back such as into the pyrolysis track feeder or into a preliminary reformation coil. This may provide for the recycle recovery of carbonaceous materials, perhaps such as most all char organic carbon content, perhaps via the re-processing of recovered char particulate material within a preliminary reformation coil.

Two cyclones (23) (FIGS. 1; 2; 14), perhaps tertiary final polish cyclone classifiers, may be included and may be connected, perhaps flange connected, to an exit opening such as of a tertiary reformation coil (18) (FIGS. 1; 2; 5; 6; 7; 14). These perhaps may be provided as pipe arrangements in series with each other, and perhaps may selectively separate and remove any remaining carbonaceous materials or ash carry-through particulate material, for example perhaps in the particle size removal ranges of: 10% of 1 micron size particles being removed; 25% of 2 micron size particles being removed; 35% of 3 micron size particles being removed; and even 100% of 15 micron size (or above particle size) particles being removed. In embodiments, two series-staged polishing cyclones (23) may be utilized perhaps to ensure that any possible post contamination of carbonaceous materials, such as perhaps still reactive char materials, or ash substrate carrying through to contaminate final produced select product gas may be avoided. Further, an ash removal system, perhaps such as an auto-purge double air-lock valve system, may be employed such as to perhaps periodically empty any fine ash particulate material from such cyclones into an ash receiver system and automated removal section.

A gasifier process flow path in various embodiments may be routed through an ash removal area (78) (FIGS. 1; 2) of a solid carbonaceous materials gasifier system. This may be illustrated conceptually in one embodiment in FIGS. 1 & 2. In embodiments, fine particulate material perhaps may pass through a multiple coil carbonaceous reformation vessel. This fine particulate material may be substantially, perhaps even 95% or more, selectively separated via cyclones (23) (FIGS. 1; 2; 14). The majority of these selectively separated fine particulate materials may be inert and may exist as non-carbon and non-reactive ash substrate. Such ash substrate material may be selectively separated from the gasifier process flow path perhaps to eliminate nearly all particulate contamination and perhaps to ensure that a high quality purity of the final select product gas is maintained.

An ash removal handling system, perhaps airtight and pressurized, may be provided whereby two cyclones (23) (FIGS. 1; 2; 14) each may empty collected ash, perhaps via a sealed conduit pipe connection through a box furnace enclosure (26) (FIGS. 1; 2; 13; 14), and perhaps such as into smaller ash receiver tanks (24) (FIGS. 1; 2; 15). The ash may be withdrawn from the two cyclones perhaps through a dual airlock and triple, perhaps slide actuation, valve system (7) (FIGS. 1; 2; 15). In embodiments, as the top and bottom valves may actuate to the open position, the middle valve may remain closed. Intermittently, hot ash may fall by gravity into the top receiver tank and the bottom receiver tank (24) (FIGS. 1; 2; 15). Ash from the bottom receiver tank (perhaps somewhat cooled) may fall down and into an elliptical conveyor screw trough and separated ash recovery unit (25) (FIGS. 1; 2; 15) perhaps to be subsequently transported to adjacent mobile storage, perhaps cooling bins. Valves, such as slide valves (7) may be air-operated and may cycle open and closed on a reciprocal time basis perhaps such as perhaps approximately every 30 minutes or as controlled by process computer set-points. Adjustable time frequency of valve actuation may provide for additional ash cooling time to occur within the ash receiver tank (24). Further, ash receiver tanks and even the slide valve assemblies may be constructed of high temperature steel materials. The removed ash, perhaps as dependent upon the input carbonaceous feedstock chemical composition, may represent an item with resale potential as a high grade mineral fertilizer additive, and perhaps may be applied as a cementaceous filler in cement construction block manufacturing operations.

A solid carbonaceous materials gasifier system in various embodiments may generate a contaminated select product gas. Such contaminants may include perhaps simply any substances tending to reduce the quality of a select product gas. Examples of such contaminants may include for example chemical by-products, thermal by-products, pyrolytic decomposition by-products, carbonaceous reformation by-products, carbon dioxide, carbonate, insoluble solids, tar, phenol, hydrocarbon, and other particulates. Accordingly, embodiments may provide for isolating a significant number of contaminants and creating a scrubbed select product gas. This may be illustrated conceptually in process embodiments in FIGS. 1& 2. Such isolation may be accomplished in any suitable manner consistent with the principles discussed herein, for example perhaps by pyrolysis, screening, magnetism, vortex action, or the like. In some embodiments, such isolation may be accomplished by solubilizing the contaminants in a contaminant solubilization substance, perhaps as may be disposed within a select product gas components scrubber through which said gasifier process flow path may be routed. Such solubilization further may comprise increasing the purity of a select product gas, increasing the BTU value of a select product gas, minimizing contaminants within a select product gas, or perhaps even creating a scrubbed select product gas having one or more of these properties, consistent with the principles described herein.

A contaminant solubilization substance in certain embodiments may include a negatively electrostatically enhanced water species. Contaminant isolation may occur upon solubilization of contaminants in such a negatively electrostatically enhanced water species, perhaps via an oxidation reaction, a reduction reaction, an adsorption coagulation reaction, an absorption coagulation reaction, or the like. Accordingly, such solubilization may involve coagulating, separating, flocculating, precipitating, settling, condensing, polishing, filtering, removing via final polarized media polish filtration, and removing via electro-precipitation removal such contaminants.

Contaminant solubilization substances also perhaps may include chilled contaminant solubilization substances. For example, embodiments may include lowering the temperature of a select product gas via a chilled contaminant solubilization substance in a select product gas components scrubber, for example as from greater than about 1700° F. to less than about 175° F. Moreover, such use of a chilled contaminant solubilization substance to lower the temperature of a select product gas may prevent vitrification solidification of contaminants within the select product gas as it is cooled, with contaminants instead perhaps being solubilized in the contaminant solubilization substance with decontaminated select product gas being maintained in an unvitrified state.

Moreover, a select product gas components scrubber in various embodiments may include at least a primary solubilization environment and a secondary solubilization environment, for example perhaps a primary scrubber tank and a secondary scrubber tank. Such multiple solubilization environments perhaps may provide multiple stage scrubbing of a select product gas, for example as wherein one scrubbing stage may be insufficient to accomplish a desired level of scrubbing, or as wherein it may be desirable to spread various scrubbing steps over several stages, such as perhaps for reducing a temperature of a select product gas being scrubbed. For example, primarily solubilizing in a primary solubilization environment in some embodiments perhaps may be configured to lower a temperature a select product gas from greater than 1,700° F. to less than 550° F., and secondarily solubilizing in a secondary solubilization environment perhaps may be configured to lower a temperature a select product gas from greater than 450° F. to less than 150° F. Of course, multiple stage scrubbing may address other process parameters, for example as wherein a primary solubilization environment may be configured to remove 70% to 80% of contaminants from a select product gas, with a second solubilization environment configured to remove perhaps some additional fraction of remaining contaminants.

Accordingly, embodiments may involve mixing and injecting one or more negatively electrostatically enhanced water species, such as perhaps a large portion of ionized and perhaps highly reactive oxygen vapor gases perhaps utilizing singlet oxygen, into a select product gas components scrubber through which a gasifier process flow path may be routed. Contaminants entrained in the gasifier process flow path perhaps may then be solubilized into the water species. Such contaminants perhaps may be further removed from the water species in one or more of several separating devices which may be incorporated into the select product gas components scrubber. In such arrangements, negatively electrostatically enhanced water species and hot synthesis gas reaction contact may take place. Coalescence and oxidation of contaminants may occur and may cause $CO_2$ (perhaps oxidized to $CO_3$ agglomerates), insolubles, tars, phenols, and other hydrocarbon contaminants to flocculate, precipitate, and/or perhaps settle for final polarized media polish filtration electro-precipitation removal of said contaminants.

Moreover, embodiments of the inventive technology may provide additional select product gas final purification and cleanup systems. Some of these may be as specifically indicated in the depiction of an embodiment such as shown in a scrubber area (79), (FIGS. 1; 2; 16), which may include (but may not require) elements as follows:

element (27): an Insulated Crossover Pipe (perhaps 1800° F. Synthesis Gas) To Scrubber Tank Inlet Cylinder,
element (28): a Mix (perhaps Synthesis Gas/VIP™/Ionized Water) Injector Cylinder,
element (29): a VIP™ (Vapor Ion Plasma) Ionized Water And Synthesis Gas Primary Scrubber Tank With Temperature Reduction perhaps To 350° F.,
element (30): a VIP™ Ionized Water Spray Manifold,
element (31): a VIP™ Vapor Ion Plasma Generator,
element (32): a VIP™ Injection Ionized $H_2O$ Spray Diffusers,
element (33): a Recirculation Flow (perhaps Doubled Walled) Tank and chilled water separation tank, such as for Tar/Phenols Drop-Out,
element (34): an Auto-Control $H_2O$ Balance Valves,
element (35): a VIP™ Ionized Water and Synthesis Gas Secondary Scrubber Tank, such as for Final Hydrocarbon(s) Removal,
element (36): a Scrubber $H_2O$ Recycle Recirculation Pump,
element (37): a VIP™ Cooling $H_2O$ Return Manifold,
element (38): a Chilled Water Tank (Tars/Phenols) Bleed-Off Return perhaps As Recycle Recovery Back To a pyrolytic decomposition area (75) Track Feeder Devolatilization Zone, or perhaps To Be Separated In an auxiliary treatment area (76) Roto-Shear™ Concentrator Unit,
element (39): a Synthesis Gas (perhaps 350° F. Crossover) Pipe To Secondary Scrubber Tank,
element (40): a (perhaps Auto-Controlled) Temperature Chiller,
element (41): an Air/Liquid perhaps Serpentine Heat Exchanger,
element (42): a Delivery (perhaps 80° F.) Manifold To electrically filter (eFILT™) perhaps via a Polarized Media Filter,
element (43): an eFILT™ (perhaps Polarized Media Filter) Recirculation Pump,
element (44): an eFILT™ Influent Filtration Manifold,
element (45): an eFILT™ perhaps Polarized Media Filter, Per Fine (perhaps One Micron Particle Size) Solids Removal, Including "$CO_2$ Shift To $CO_3$" Removal,
element (46): a VIP™ Ionized $H_2O$ and Solids Slurry By-Pass Line to Embodiment (51),
element (47): a Filtered VIP™ perhaps Ionized $H_2O$ Recycle Return To Primary Scrubber Tank,
element (48): an eFILT™ Backwash Water To Holding and Settling Tank,
element (49): a Backwash $H_2O$ Slurry Holding and Settling Tank,
element (50): a Recirculation Chilled Water Separation Tank Overflow,
element (51): a Common (VIP™/Ionized $H_2O$/Solids) Return To Track Feeder Injection,
element (52): a Synthesis Gas Side-Stream Manifold Feed To Reactor Combustion Burner,
element (54): a Polish ($H_2O$ Removal) Coalescer and Condenser,
element (55): a Polish Synthesis Gas (Fine Micron) Filters,
element (56): a Backwash Solids Roto-Shear (rS™) Screw Concentrator and Separator,
element (57): a Scrubber Tank Level Indicator and Controller,
element (58): a System Components Overflow Drain Line,
element (59): an Overflow Holding Tank and a VIP™ Ionized $H_2O$ and Backwash $H_2O$ Collection Tank,
element (60): a Synthesis Gas Delivery Compressor,
element (61): a Drain Line To Systems Collection Receiver Flash-Evaporator Unit,
element (62): a VIP™ Ionized $H_2O$ Pump,
element (63): an Outside Makeup Water Line,
element (64): a Filter Backwash Water Input Line,
element (65): a Concentrated Solids Transfer To (perhaps External) Recovery Unit,
element (69): a Final $CO_2$ Separation (perhaps Molecular Sieve Unit) if required,
element (70): a Final Output Highly Purified [perhaps 550 BTU to 650 BTU] Synthesis Gas (perhaps Stripped of $NO_X$, $SO_X$, $CO_2$ and Organic Vapors) Stream, element (71): a Safety (perhaps Auto-Pressure) Relief Valve, element (72): an External Flare (perhaps Auto-Ignition) System, and element (73): a VIP™ Ionized $H_2O$ and Solids Slurry Pump.

In various embodiments, at least some isolated contaminants may be recycled within a solid carbonaceous materials gasifier system and reprocessed therein. Accordingly, embodiments may involve returning such isolated contaminants, for example via a contaminants recycle path appended to a select product gas components scrubber and returning to a contaminants recycle input of a gasifier process flow path. Moreover, such recycling may involve selecting a recycle path, perhaps as from a multiply routable path. Such a multiply routable path in some embodiments may be routed through a feedstock solids carbonaceous materials processor, a select product gas components scrubber, a contaminants recycle path, and a contaminants recycle input of a gasifier process flow path. Moreover, in various embodiments, routing a contaminants recycle path to a contaminants recycle input may involve routing to a recycle input of a pretreatment area, pyrolysis chamber, multiple coil carbonaceous reformation vessel, preliminary reformation coil of a multiple coil carbonaceous reformation vessel, secondary reformation coil of a multiple coil carbonaceous reformation vessel, or a tertiary coil of a carbonaceous reformation vessel. Additionally, a contaminants recycle path in various embodiments may include a venturi, or perhaps even a venturi injector, for example perhaps to assist in moving contaminants through the recycle path.

Various embodiments may include a select product gas components formation zone through which a gasifier process flow path is routed. Consistent with the principles described herein, such a select product gas components formation zone perhaps simply may be any portion of a gasifier process flow path in which select product gas components may be formed. For example, processing stages tending to generate carbon monoxide content select product gas components, hydrogen content select product gas components, or perhaps controlled molar ratio select product gas components may be select product gas components formation zones in various embodiments. Moreover, embodiments also may include a select product gas formation zone. Again, consistent with the principles described herein, such a select product gas formation zone perhaps simply may be any portion of a gasifier process flow path in which a select product gas may be formed. Of course, such a select product gas may include any of various characteristics as described elsewhere herein.

A gasifier process flow path in various embodiments may be routed through a product gas combustion preparation auxiliary treatment area (76) (FIGS. 1; 17). Embodiments may provide the return of a side-stream of produced select product gas, perhaps combustible 550 BTU to 650 BTU per pound, perhaps as from a produced select product gas outlet conduit pipe (52) (FIGS. 1; 2) to a combustive burner (14) (FIGS. 1; 2; 14). This may further extend from the produced gas outlet pipe (52) to provide an optional select product gas feed to a venturi feed pipe (53) (FIGS. 1; 2; 17), perhaps a venturi injector, providing inlet access to a multiple coil carbonaceous reformation vessel or the like. Combustion sustaining operations fuel may be autonomously provided by a recycle return, perhaps at a level of 15% or less of the total select product gas volume being generated.

Embodiments may include an air separation unit (66) (FIGS. 1; 2; 17), perhaps including an air intake and a nitrogen depletion area to deplete at least some nitrogen from taken in air. In this manner, a supply of enriched oxygen air flow may be generated and nitrogen content perhaps may be reduced within a solid carbonaceous materials gasifier system. For example, an oxygen enrichment line may be routed to a combustive burner whereby oxygen concentration input may be increased, for example perhaps such as by approximately 30%, which may in turn reduce a recycle requirement of select product gas such as to support furnace combustion operational temperatures, at a level of perhaps less than 10% of the recycle requirement. Moreover, an air separation unit (66) (FIGS. 1; 2; 17) may greatly deplete the nitrogen content in a combustion air intake stream, for example as may supply combustion operations at one or more combustive burners, which may substantially reduce process carry-through of nitrogen contaminants into the gasifier process flow path, including perhaps the final produced select product gas. Nitrogen oxides contamination and emission possibilities may be greatly reduced, eliminated, or may even become virtually non-existent. A combustion adjustable baffle proportioning flow air fan (67) (FIGS. 1; 2; 17) may be provided to meter atmospheric air intake, with recycled select product gas (perhaps with air separation unit (66) enriched oxygen air flow), perhaps as a forced draft combustible admixture gas flow into a combustive burner (14). Additionally, a side-stream oxygen enrichment line (68) (FIGS. 1; 2; 17) may be connected, perhaps as a bypass pipe connection, to a negatively electrostatically enhanced water species generation unit, for example perhaps one or more VIP™ Vapor Ion Plasma generator units (31) (FIGS. 1; 2; 10; 16). The input addition of a more concentrated oxygen addition to such units, for example such as an activated oxygen content, may greatly enhance the output of negative electrostatic enhancement species, for example perhaps vapor ion plasma singlet oxygen or peroxyl ion concentrations as injected into an ionized oxygen water stream, as may be applied throughout a solid carbonaceous materials gasifier system in various embodiments. Accordingly, embodiments may provide for a nitrogen depleted select product gas, which in fact may be a nitrogen oxide content minimized select product gas, a purified select product gas, or even a high BTU content select product gas.

Figure 23:
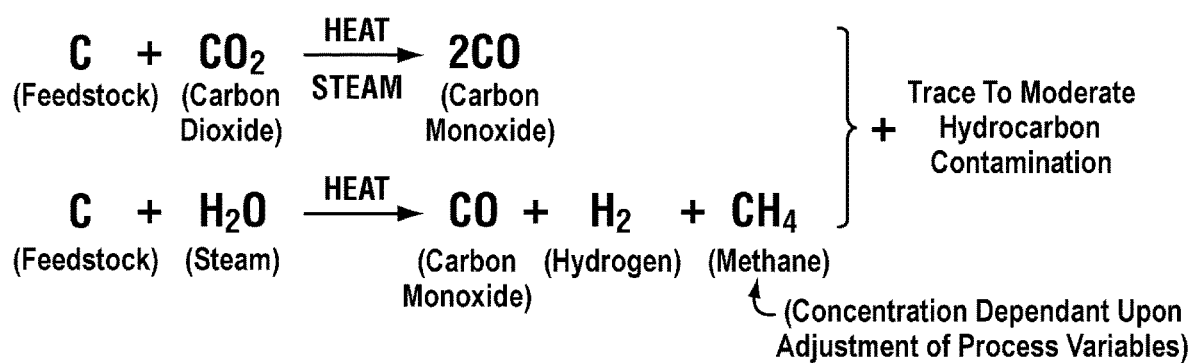
FIG. 23 is an exemplary chemical reaction sequence for the production of synthesis gas in some embodiments.

A solid carbonaceous materials gasifier system in various embodiments may subject to an input feedstock solids carbonaceous material to a variety of chemical reaction sequences. A basic chemical reaction sequence often considered in the production of synthesis gas may be represented in FIG. 23, though the inventive technology may be applicable to a variety of chemical reaction sequences and should not be considered as limited to just that which is shown in the Figure.

In some embodiments, process determinative parameters of the inventive technology may permit manipulation of this and other chemical reaction sequences, and indeed perhaps even non-chemical processing aspects, in a solid carbonaceous materials gasifier system to generate high energy content, purified, or even high yield select product gas, perhaps such as by finishing the chemical reaction sequence to substantial completion for a majority of or perhaps substantially all of the carbon content in a feedstock solids carbonaceous material. For example, embodiments may involve dynamically adjusting at least one such process determinative parameter, as perhaps with a dynamically adjustable process flow regulator. The dynamic character of such an adjustment may stem from the capability of effecting such adjustments while the gasifier system is operating. For example, embodiments may include sensing at least one process condition with a process condition sensor and adjusting at least one process determinative parameter with a sensor responsive dynamically adjustable flow regulator based on the sensed condition. Sensing, of course, may be accomplished in any of a variety of suitable manners, such as sensing a temperature, sensing a pressure, sensing a process materials composition, sensing a carbon monoxide content, sensing a carbon dioxide content, sensing a hydrogen content, sensing a nitrogen content, sensing a sulfur content, sensing via a gas chromatograph, sensing via a mass spectrometer, and the like. Similarly, any of a variety of adjustments may be dynamically affected in response by an appropriate process flow regulator, such as suitable inputs, injectors, separators, returns, timers, and the like. Examples of such adjustments may include adding water, adding preheated water, adding recycled water, adding a negatively electrostatically enhanced water species, adding a preheated negatively electrostatically enhanced water species, adding a recycled negatively electrostatically enhanced water species, adding steam, adding recycled steam, adding negatively electrostatically enhanced steam, adding recycled negatively electrostatically enhanced steam, adding flue gas, adding preheated flue gas, adding pressurized flue gas, adding recycled flue gas, adding a recycled incompletely pyrolytically decomposed carbonaceous material, adding a recycled incompletely reformed carbonaceous material, adding at least one recycled contaminant, adding at least some select product gas, adding at least some wet product gas, adding at least some dry select product gas, adding at least some recycled select product gas, varying a process retention time, varying a process flow rate, varying a process flow turbulence, varying a process flow cavitation, varying a selectively applied heat distribution among multiple reformation coils, varying a temperature gradient in a temperature varied environment, varying a liquefaction zone in a temperature varied environment, selectively separating a carbonaceously reformed material, and the like. In some embodiments, these parameters may be process determinative in that their adjustment may affect and therefore perhaps determine the outcome of solid carbonaceous materials processing in the gasifier system.

Moreover, such dynamic adjustments may be effected at any suitable point of a gasifier process flow path with an appropriate input, including perhaps at a pretreatment area, at a pyrolysis chamber, at a multiple coil carbonaceous reformation vessel, at a select product gas components scrubber, and the like, perhaps even as may be embodied in some embodiments in a modular section of such a gasifier system. Additionally consistent with the dynamic character of such adjustments, the adjustments perhaps may be automatically effected, perhaps such as by computer control. Such dynamic adjustments may permit fast response time implementation of the adjustments, perhaps in times as little as less than 0.5 seconds, less than 1 second, less than 2 seconds, less than 3 seconds, less than 4 seconds, less than 5 seconds, less than 10 seconds, less than 15 seconds, less than 30 seconds, less than 45 seconds, less than 60 seconds, less than 90 seconds, and the like.

Various embodiments of course may involve effecting these dynamic adjustments in a variety of suitable modalities. For example, embodiments may include establishing an adjustable set point and periodically testing a process condition. Such a set point may involve carrying out processing to a set specification, such as a set time, temperature, pressure, or the like. In this manner, periodically testing a process condition, for example by measuring a processing time, temperature, pressure, or the like, may allow determination of processing conditions relative to the set point and appropriate dynamic adjustment if actual processing conditions are off. Further examples of suitable modalities may include evaluating a feedstock solids carbonaceous material, as with perhaps a feedstock evaluation system, for example by characteristics such as chemistry, particle size, hardness, density, and the like, and responsively dynamically adjusting process flow conditions accordingly. In some embodiments, responsive dynamic adjustments may involve affecting a select product gas, for example perhaps by increasing the purity, increasing BTU content, reducing contaminants, or creating a select product gas having one or more of these properties.

Embodiments may involve affirmatively establishing a stoichiometrically objectivistic chemic environment. This perhaps may involve establishing conditions, as within a pressurized environment to which a feedstock solids carbonaceous material may be subjected, having as an object the conversion of the feedstock solids carbonaceous material into a desired product, for example perhaps a desired select product gas. Such an environment of courses may be chemic, which may involve chemical interactions in which one or more components of the feedstock solids carbonaceous material may participate, or perhaps even simply non-chemical conditions related to such chemical interactions, for example such as temperature conditions, pressure conditions, phase conditions, or the like. Stoichiometric analysis may be utilized to affirmatively identify significant relationships among the components of the feedstock solids carbonaceous material and the desired product, for example such as quantity amounts of such components or perhaps chemical reaction sequences by which the feedstock solids carbonaceous material may be converted into the desired product. Where appropriate, stoichiometric compensation may be utilized to add or remove chemical components according to the identified relationships, for example perhaps to create an overall balance of components in proportion to the identified relationships. In various embodiments, stoichiometric compensation may be accomplished in a solid carbonaceous materials gasifier system via stoichiometrically objectivistic adjustment compensators, for example such as any of various suitable inputs, outputs, injectors, purges, dynamically adjustable process flow regulators, and the like, consistent with the principles described herein.

Some embodiments may involve stoichiometrically controlling carbon content in a manner significantly appropriate for a select product gas. This perhaps may involve applying the stoichiometric principles described herein to the relationship between the carbon content of a feedstock solids carbonaceous material and a carbon content of an object select product gas to be produced. For example, such stoichiometric applications may involve changing carbon quantities through various processing stages of a solid carbonaceous materials gasifier system. Processing may involve adding carbon content throughout a gasifier process flow path, such as to ensure sufficient quantities of carbon for complete interaction with other processing materials throughout the various processing states of the solid carbonaceous materials gasifier system. An object may be to achieve a target carbon content in a select product gas, for example perhaps according to the molar ratios of chemical reaction sequences in which the feedstock solids carbonaceous material may participate, or perhaps to achieve desired molar ratios of carbon to other chemical components of the object select product gas. Of course, this may be merely one example as to how carbon content may be stoichiometrically controlled, and should not be construed to limit the manner in which stoichiometric control may be applied to carbon content consistent with the principles described herein. Additional examples of controlling carbon content may include adding carbon, adding carbon monoxide, adding flue gas, adding pressurized flue gas, adding preheated flue gas, adding an incompletely pyrolytically decomposed carbonaceous material, adding an incompletely reformed carbonaceous material, adding at least some select product gas, adding at least some wet select product gas, and adding at least some dry select product gas. Moreover, a stoichiometrically objectivistic adjustment compensator in various embodiments of course may include a stoichiometrically objectivistic carbon adjustment compensator.

Affirmatively establishing a stoichiometrically objectivistic chemic environment in some embodiments perhaps may involve simply varying an input feedstock solids carbonaceous material, perhaps as described elsewhere herein. Similarly, such establishing perhaps may involve simply varying an output select product gas, as in perhaps varying the select product gas qualities perhaps described elsewhere herein. Variations of input and output in this manner of course may vary the relationships among the input and output materials, perhaps creating suitable opportunity for application of the stoichiometric principles discussed herein.

In some embodiments, affirmatively establishing a stoichiometrically objectivistic chemic environment may involve selecting a product gas to output, evaluating a feedstock solids carbonaceous material input, and determining a chemical reaction sequence appropriate to yield the select product gas from the feedstock solids carbonaceous material. Evaluating a feedstock solids carbonaceous material of course may employ a stoichiometric evaluation, for example such as identifying proportions, quantities, and chemistry of constituent components of the feedstock solid carbonaceous material, perhaps even as may be in relation to possible chemical reaction sequences appropriate to yield the select product gas. A suitable evaluation system may be employed, for example such as a chemistry sensor, a temperature sensor, a pressure sensor, a materials composition sensor, a carbon monoxide sensor, a carbon dioxide sensor, a hydrogen sensor, a nitrogen sensor, a gas chromatograph, a mass spectrometer, or the like. Moreover, embodiments further may involve supplying chemical reactants on a stoichiometric basis, for example perhaps as in sufficient to satisfy the molar ratios of a chemical reaction sequence, sufficient to substantially completely chemically react the feedstock solids carbonaceous material, sufficient to produce a high output of select product gas, sufficient to temporally accelerate said chemical reaction sequence, or perhaps to effect other stoichiometrically objectivistic considerations. Supply of such chemical reactants of course may be effected with an appropriate stoichiometrically objectivistic chemical reactant input, for example perhaps a molar ratio input, a feedstock conversion input, a high output select product gas input, a catalyst input, or the like.

A flue gas in various embodiments perhaps may be utilized to affirmatively establish a stoichiometrically objectivistic chemic environment. For example, interaction of the flue gas with the chemic environment may create stoichiometrically objectivistic conditions, for example as wherein carbon content within a flue gas may contribute to stoichiometrically adjusting carbon levels within the chemic environment. Of course, this example simply may be illustrative of the stoichiometric properties of flue gas, and a flue gas may facilitate affirmative establishment of a stoichiometrically objectivistic chemic environment in other manners. Moreover, the modalities by which such flue gas may be stoichiometrically utilized may be consistent with principles described elsewhere herein. For example, a flue gas may be pressurized, perhaps to at least 80 psi. A flue gas may be preheated, perhaps to temperatures appropriate for a given processing stage such as at least 125° F., at least 135° F., at least 300° F., at least 600° F., or at least 1,640° F. A flue gas may be recycled, perhaps including recycling to a pretreatment area, recycling to a pyrolysis chamber, recycling to a multiple coil carbonaceous reformation vessel, recycling to a preliminary reformation coil of a multiple coil carbonaceous reformation vessel, recycling to a secondary reformation coil of a multiple coil carbonaceous reformation vessel, or recycling to a tertiary coil of a multiple coil carbonaceous reformation vessel. Moreover, the stoichiometric use of a flue gas may be considered to affect at least one process determinative parameter, perhaps as described elsewhere herein, perhaps such as by raising a temperature, maintaining a pressure, raising a pressure, chemically reacting, temporally accelerating a chemical reaction sequence, displacing at least some oxygen content from a feedstock solids carbonaceous material, displacing at least some water content from a feedstock solids carbonaceous material, affirmatively establishing a stoichiometrically objectivistic chemic environment for said feedstock solids carbonaceous material, and stoichiometrically controlling carbon content. Of course, the stoichiometric use of a flue gas may be effected by a suitable flue gas injector, consistent with the principles described herein.

In various embodiments, affirmatively establishing a stoichiometrically objectivistic chemic environment may include adding process beneficial materials and purging process superfluous materials. Adding process beneficial materials perhaps may simply involve adding materials to a process environment tending to benefit stoichiometric conditions, for example such as supplying materials to balance quantities in proportion to the molar ratios of a chemical reaction sequence or perhaps adding materials to induce or catalyze such chemical reaction sequences. Examples of process beneficial materials may include but may not be limited to carbon, hydrogen, carbon monoxide, water, preheated water, a negatively electrostatically enhanced water species, steam, negatively electrostatically enhanced steam, select product gas, wet select product gas, and dry select product gas. Similarly, purging process superfluous materials perhaps may simply involve removing materials superfluous, or perhaps even deleterious, to stoichiometric conditions, perhaps such as contaminants or even excesses of process materials that perhaps may be better utilized through recycling. Examples of purging process superfluous materials may include but may not be limited to purging oxygen, purging nitrogen, or perhaps even oxidizing metals and electrostatically attracting such oxidized metals. Of course, such adding and purging may be accomplished by any suitable input or purge consistent with the principles described herein.

Some embodiments may involve affirmatively establishing a stoichiometrically objectivistic chemic environment by using recycling, perhaps as described elsewhere herein. The stoichiometric principles in such embodiments may be the same as have been described, with perhaps utilized materials simply being recycled materials appropriately returned from various areas of a solid carbonaceous materials gasifier system.

Affirmatively establishing a stoichiometrically objectivistic chemic environment in certain embodiments may include sensing at least one process conditions and dynamically adjusting at least one process determinative parameter, perhaps as described elsewhere herein. Such establishing in some embodiments also may include evaluating a feedstock solids carbonaceous material and responsively dynamically adjusting at least one process determinative parameter, again perhaps as described elsewhere herein. In some embodiments, affirmatively establishing a stoichiometrically objectivistic chemic environment may involve removing water from a feedstock solids carbonaceous material at a water critical pass through, which perhaps may be a critical temperature and pressure for a given feedstock solids carbonaceous material at which water may pass out of the feedstock.

Certain embodiments may affirmatively establish a stoichiometrically objectivistic chemic environment in multiple stages. For example, such establishing may involve preheating a feedstock solids carbonaceous material, controlling oxygen content within the feedstock, as perhaps with an oxygen displacement system, and pyrolytically decomposing the feedstock solids carbonaceous material. Of course, this example may be merely illustrative of how a stoichiometrically objectivistic chemic environment may be established in multiple stages, and should not be construed to limit the manner in which such multiple stage establishment may be effected.

Various embodiments may involve affecting processing within a solid carbonaceous materials gasifier system with negatively electrostatically enhanced water species. For example, embodiments may include injecting negatively electrostatically enhanced water species into a gasifier process flow path, or perhaps even gasifier system components through which the gasifier process flow path is routed, perhaps by using a negatively electrostatically enhanced water species injector, routing a gasifier process flow path by a negatively electrostatically enhanced water species injector, and the like. The injection of a negatively electrostatically enhanced water species in such a manner perhaps may bring it into contact with carbonaceous materials entrained in a gasifier process flow path, including for example perhaps at a pretreatment area, a pyrolysis chamber, a multiple coil carbonaceous reformation vessel, a select product gas components scrubber, and the like.

In some embodiments, a negatively electrostatically enhanced water species may include an aqueous solution having a net negative charge, as perhaps having a negatively charged species content exceeding a contaminant background demand for the negatively charged species content. Examples of a negatively electrostatically enhanced water species in various embodiments may include an aqueous solution containing saturated hydrogen peroxide and negatively charged oxygen, an aqueous solution containing saturated hydrogen peroxide and singlet molecular oxygen, an aqueous solution containing saturated hydrogen peroxide and hydroxide, an aqueous solution containing saturated hydrogen peroxide and hydroxide radicals, an aqueous solution containing long-chain negatively charged oxygen species, a peroxyl activated aqueous solution, a nitroxyl activated aqueous solution, an oxygenated aqueous solution, an ionized oxygen vapor aqueous solution, and the like.

A negatively electrostatically enhanced water species in some embodiments perhaps may be preheated. Of course, preheating may be accomplished in any suitable manner consistent with the principles described herein, for example perhaps using a suitable preheater, perhaps such as a combustive burner or electric heater. In certain embodiments, a preheater for a negatively electrostatically enhanced water species perhaps may be a gasifier system process enclosure, such as perhaps a pyrolysis chamber enclosure, a multiple coil carbonaceous reformation vessel enclosure, or perhaps even a box furnace enclosure (26) (FIGS. 1; 2; 13; 14). Moreover, preheating a negatively electrostatically enhanced water species of course may generate steam, perhaps negatively electrostatically enhanced steam.

The manner in which a negatively electrostatically enhanced water species may affect processing within a solid carbonaceous materials gasifier system may be selected to achieve a desired result, for example perhaps to increase the purity of a select product gas, increase the BTU value of a select product gas, minimize contaminants in a select product gas, and the like. Such desired results may be considered to be, for example, injection products following the injection of a negatively electrostatically enhanced water species into a gasifier process flow path. Moreover, the use of a negatively electrostatically enhanced water species in this way perhaps even may be considered as one example of dynamically adjusting a process determinative parameter. For example, affecting processing perhaps may involve chemically reacting a negatively electrostatically enhanced water species, as perhaps with carbonaceous materials entrained in a gasifier process flow path. In such embodiments, the negatively electrostatically enhanced water species simply may be chemical reactant participating one or more chemical reaction sequences with the carbonaceous material, for example as to perhaps produce hydrogen select product gas components, produce carbon select product gas components, decrease hydrocarbon contaminants, increase carbon monoxide, increase hydrogen gas, and the like. Moreover, utilizing a negatively electrostatically enhanced water species as a chemical reactant perhaps may involve using it as catalyst, for example perhaps to temporally accelerate one or more chemical reaction sequences, or perhaps even to maximize the yield of one or more chemical reaction sequences. In some embodiments, such uses of a negatively electrostatically enhanced water species even perhaps may be part of affirmatively establishing a stoichiometrically objectivistic chemic environment and stoichiometrically controlling carbon content. Some embodiments may involve coactively utilizing a negatively electrostatically enhanced water species with other process materials, for example perhaps injecting a negatively electrostatically enhanced coactively with a flue gas.

Accordingly, negatively electrostatically enhanced water species may be use in a variety of processing application within a solid carbonaceous materials gasifier system. In embodiments having specific input feedstock solids carbonaceous materials chemistry, adjustable volumes of selected negatively electrostatically enhanced water species may be provided, for example such as more reactive ionized oxygen water, and perhaps may be injected and perhaps vapor released into a gasifier process flow path, as perhaps into one or more carbonaceous reformation coils of a multiple coil carbonaceous reformation vessel. This perhaps may also cause additional thermal steam vapor-cavitation turbulence reactions. The presence of a negatively electrostatically enhanced water species in the gasifier process flow path may provide much faster and more complete carbon conversion and steam reformation reactions to occur, for example such as within a pyrolysis chamber. Additionally, embodiments may have the capability to dynamically adjust process determinative parameters that may achieve a generation of optimum select product gas production energy ratios, decrease of $CO_2$ contamination, and increase or adjustment of desired higher energy output ratios of hydrogen and carbon monoxide, perhaps including the capability of process adjustments to yield higher output percentage fractions of methane content.

Moreover, negatively electrostatically enhanced water species may be recycled, perhaps to achieve nearly 100% recycling, as perhaps in a closed loop process within a solid carbonaceous materials gasifier system, and as to perhaps even exceed an environmental standard for recycling such a negatively electrostatically enhanced water species. In various embodiments, such recycled negatively electrostatically enhanced water species may be a recovered contaminant solubilization substance from a select product gas components scrubber. Through recycling, negatively electrostatically enhanced water species, such as perhaps ionized and perhaps peroxide saturated water, may be constantly provided to meet various process water control volume requirements within the solid carbonaceous materials gasifier system. For example, recycle uses of negatively electrostatically enhanced water species may include recycling to a pretreatment area, recycling to a pyrolysis chamber, recycling to a multiple coil carbonaceous reformation vessel, solubilizing a flue gas in a recycled negatively electrostatically enhanced water species, re-solubilizing at least one contaminant in a recycled negatively electrostatically enhanced water species, regenerating a negatively electrostatically enhanced water species, and generating steam from a negatively electrostatically enhanced water species Within the select product gas components scrubber, accelerated oxidizing and reducing negatively electrostatically enhanced water species recycle applications, perhaps as in-situ chemistry applications, along with chilled water condensing, perhaps may be applied which may provide for the isolation of items such as soluble tar, phenols, organic hydrocarbon vapors, particulate contaminants, and perhaps even soluble $CO_2$ and sulfur removals from various select product gas components, perhaps to produce a scrubbed select product gas. Recycled negatively electrostatically enhanced water species, as perhaps from a select product gas components scrubber, also may be used to scrub flue gas to maintain flue exhaust gas environmental air quality at or near zero discharge compliance, whenever flue gas may be discharged into the atmosphere.

Figure 10:
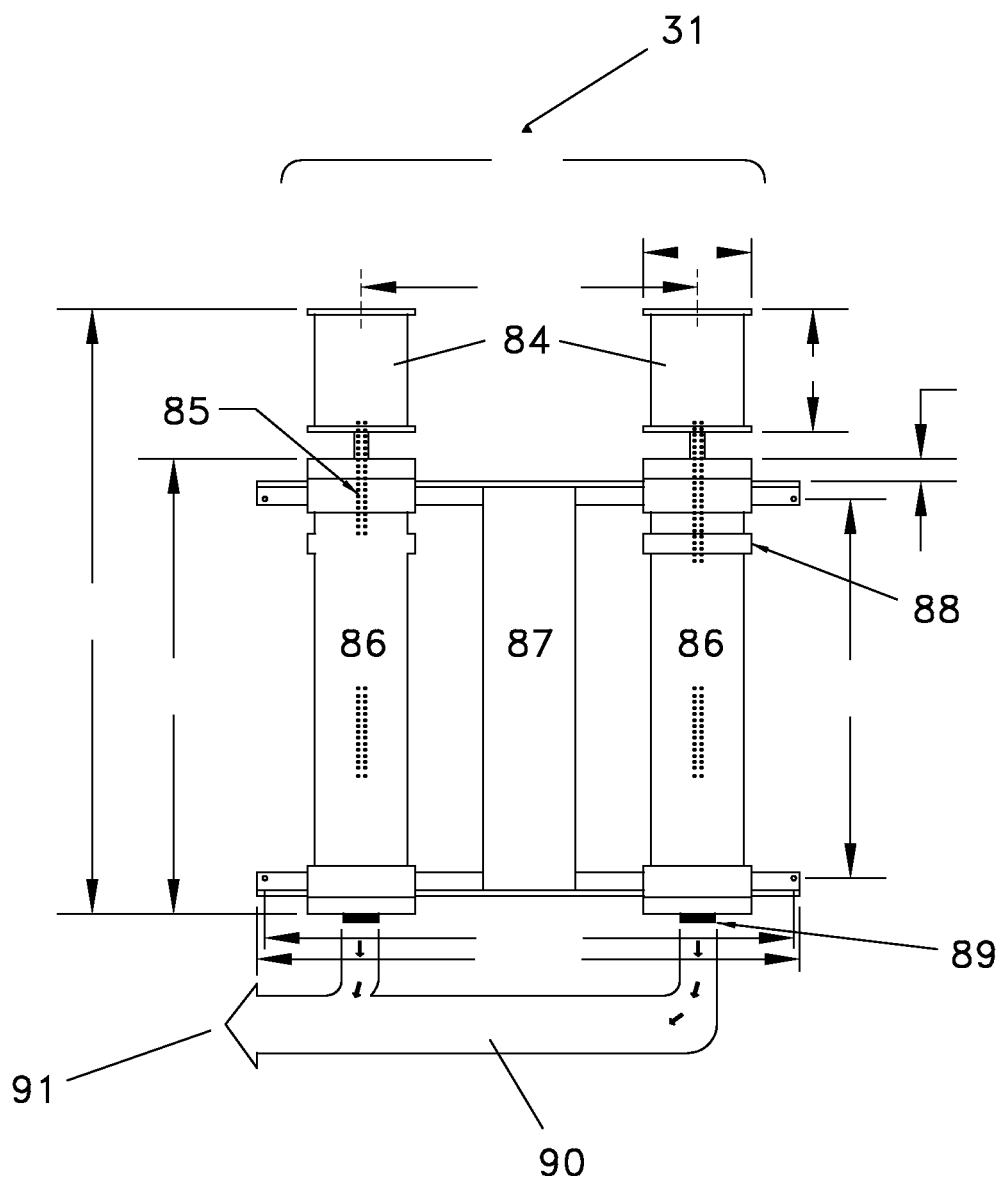
FIG. 10 is a diagrammatic view of a negatively electrostatically enhanced water species generation unit in one embodiment.
Figure 11:
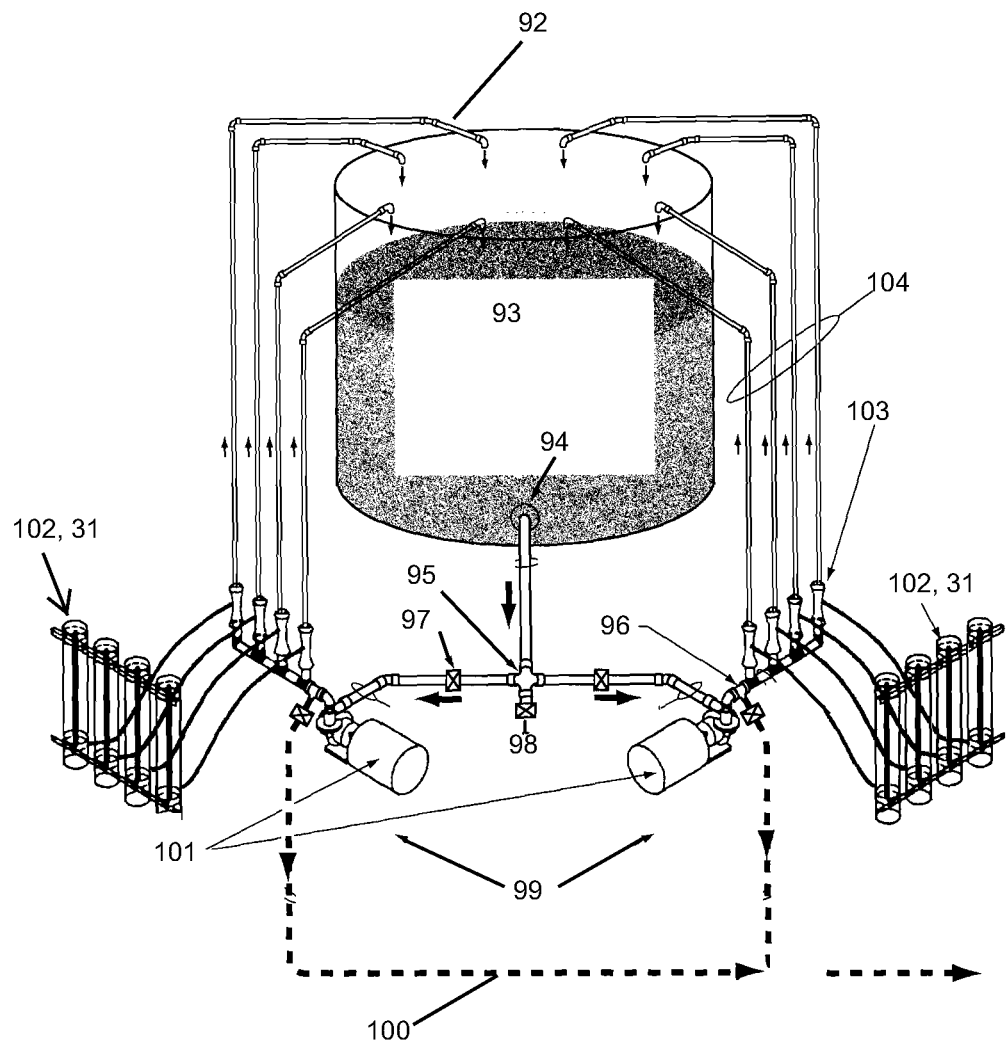
FIG. 11 is a diagrammatic view of a select product gas components scrubber in one embodiment.
Figure 12:
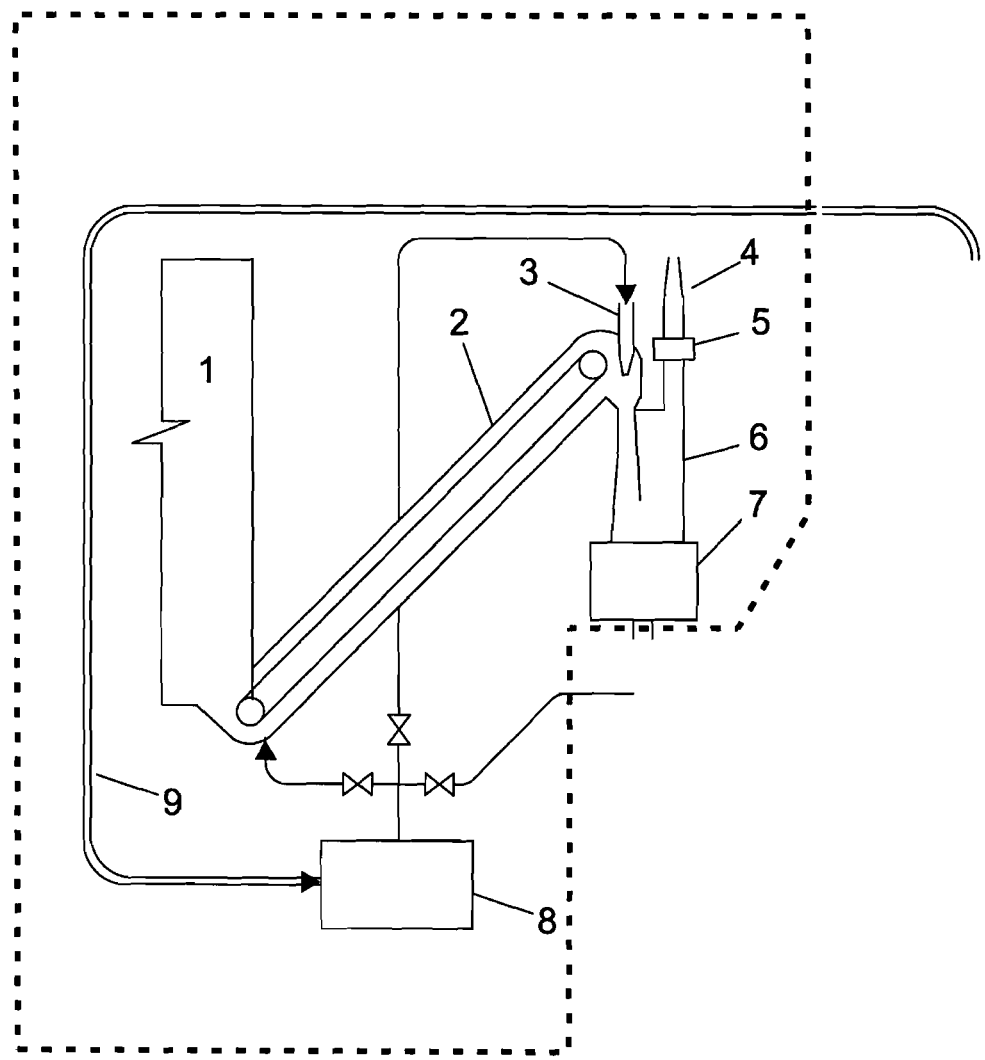
FIG. 12 is a conceptual view of a pretreatment area of a solid carbonaceous materials gasifier system in one embodiment.
Figure 13:
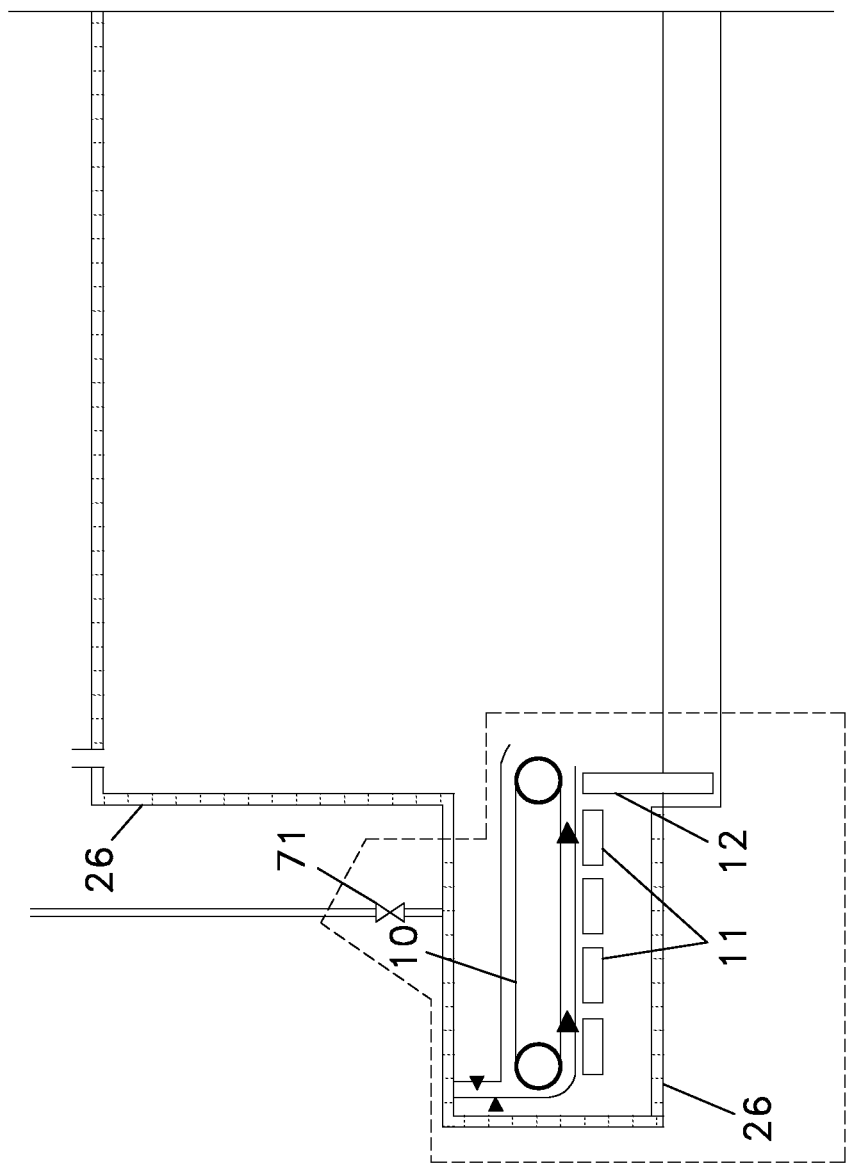
FIG. 13 is a conceptual view of a pyrolytic decomposition area of a solid carbonaceous materials gasifier system in one embodiment.
Figure 14:
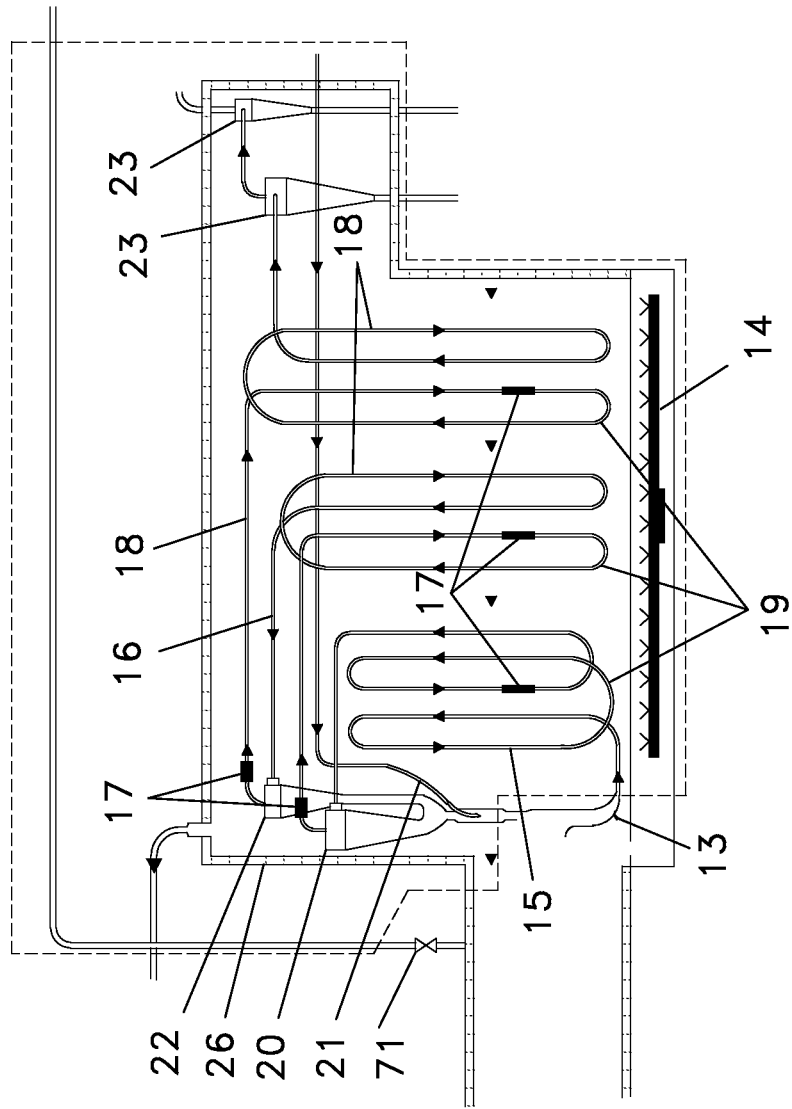
FIG. 14 is a conceptual view of a carbonaceous materials reformation area of a solid carbonaceous materials gasifier system in one embodiment.
Figure 15:
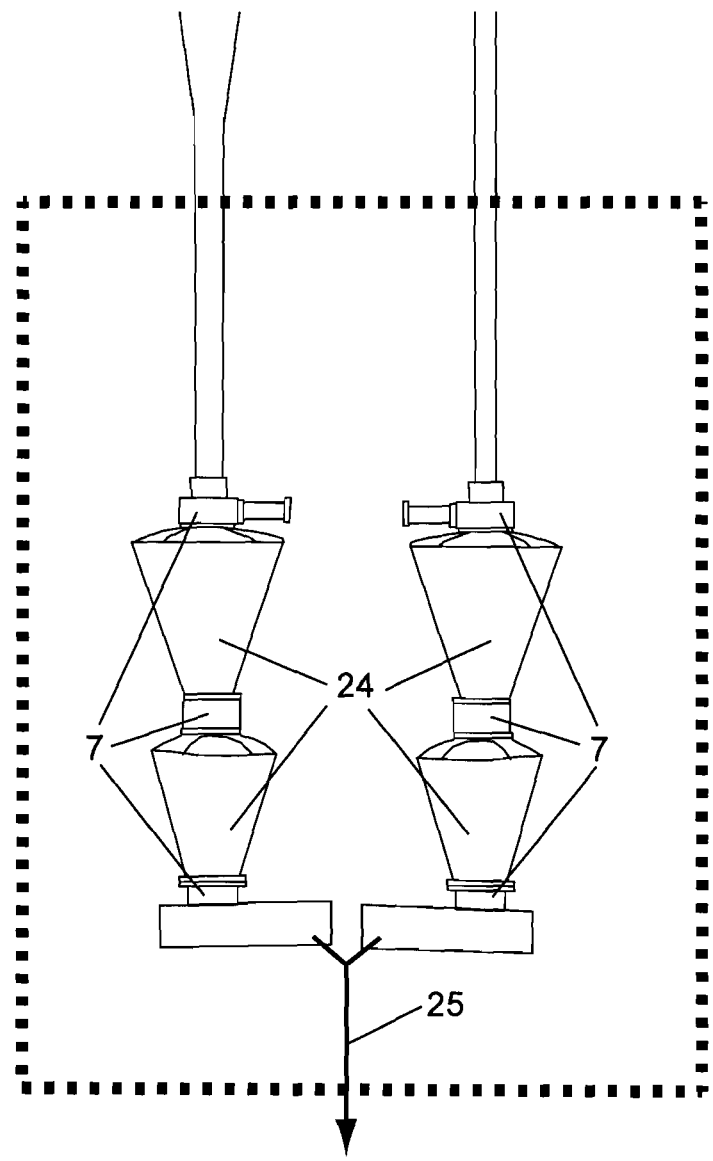
FIG. 15 is a conceptual view of an ash removal area of a solid carbonaceous materials gasifier system in one embodiment.
Figure 16:
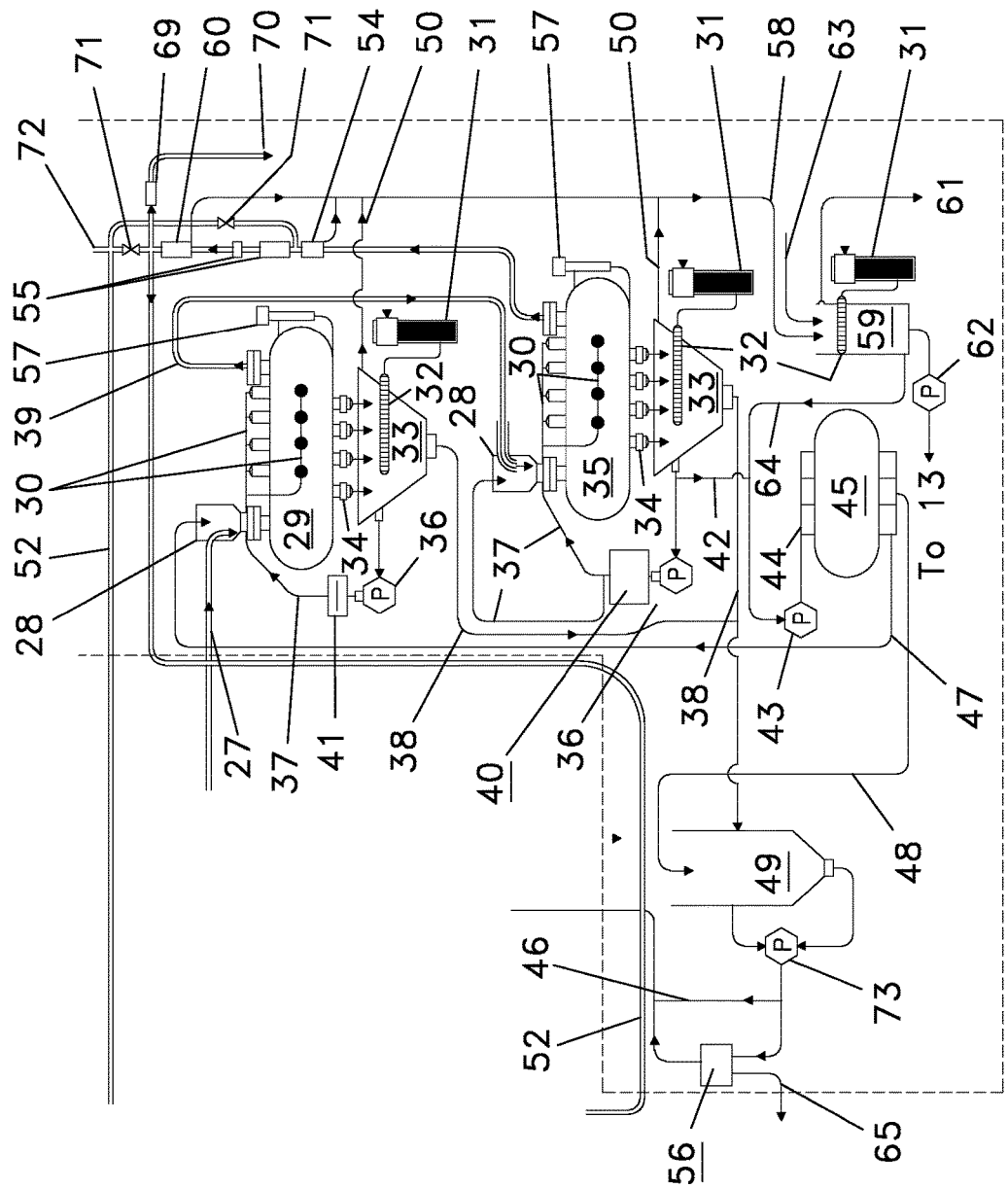
FIG. 16 is a conceptual view of a scrubber area of a solid carbonaceous materials gasifier system in one embodiment.
Figure 17:
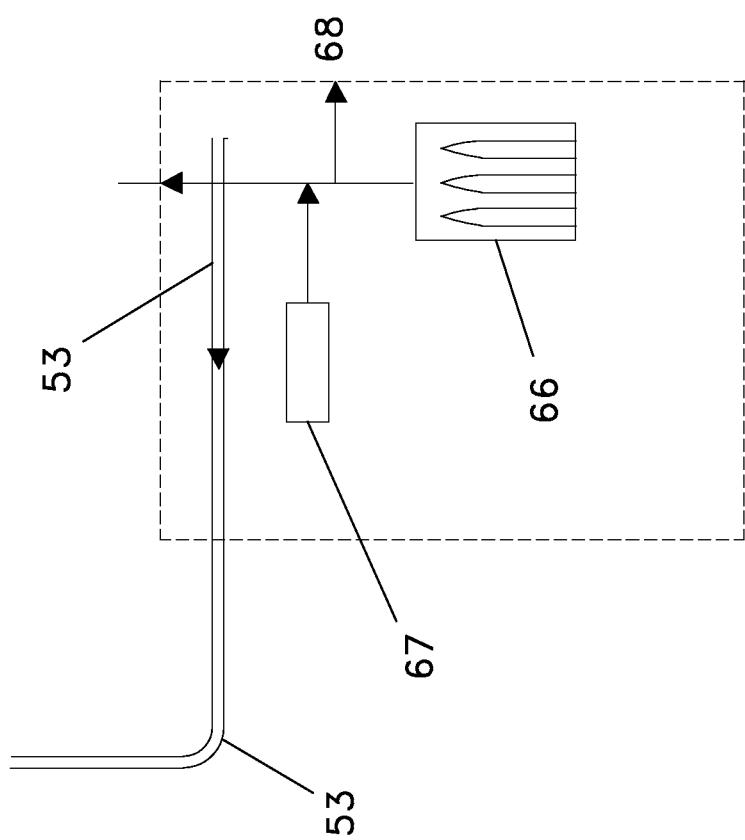
FIG. 17 is a conceptual view of an auxiliary-treatment area of a solid carbonaceous materials gasifier system in one embodiment.

A negatively electrostatically enhanced water species may be generated in various embodiments perhaps by a negatively electrostatically enhanced water species generation unit. Such a unit perhaps even may be integrated into a solid carbonaceous materials gasifier system, such as perhaps to permit on-site generation of negatively electrostatically enhanced water species and direct communication with a gasifier process flow path. For example, such a unit may be joined to a negatively electrostatically enhanced water species injector of a select product gas components scrubber. In embodiments, an initial generation of perhaps ionized oxygen vapors may take place within a negatively electrostatically enhanced water species generation unit, perhaps a gas ionization cylindrical system (31) such as shown in FIGS. 1; 2; 10; 11; 16. This may provide an efficient and perhaps high rate production of reactive and activated oxygen and ionized vapors. Such a unit in some embodiments may be a VIP™ vapor ion plasma generator, although such should use not to be taken to limit the inventive technology only to such embodiments. The use of a negatively electrostatically enhanced water species generation unit, again perhaps such as a VIP™, may refer to the production of ionized oxygen, associated peroxyl vapor gas ions, or the like. Such a negatively electrostatically enhanced water species generation unit may provide an efficient contaminant solubilization substance treatment unit. The components perhaps may be optimized to generate a plethora of highly reactive singlet oxygen species from oxygen in air. Such may occur under circumstances also encouraging secondary recombination with water, perhaps water vapor or steam vapor, such as to perhaps produce additional hydroxide and hydrogen peroxide gas vapor ions. In various embodiments, such as shown in FIGS. 10 & 11, a negatively electrostatically enhanced water species generation unit may include, but may not require, elements as follows:

element (84) LECTRON Power Supply Module
element (85) LECTRON "Plasma (Variable) Emission" Generator
element (86) (Air-Cooled) Aluminum "Spectral-Physics" Ionization Reactor element (87) Primary Electronic power Supply Module
element (88) AIR-INTAKE (1.5" Wide "Ring" Intake Air Filter (Atmospheric Nitrogen/Oxygen Air as the Ambient Treatment Source)
element (89) VIP-™ Generated Vapor Ion (Out-Take) Delivery Port
element (90) $O_2/O_2/0$-$0/e$/OH Gas Vapor Ions (also generates $H_2O_2$ & Intermediate "Reaction By-Products" of Above)
element (91) Pump Injection ("Vortex Eduction") Into Contaminated Water Flow
element (92) 45 degree Return Line Rotation
element (93) Recirculation Flow Scrubber (Vapor Spray) "Ionized H2O" contact tank
element (94) 3" Dia. Pipe Flange Connection
element (95) 3" Cross
element (96) 3"×2" Reducing Tee
element (97) 3" Valve
element (98) Drain
element (99) (Optimal) Dual System Treatment Modules
element (100) Flow to Process Treatment "Entrained-Flow Gasifier" Equipment
element (101) 7.5 H.P. Venturi Injector Pumps (#316 Stainless Steel Construction)
element (102) (4) VIP-™ Hi-Intensity "Ionized Oxygen" Generators
element (103) (4) Venturi Injectors—All 1" Thread Connections
element (104) 1" Dia. Stainless Steel (Each Venturi) Return Piping The generation of negatively electrostatically enhanced water species may involve the use of singlet oxygen. This species of ionized oxygen may be referred to in academic and published literature as the superoxide ion. Superoxide vapor ions perhaps may be employed since they may be capable of strong oxidation or reduction reactions. In embodiments, the superoxide ion may be produced in conjunction with a solid carbonaceous materials gasifier system perhaps to generate negatively electrostatically enhanced water species, for example perhaps by combining a singlet oxygen species with water and generating long-chain negatively charged oxygen species, hydroxide, hydrogen peroxide, peroxyl, or the like. Moreover, such use of singlet oxygen may produce multiple beneficial processing effects. For example, negatively electrostatically enhanced water species produced from such singlet oxygen may be utilized in carbonaceous reformation, as perhaps in thermal conversion, steam reformation, devolatilization and the like, perhaps within one or more reformation coils of a multiple coil carbonaceous reformation vessel. Further examples may include the release of negatively electrostatically enhanced water species, perhaps $HO_2^-$ peroxyl scavenger and highly reactive steam vapor ions, within and throughout a multiple coil carbonaceous reformation vessel in certain embodiments.

Figure 24:
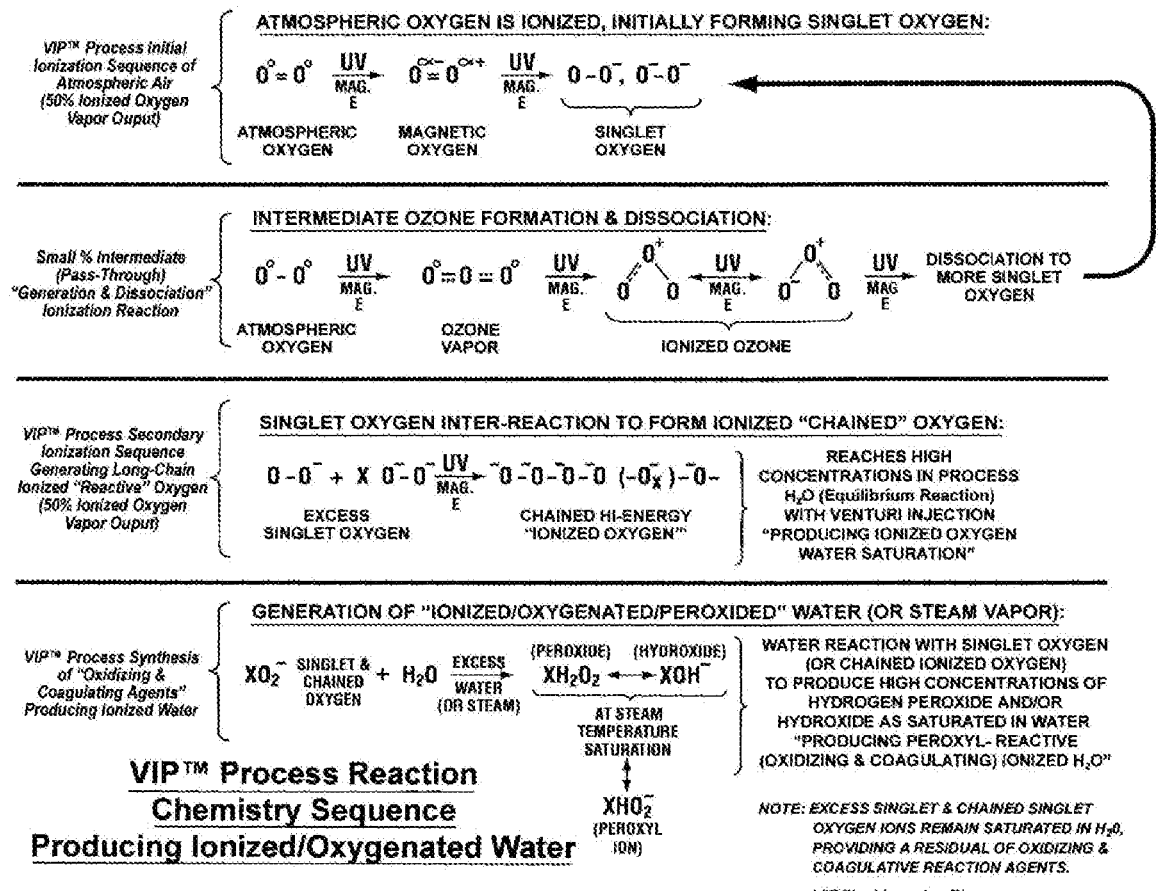
FIG. 24 are exemplary chemical reaction sequences whereby some negative electrostatic enhancement species may be formed in some embodiments.

FIG. 24 illustrates what may be representative of some of the major chemical reaction sequences whereby various negative electrostatic enhancement species, perhaps for use in generating a negatively electrostatically enhanced water species and perhaps including singlet molecular oxygen ions, may be formed. Of course these are merely illustrative of such chemical reaction sequences and should not be construed to limit the inventive technology thereby. FIG. 24 may show a reaction of atmospheric oxygen, under the influence of short-wavelength ultraviolet energy ("UV") and a magnetic field (referenced by the symbols "MAG. E") as it may form a polarized or magnetic oxygen molecule, and thence may dissociate into singlet molecular oxygen ion species (also known as Superoxide Ions), which may be highly reactive. FIG. 24 also may show the formation of ozone, which in itself may be extremely reactive, and which also may dissociate to form singlet molecular oxygen ions. FIG. 24 also may show that the singlet molecular oxygen gas may further react with water vapor and may form hydrogen peroxide and perhaps hydroxide radicals. As illustrated by FIG. 24, the ionized oxygen may also react to form various combinations of hydrogen peroxide and/or hydroxide in water.

Various embodiments may involve producing a flue gas within a solid carbonaceous materials gasifier system, for example perhaps within a flue gas generation zone of the gasifier system. Such a flue gas generation zone may include for example a gasifier system process enclosure, perhaps as wherein a combustive burner may produce flue gas and may be enclosed within a combustive heat enclosure to heat part of a gasifier process flow path. Moreover, such produced flue gas in embodiments may be recycled to other areas of the gasifier system, perhaps such as to a pretreatment area, a pyrolysis chamber, a multiple coil carbonaceous reformation vessel, a preliminary reformation coil of a multiple coil carbonaceous reformation vessel, a secondary reformation coil of a carbonaceous reformation vessel, a tertiary reformation coil of a carbonaceous reformation vessel, or the like. Such recycling may involve routing recycled flue gas via a flue gas recycle path appended to the flue gas generation zone, perhaps to a flue gas recycle input of a gasifier process flow path, wherein the recycled flue gas perhaps may be injected into the gasifier process flow path as with a flue gas injector.

Recycled flue gas of course may be used in any appropriate manner consistent with the principles described herein, such as perhaps to affect a process determinative parameter of the gasifier system. For example, affecting a process determinative parameter may include raising a temperature, wherein a flue gas injector may be configured as a heater. Affecting a process determinative parameter also may include maintaining or raising a pressure, in which a flue gas injector may be configured as a pressure system. Affecting a process determinative parameter further may include chemically reacting a flue gas or temporally accelerating a chemical reaction sequence with a flue gas, in which a flue gas injector may be configured as a chemical reactant injector or perhaps even a catalyst injector as appropriate. Affecting a process determinative parameter also may include displacing oxygen content or water content from a feedstock solids carbonaceous material, in which a flue gas injector may be configured as an oxygen displacement system or a water displacement system, respectively. Affecting a process determinative parameter also may involve affirmatively establishing a stoichiometrically objectivistic chemic environment and stoichiometrically controlling carbon content, in which a flue gas injector may be configured as a stoichiometrically objectivistic carbon compensator. Moreover, pressurizing a flue gas may be for example perhaps to at least 80 psi, and preheating a flue gas may be for example to at least 125° F., at least 135° F., at least 300° F., at least 600° F., or even at least 1,640° F.

Various embodiments may involve selectively adjusting a process flow rate through a gasifier process flow path, for example perhaps with a selectively adjustable flow rate regulator. Adjusting such a process flow rate for example may include adjusting the flow characteristics of carbonaceous materials entrained in the gasifier process flow path. One example in various embodiments may involve regulating a pressure to velocity ratio for a process flow through a multiple coil carbonaceous reformation vessel, such as maintaining a pressure of at least 80 psi, maintaining a flow rate of at least 5,000 feet per minute, or perhaps maintaining a Reynolds Number value of at least 20,000. Another example in various embodiments may involve dominatively pyrolytically decomposing a feedstock solids carbonaceous material and acceleratedly carbonaceously reforming the dominatively pyrolytically decomposed feedstock solids carbonaceous material, for example as wherein the feedstock solid carbonaceous material may be retained within a pyrolysis chamber for greater than about 4 minutes, and wherein the pyrolytically decomposed carbonaceous material may be carbonaceously reformed from about 4 seconds to about 10 seconds.

Figure 8:
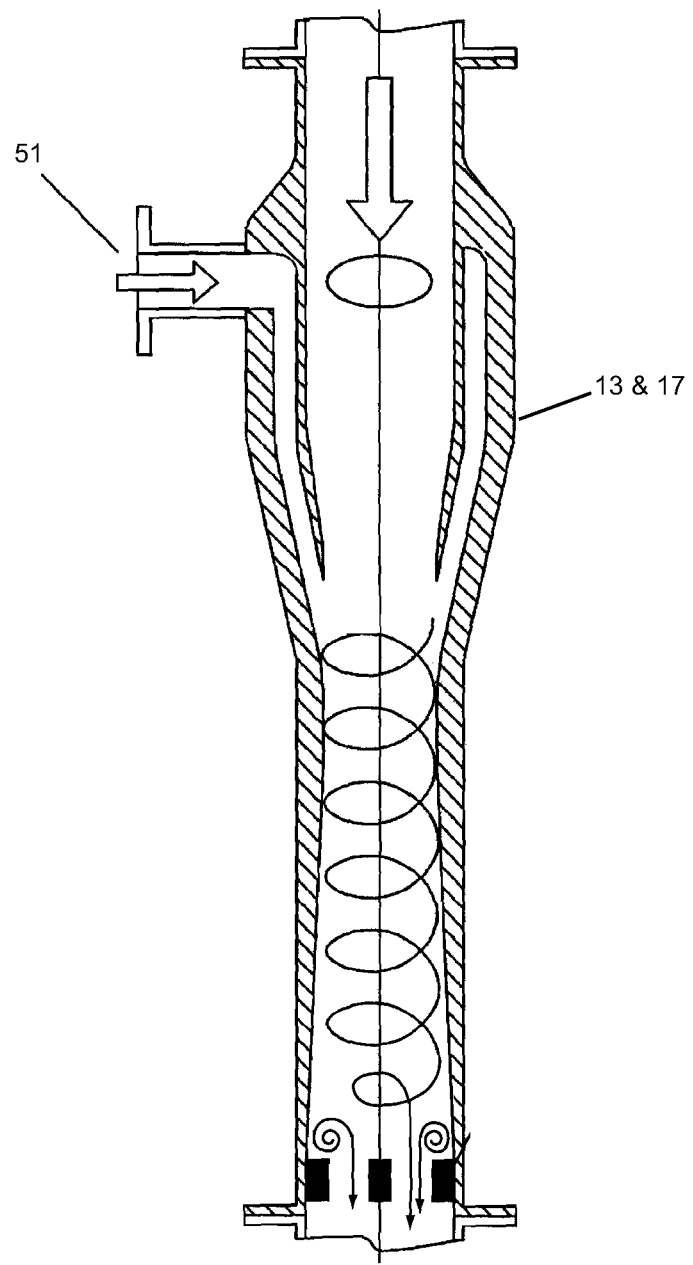
FIG. 8 is a side cutaway view of a venturi injector in one embodiment.
Figure 9:
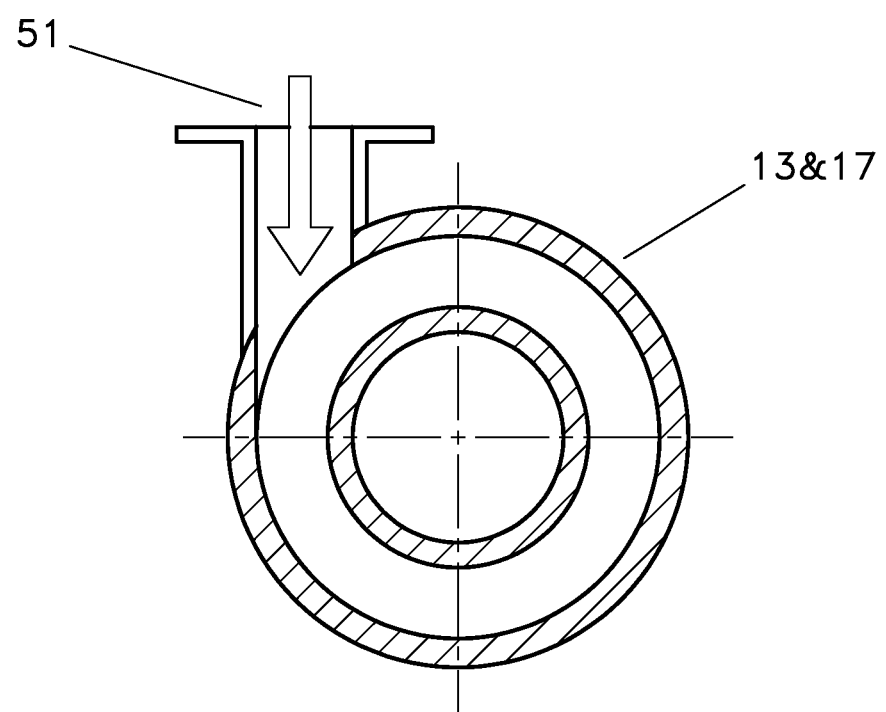
FIG. 9 is a cross section view of a venturi injector in one embodiment.

In some embodiments, selectively adjusting a process flow rate may be accomplished with a venturi injector, perhaps to regulate a process flow rate. A venturi injector perhaps may regulate a process flow by utilizing Bernoulli effects achieved through a tube of varied constriction, perhaps configured in the form of a venturi. In some embodiments, a venturi injector (17) (FIGS. 1; 2; 8; 9; 14) may provide a cavitation or other high-mix turbulence unit, perhaps point source, that may contribute to increasing higher efficiency steam reformation contact, perhaps with pass-through carbon particulate material. The venturi injector design (17) (FIGS. 1; 2) illustrated in FIG. 8; 9 may include an input, perhaps a steam input, a negatively electrostatically enhanced water species input, or a select product gas input, such as at an injection port (51) (FIGS. 1; 2), whereby complete rotational flow turbulent mixing of an input substance may be provided. For example, reformation coil reaction rates, perhaps as in a multiple coil carbonaceous reformation vessel, may be accelerated with the reactants mixing or cavitationally impinging upon one another. Substantial mixing, including perhaps greater than 90% mix-atomization turbulence and perhaps even near 100% mix-atomization turbulence, perhaps may also occur in the process flow passing through the venturi injector throat body. Also, the exit port body of the venturi injector perhaps may be fitted with a stop-block ring, which may create an additional zone of intense and secondary turbulence, perhaps by impeding the process flow.

An injection port (51) may be disposed on a venturi injector (17) in any suitable configuration, for example perhaps tangentially positioned at the throat of the venturi injector (17). Moreover, an injection port (51) of course may be configured to inject any suitable substance into the venturi injector (17), and of course consequently venturi inject the substance into a gasifier process flow path, consistent with the principles described herein. For example, an injection port (51) in various embodiments may include a flue gas injection port, a pressurized flue gas injection port, a preheated flue gas injection port, a recycled flue gas injection port, a water injection port, a preheated water injection port, a recycled water injection port, a negatively electrostatically enhanced water species injection port, a preheated negatively electrostatically enhanced water species injection port, a recycled negatively electrostatically enhanced water species injection port, a steam injection port, a recycled steam injection port, a negatively electrostatically enhanced steam injection port, a recycled negatively electrostatically enhanced steam injection port, a select product gas injection port, a wet select product gas injection port, a dry select product gas injection port, and a recycled select product gas injection port.

Figure 2:
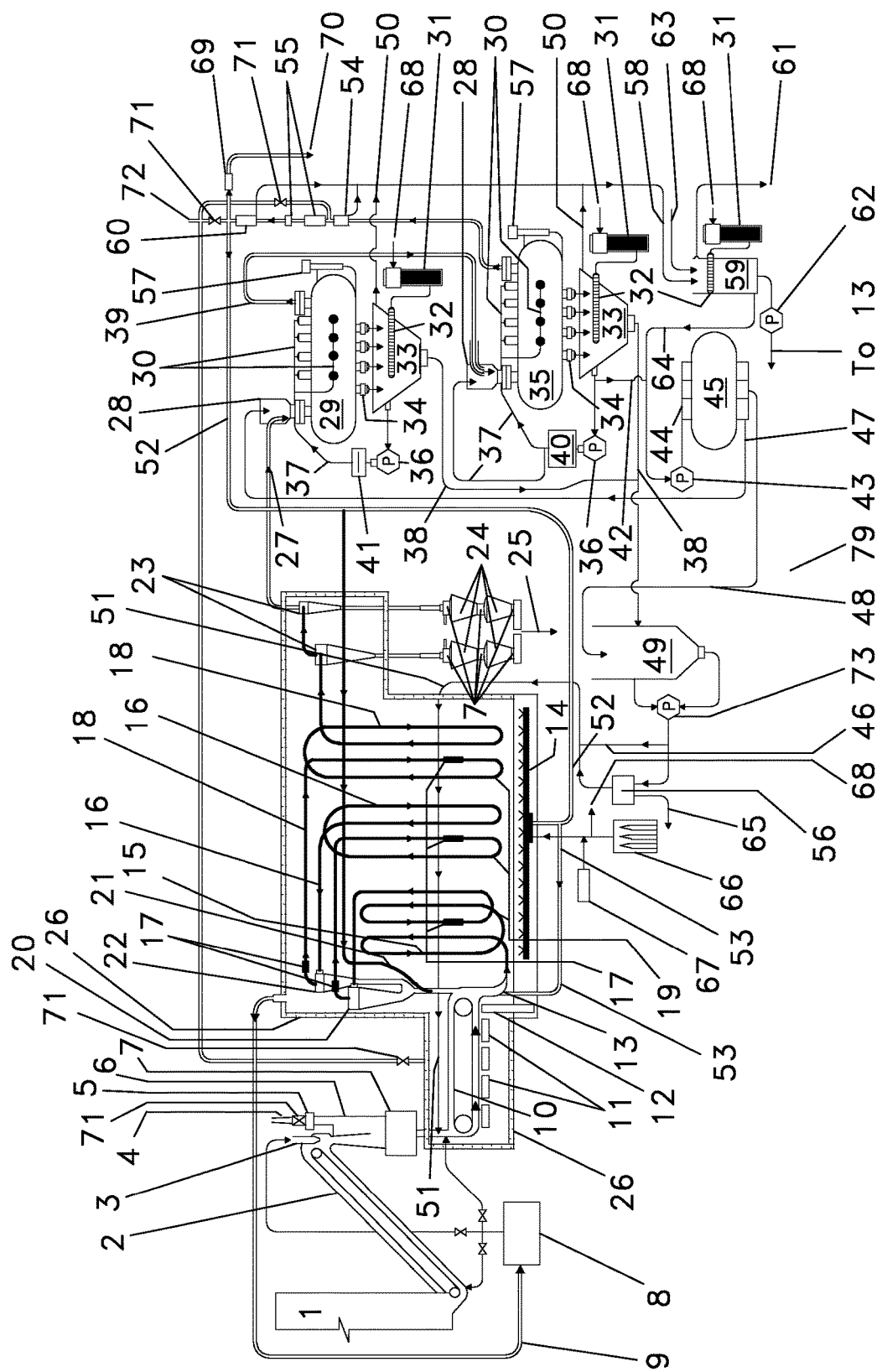
FIG. 2 is a conceptual view of a gasifier process flow path without delimited functional areas in one embodiment.

Utilization of a venturi injector (17) (FIGS. 1; 2; 8; 9; 14) may be provided at any suitable location or locations of a gasifier process flow path to regulate flow rates or characteristics, perhaps such as shown for some embodiments in FIGS. 2; 8; 9; 14. These may be connected with one unit per each of the reformation coils of a multiple coil carbonaceous reformation vessel, as perhaps may be installed in a downward process flow side of each reformation coil, or in other gasifier process flow path control locations. Alternate venturi injector positions perhaps may be provided as additional dynamically adjustable process determinative parameters. The position of the venturi injectors may be altered to provide additional high levels of process flow efficiencies, such as perhaps when venturi injectors (17) may be connected one each on the outlet side of each of the cyclones (20) (FIG. 1; 2; 14). The dynamically adjustable process determinative parameters that may define the specific, and perhaps optimal, number of venturi injectors (17), and that may be installed within the overall length of a reformation coil-cyclone closed process loop, may also be a function of identifying the available energy and carbon content of the input feedstock solids carbonaceous material. In some embodiments, for example, it may be that no more than four venturi injectors (17) may need to be installed, perhaps because total pressure drop, or head losses, may increase proportionally. A reformation coil near minimum pressure of 80 psi to 100 psi, along with a high velocity operating throughput process flow, of perhaps a minimum velocity of about 5,000 feet per minute through the entire reformation coil-cyclone assembly, perhaps may need to be maintained, as the pressure to velocity ratio may represent an operational control variable in some embodiments. The exact configuration and number of installed venturi injectors (17) perhaps may be determined accordingly, so that the reformation coil pressure and process flow velocities perhaps may be constantly maintained at a desired level.

In some embodiments, a venturi injector (17) may include an injection port, through which the provision of side-stream negatively electrostatically enhanced water species injection, such as perhaps hydrogen peroxide saturated water, may induce an excited steam state reaction activity perhaps throughout the length of the reformation coils of a multiple coil carbonaceous reformation vessel. It perhaps may also thereby accelerate carbon dioxide destruction reactions and perhaps may even substantially increase carbon monoxide and hydrogen generation. This may be understood by the reaction equation sequence shown for example in FIG. 25.

Figure 25:
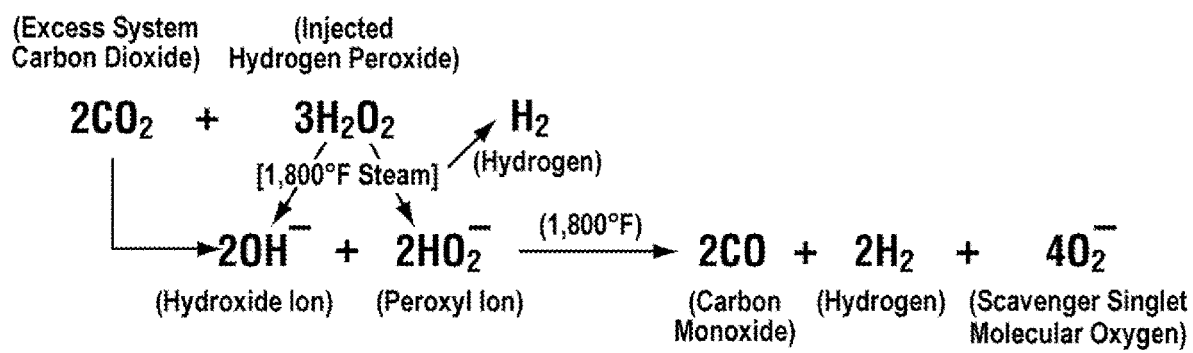
FIG. 25 is an exemplary chemical reaction sequence for negatively electrostatically enhanced water species injection in one exemplary embodiment.

The scientific basis for this $CO_2$ depletion, as may occur within the gasifier process flow routed through the reformation coils of a multiple coil carbonaceous reformation vessel, may be contingent upon the generation of singlet molecular oxygen (Of), such as might be produced for combination with water to produce a negatively electrostatically enhanced water species, such as hydrogen peroxide saturated water. This may be as shown in FIG. 25. When singlet oxygen, perhaps peroxide saturated water, may be injected into the reformation coils (19) (FIGS. 1; 2; 3; 4; 14) of a multiple coil carbonaceous reformation vessel, it may convert to a released and perhaps excited state $HO_2^-$ peroxyl ion, which may react with the gasifier process flow stream. Embodiments may similarly produce a $HO_2^-$ vapor ion, and this may be similarly injected into the reformation process.

In certain embodiments, flow through three or four connected venturi injectors (17) (FIGS. 1; 2; 8; 9; 14) may range at a pressure from between about 80 psi to about 100 psi, and the pressure may be maintained throughout areas such as the reformation coils of a multiple coil carbonaceous reformation vessel (19) (FIGS. 1; 2; 3; 4; 14), perhaps through associated connected cyclones such as cyclones (20), (22), and (23) respectively (FIGS. 1; 2; 3; 4; 14). In embodiments, this pressure may perhaps overcome the total accumulated back-pressure or the sum of the head losses within a multiple coil carbonaceous reformation vessel, or perhaps be able to sustain higher and perhaps optimum gasifier process velocities such as not less than about 5,000 feet per minute throughout the vessel. Perhaps even at, or above, an appropriate velocity, high energy Reynolds Numbers of 20,000+ may be achieved to perhaps ensure that tars, phenols, hydrocarbons and other debris inorganics or particulates may not plate-out or begin to agglomerate within the reformation coil components. Carbonaceous materials, perhaps particulates or atomized char organic particles, may also thoroughly react in the gasifier process flow, as perhaps with high pressure steam generated such as within the reformation coils, perhaps with water carry-through or perhaps a negatively electrostatically enhanced water species being the source for the steam. Embodiments may also produce highly efficient carbon shift and conversion reactions. In embodiments, total reformation time within a multiple coil carbonaceous reformation vessel, perhaps including cyclone retention times, may be engineered to be process maintained, perhaps even in the 4 second to 10 second range, and perhaps as dependent upon the daily tonnage of raw feedstock solids carbonaceous materials throughput that may be desired. Computerized automation, perhaps coupled with continuous read mass spectrometer and gas chromatograph online instrumentation, may be included to provide control functions that may readily determine dynamic adjustments to perhaps optimize process determinative parameters, perhaps such as process flow velocities, process flow pressures, and/or perhaps Reynolds Number operational set-points. This control procedure perhaps may ensure that clean select product gas, perhaps with minimal $CO_2$ and hydrocarbon residual contamination, may be produced at high BTU energy value. Controlled molar ratios of select product gas components, for example such as at least 1:1 molar ratios of carbon monoxide to hydrogen and perhaps up to approximately 20:1 molar ratios of carbon monoxide to hydrogen, may be produced in the select product gas and perhaps may be consistently held, perhaps with fractional or even no substantial carbon dioxide content, nitrogen oxide content, or sulfur oxide content contaminants present in the generated select product gas.

Using the principles described herein, embodiments may involve creating a high energy content select product gas. For example, creating such a high energy content select product gas may involve increasing its BTU value. Processing steps tending to increase BTU value may be employed, perhaps in a manner to create a higher BTU value select product gas as compared to processing steps using conventional gasification techniques. Accordingly, embodiments may involve the production of a select product gas having a BTU value of at least 250 BTU per standard cubic foot, having a BTU value from about 250 BTU per standard cubic foot to about 750 BTU per standard cubic foot, having a BTU value from about 350 BTU per standard cubic foot to about 750 BTU per standard cubic foot, having a BTU value from about 450 BTU per standard cubic foot to about 750 BTU per standard cubic foot, having a BTU value from about 550 BTU per standard cubic foot to about 750 BTU per standard cubic foot, and having a BTU value from about 650 BTU per standard cubic foot to about 750 BTU per standard cubic foot. In various embodiments, varied inputs of feedstock solids carbonaceous materials may nevertheless result in consistent BTU values for produced select product gas, with perhaps the amount of produced select product gas varying in quantity proportion to the BTU value of the input feedstock carbonaceous material.

Moreover, creating a high energy content select product gas may involve increasing the purity of a select product gas. Again, processing steps tending to increase purity may be employed, perhaps in a manner to increase purity as compared to processing steps using conventional gasification techniques. Purifying a select product gas may involve, for example, isolating or perhaps removing one or more contaminants. For example, purifying a select product gas in various embodiments may involve minimizing nitrogen oxide content of a select product gas, minimizing silicon oxide content of a select product gas, minimizing carbon dioxide content of a select product gas, minimizing sulfur content of a select product gas, minimizing organic vapor content of a select product gas, and minimizing metal content of a select product gas.

The processing steps used to create a high energy content select product gas may be as have been described herein, and for example may include but may not be limited to processing with a negatively electrostatically enhanced water species, processing with a recycled select product gas, processing with negatively electrostatically enhanced steam, processing with a flue gas, varying a process retention time, processing in at least a preliminary reformation coil and a secondary reformation coil, recycling an incompletely pyrolytically decomposed carbonaceous material, and recycling an incompletely reformed carbonaceous material.

Also using the principles described herein, embodiments may involve predetermining a desired select product gas for output. Such predetermining may involve consistently outputting a desired predetermined select product gas from varied input feedstock solids carbonaceous materials, as perhaps wherein one or more processing stages within a solid carbonaceous materials gasifier system may compensate for variations among input feedstock solids carbonaceous materials. For example, predetermining in various embodiments may involve affirmatively establishing a stoichiometrically objectivistic chemic environment, stoichiometrically controlling carbon content, dynamically adjusting at least one process determinative parameter within a solid carbonaceous materials gasifier system, or the like. Such adjustments perhaps may confer a high degree of control over the characteristics of a predetermined select product gas. For example, a predetermined select product gas in various embodiments may include a variable carbon monoxide content select product gas, a primarily carbon monoxide select product gas, a variable hydrogen content select product gas, a primarily hydrogen gas select product gas, a variable methane content select product gas, a primarily methane select product gas, a select product gas of primarily carbon monoxide and hydrogen gas and methane, a controlled molar ratio select product gas, a controlled molar ratio select product gas having a hydrogen gas to carbon monoxide molar ratio of from 1:1 up to 20:1 by volume, a controlled molar ratio select product gas having a hydrogen gas to carbon monoxide molar ratio of at least about 1:1, a controlled molar ratio select product gas having a hydrogen gas to carbon monoxide molar ratio of at least about 2:1, a controlled molar ratio select product gas having a hydrogen gas to carbon monoxide molar ratio of at least about 3:1, a controlled molar ratio select product gas having a hydrogen gas to carbon monoxide molar ratio of at least about 5:1, a controlled molar ratio select product gas having a hydrogen gas to carbon monoxide molar ratio of at least about 10:1, a controlled molar ratio select product gas having a hydrogen gas to carbon monoxide molar ratio from at least about 1:1 to about 20:1, a controlled molar ratio select product gas having a hydrogen gas to carbon monoxide molar ratio from at least about 2:1 to about 20:1, a controlled molar ratio select product gas having a hydrogen gas to carbon monoxide molar ratio from at least about 3:1 to about 20:1, a controlled molar ratio select product gas having a hydrogen gas to carbon monoxide molar ratio from at least about 5:1 to about 20:1, a controlled molar ratio select product gas having a hydrogen gas to carbon monoxide molar ratio from at least about 10:1 to about 20:1, a producer gas, and a synthesis gas. Moreover, a select product gas in various embodiments may include a base stock, as wherein the produced select product gas may be used as a basis for post-gasifier system applications, for example as stock for the production of additional substances. Accordingly, a select product gas in various embodiments perhaps may include a variable chemistry base stock, a liquid fuel base stock, a methanol base stock, an ethanol base stock, a refinery diesel base stock, a biodiesel base stock, a dimethylether base stock, a mixed alcohols base stock, an electric power generation base stock, or a natural gas equivalent energy value base stock.

Further using the principles described herein, embodiments may involve producing a high yield select product gas, perhaps even exceeding a typical yield of conventional gasification processes for produced select product gas from a given input feedstock solids carbonaceous material. For example, such high yields may involve converting greater than about 95% of the feedstock mass of a feedstock solids carbonaceous material to select product gas, converting greater than about 97% of the feedstock mass of a feedstock solids carbonaceous material to select product gas, converting greater than about 98% of the feedstock mass of a feedstock solids carbonaceous material to select product gas, outputting at least about 30,000 standard cubic feet of select product gas per ton of feedstock solids carbonaceous material, or perhaps achieving a carbon conversion efficiency of between 75% and 95% of carbon content in a feedstock solids carbonaceous material converted to select product gas. Moreover, a high yield in certain embodiments may involve substantially exhausting a carbon content of an input feedstock solids carbonaceous material.

In some embodiments, the inventive technology described herein perhaps may be configured in a modular and compact form, perhaps that may provide an autonomous and uncomplicated select product gas generation technology that may allow for selected conditions operational capability and that may produce a very high purity and high energy select product gas from a variety of input feedstock solids carbonaceous materials, perhaps even virtually any type of organic biomass, coal input or other carbonaceous raw material. Of course, such modularity merely may be one aspect of the inventive technology, and should not be construed to limit the inventive technology only to modular embodiments. Predetermined adjustments in operating process retention times, gas velocity pressures, negatively electrostatically enhanced water species injection control rates, recycled select product gas injection parameters, and flue gas injection parameters may be included to further provide for the generated select product gas final output chemistry to be tuned, for example perhaps as may be related to producing large, perhaps uncontaminated volumes of secondary off-take commodities, such as liquid fuels, electricity generation, hydrogen gas, and the like. Set-point operational parameters may be included, such as progressive control of devolatilization temperature, adjustable gas velocity and reaction time, variable water, perhaps steam, negative electrostatic enhancement chemistry additions, or basic steam reformation operational energy balance capabilities. Environmental beyond-compliance discharge or perhaps even zero discharge may be maintained in some embodiments, perhaps with exhaust flue gases being internally recycled. In embodiments, a negatively electrostatically enhanced water species treatment system may be included to provide the possibility for a high percentage, or perhaps even 100%, recycle and reuse of highly purified water to be constantly returned back into the process. In embodiments, small volumes of process residual or system drain excess water may be relatively pure and perhaps may be flash evaporated with application of system excess heat, with perhaps no discharge to the environment. Further, applied negatively electrostatically enhanced water processes may be included perhaps to scrub and purify flue gas exhaust trace releases, including if and when applicable to meet relevant air quality emission control regulations. Embodiments even may provide one overall low maintenance and simple operation system design that may be economically feasible for a variety of given applications.

Some embodiments perhaps may provide an entrained flow select product gas generation system. In some embodiments, process parameters may allow many available and various kinds of carbonaceous wastes or commercial feedstock materials, such as wood waste, garbage, sewage solids, manure, agricultural or other environmental biomass, shredded rubber tires, coal, and the like, perhaps all to be processed perhaps through one basic platform design. In embodiments, energy may be released and recovered as a produced select product gas, perhaps containing high combustion ratios of adjustable content CO and $H_2$, perhaps along with secondary by-product generation of water, carbon dioxide, and light hydrocarbons that perhaps may be laced with volatile, but perhaps condensable, organic and inorganic additional, perhaps contaminant, compounds. Impurities perhaps may be removed within a secondary negative electrostatically enhanced water species scrubber section as well.

As an alternate to using coal as a commercially available feedstock material (e.g., a feedstock perhaps with consistent carbon conversion content), there may be a variety of non-coal biomass resources available, perhaps being widely and demographically dispersed. These may vary greatly in their heterogeneous chemical characteristics makeup. Embodiments of the inventive technology may provide a system application for an adjustable broad spectrum, perhaps even near universal select product gas generation process control design, and may further provide a perhaps operational, perhaps economic, perhaps efficient system that perhaps may be completely capable of processing nearly any type of input carbonaceous feedstock and generating high energy select product gas output. Embodiments of the inventive technology also may be capable of availability throughout the world marketplace, and may provide alternative select product gas availability to the world marketplace.

FIGS. 18 through 22 show a portable or "pod" embodiment of the invention. As can be understood from the FIG. 18, this embodiment may include a pod or isolated reactor unit (211). This isolated reactor unit (211) may be surrounded by a refractory area (212). The refractory area (212) may include a sealed refractory shroud (213). A feed (214) may provide material to the isolated reactor unit (211) as shown. The material may then be acted upon in an upper pyrolysis deck (215) and perhaps subsequently a lower steam reformation deck (220). Each of these decks may actually be rotating carousel decks (216). These rotating carousel decks (216), may be aligned with a carousel drive shaft (217), which may be supported by an upper bearing support (218) and perhaps a bottom oil seal pivot bearing (219). The entire isolated reactor unit (211) may be surrounded at least partially by a flue gas chamber (221). For reasons discussed earlier, ionized water nozzles or injectors (222) may be included as well. Spend material may fall into an ash drop (223), which may pass through an air lock valve (224), an ash auger (226), and ultimately into an ash collection bin (227). The system may be driven by a gearbox drive (225).

To provide the input feed, and embodiment may include a feed section (229). The feed section (229) may provide material from a bunker pin or the like. Perhaps through multiple venturi injectors (228) that each permit an adequate amount of pressure increase. The feed section (229) may be surrounded by a gas shroud chamber (230). This gas shroud chamber (230), allows passage of flue or product gas, which may permit pre-heating a feedstock material. As shown, material may pass into a feed plenum (231), which may act as a separator (232) to separate a motive agent such as a gas or the like from the feed material. The feed plenum (231), may have an access (233) through which a motive agent or the like may pass in or out. As may be understood, in an instance where the motive agent is an agent such as flue gas, the excess gas may pass out of the access (233) and return to the system for recycling or reuse. Similarly, the system may include a shroud flue gas output (235), which may permit flue gas output shroud gas for return to the system or the like. This return may have various input locations, such as the venturi injectors or other locations.

Further, the "pod" embodiment shown may include a raw feedstock input (237) such as from a feedstock bin or the like. This feedstock input (237) can accept an external source of material for appropriate processing.

Figure 21:
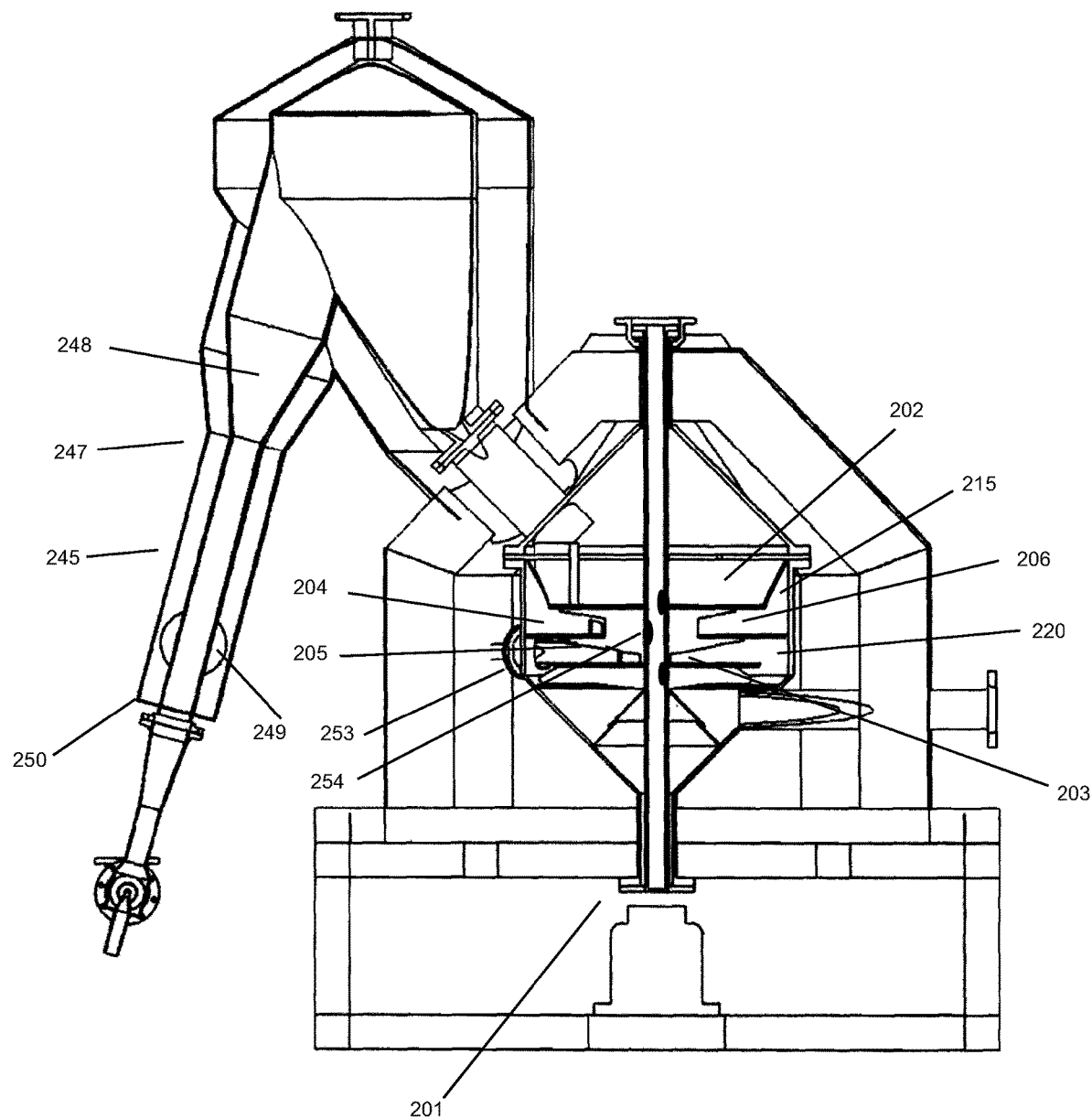
FIG. 21 is a cross-section view of a reactor portion of a "pod" embodiment of the present inventive technology.

FIG. 21 shows a similar system in a more generic understanding. As one way providing compact processing, operations may include mechanically propelling at least one carbonaceous materials pyrolysis decomposition platform. This carbonaceous materials pyrolysis decomposition platform such as the upper pyrolysis deck (215). Operations may also include mechanically propelling at least one pyrolytically decomposed carbonaceous materials processor platform such as the lower steam reformation deck (220). These may be propelled by a mechanical gasifier drive system (201). In fact both the decks may be platforms and thus the system may include a mechanically propelled carbonaceous materials pyrolysis decomposition platform (202) and a mechanically propelled pyrolytically decomposed carbonaceous materials processor platform (203). In this fashion the system can be considered as having a plurality of environment differentiated mechanically propelled pyrolytically decomposed carbonaceous materials processor platforms.

It should be understood that the type of mechanical propulsion used can vary. In one embodiment, the system may include rotating platforms. As shown, there may be a rotating pyrolytically decomposed carbonaceous materials processor platform such as the upper pyrolysis deck (215), and a rotating a carbonaceous materials pyrolysis decomposition platform, such as the lower steam reformation deck (220). As may be understood, it may be advantageous for embodiments to have the rotations be horizontal rotations, that is, in a perpendicular to gravity. In addition, it may be advantageous to coordinate the rotation are other movements involved. In this way, the system may involve coordinated movement platforms or coordinatively mechanically propelling items for appropriate processing. These coordinated movements may be synchronous and may even be driven by a single drive. Thus, the system may include synchronous duality of movement platforms, driven by a single mechanical gasifier drive system. As can be appreciated, by singularly driving both platforms, only one drive system may be necessary. In addition, the platforms may rotate at identical rates for one type of coordinated processing.

Processed material may be subjected to different environments as it sequences through the reactor. These environments may be differentiated by any number of variables. As but some examples, the environments may be differentiated by process factor variable such as: a process material size factor, a process temperature factor, a process duration factor, a differentiated environment factor, a reactor electrostatic steam factor, a chemic environment factor, a water environment factor, a negative electrostatic charge water environment factor, a differentiated carbon content factor, a differentiated oxygen content factor, a differentiated flue gas content factor, a differentiated product gas factor, a recycled process material factor, among others. The platforms and even the generic processor can sequence and have different components as well. Processors may be: a variable temperature zone carbonaceous feedstock processor, a carbonaceous feedstock processor configured to establish a temperature from 125 degrees Fahrenheit to 135 degrees Fahrenheit, a carbonaceous feedstock processor configured to establish a temperature from 135 degrees Fahrenheit to 300 degrees Fahrenheit, a carbonaceous feedstock processor configured to establish a temperature from 300 degrees Fahrenheit to 1,000 degrees Fahrenheit, a carbonaceous feedstock processor configured to establish a temperature from 1,000 degrees Fahrenheit to 1,640 degrees Fahrenheit, and a carbonaceous feedstock processor configured to establish a temperature from 1,640 degrees Fahrenheit to 1,850 degrees Fahrenheit.

In one embodiment, the invention may include carousel platforms that may even simply rotate about a horizontal axis. Thus, the system may involve mechanically propelling a carbonaceous materials pyrolysis carousel, and even mechanically propelling a pyrolytically decomposed carbonaceous materials processor carousel. By configuring the carousels or carousel platforms at different levels, the system may include a tiered carousel (204). That tiered carousel (204), may involve carousel tiered platforms as shown. It may also involve coaxial and perhaps even vertical tiering. Thus there may be a coaxial carousel tiered drive system that acts to mechanically propel a tiered carousel and shown.

An important part of sequentially processing material can include transferring the material between different environments. This can occur through a process transfer that moves processed material between different environments. In the embodiment shown, this process transfer can include one or more fixed decomposed carbonaceous materials scrapers (206), as well as one or more dispersionary freefall transfers (205). By the dispersionary freefall transfer (205) material may gravimetrically fall from one level to the next. This can promote mixing and more complete processing. Thus, as carousel platforms rotate, the material on the platforms may be subjected to fixed element scraping, which can push the material off of the platform and cause it to fall onto the next processing platform.

In each of the reactor sections, it should be understood that additional platforms can be provided. For example, there can be a plurality of interstitial output coordinated platforms. More than one platform can be used in the pyrolysis processes such as so that the material is adequately decomposed or the like. Both the pyrolysis and reformation functions can have multiple platforms. For instance, as shown it can be understood that the system may include first and second pyrolysis environment process platforms, as well as first and second carbonaceous reformation environment process platforms. Each of these may include differentiated status such as differentiated pyrolytically decomposing, as well as differentiated reformation steps.

Figure 18:
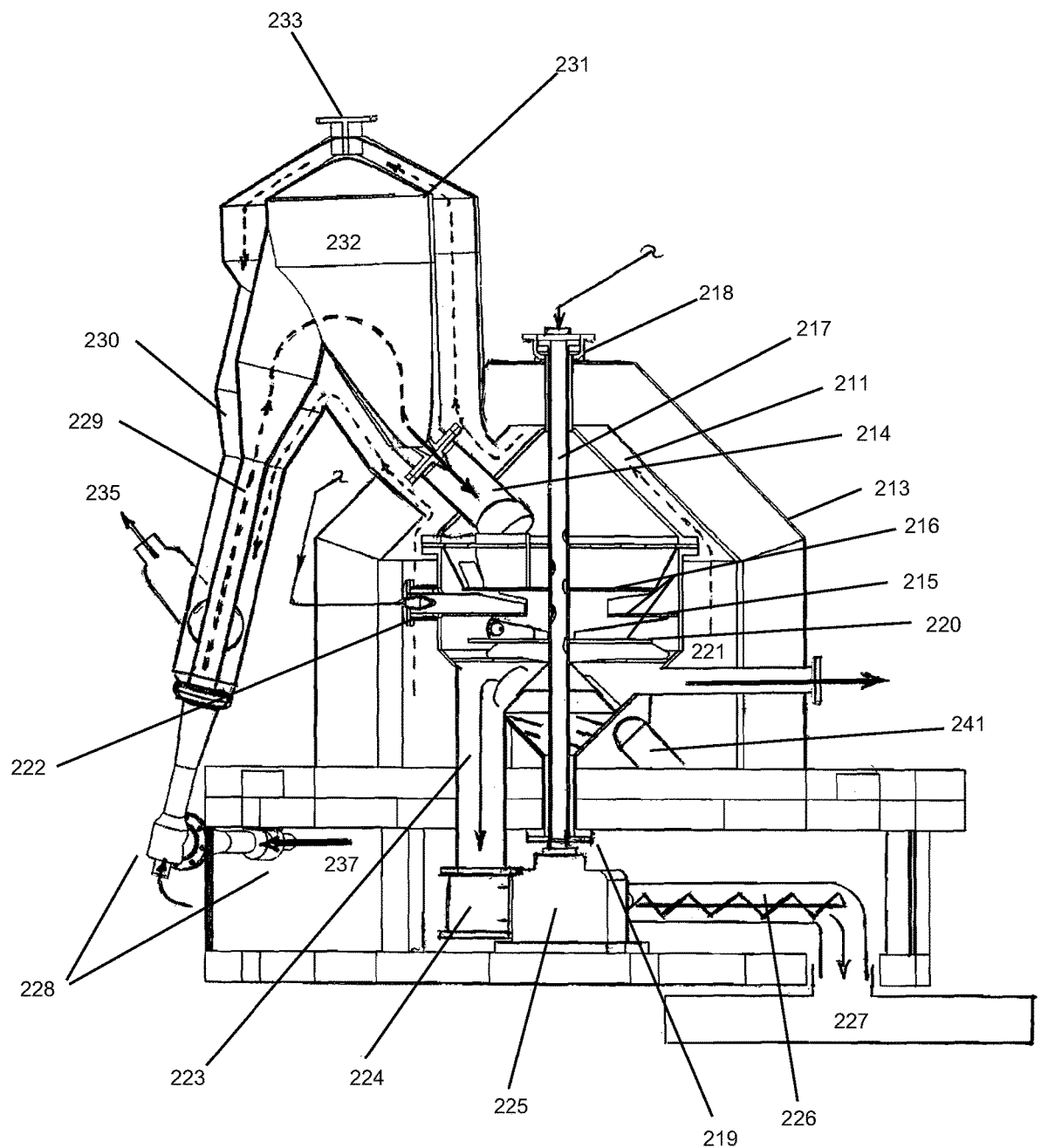
FIG. 18 is a cross section view of a "pod" embodiment of the present inventive technology.

As can be understood from the figures, the "pod" concept can permit many advantages. As shown in FIGS. 18 and 21 and discussed later, systems may be portable. In addition, environmental safety can be promoted by entirely encasing aspects of the system. Thus, by substantially sealingly wholly containing the reactor or the like, a more safe system can be provided. As shown, the sealed refractory shroud (213) may be configured to circumscribe and create a substantially sealed process chamber and a sealed burner chamber (241). Thus there can be a substantially wholly contained gasifier. This encasement may have thermal advantages and may be a substantially sealed circumscribing heat shield encasement that thermally encases aspects of the system. The sealed refractory shroud (213) and other components may create a thermal circumscribing heat shield encasement. This may surround the chamber, the platforms, the reactors, and the like. Operations performs may even include: sealably encased mechanically propelling, sealably encased pyrolytically decomposing, sealably encased carbonaceous reforming, encased processing, encased generating, encased recycling, and even generating a flue gas within an encased gasifier system, as but a few.

Figure 22:
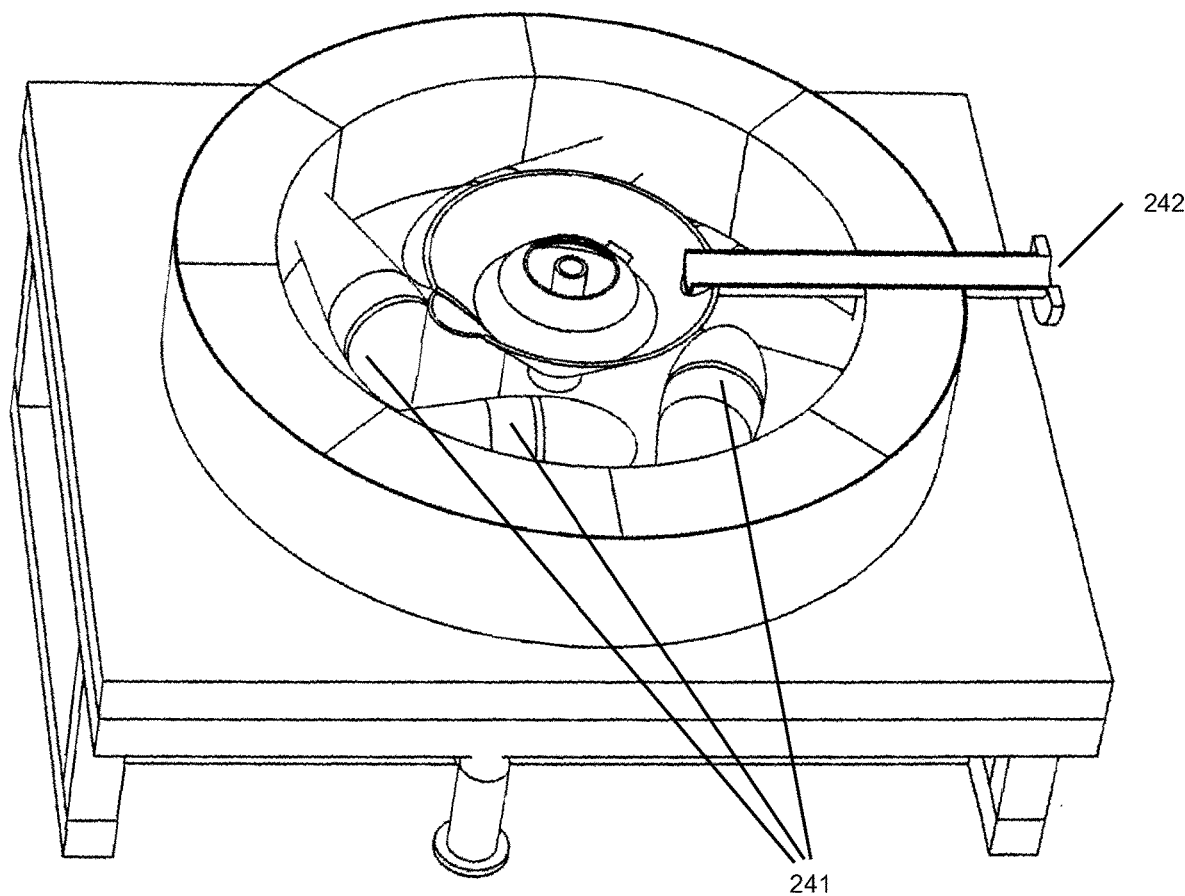
FIG. 22 is a perspective view of a lower portion of a "pod" embodiment of the present inventive technology.

FIG. 22 shows a lower portion of a "pod" embodiment of the present invention. This may include a product synthesis gas combustion bottom burner (241) so that he increasing temperature is provided at a bottom location. This may aid in effecting a tiered heat distribution, where there is increasing temperature at lower levels. This can work in conjunction with the fact that processed material sequentially falls from one carousel to another and thus is sequentially treated to increasing temperatures.

In encased designs such as the "pod" system shown, the substantially sealed circumscribing heat shield encasement may have a variety of inputs and outputs (242). Among others, these may include a recirculatory water input (243) and a recirculatory water output (244) such as from and external, unencased, or perhaps even separate treatment system that operates for treating water, gas, material or the like. These systems may even be recirculatory and thus the system may operate for inputting recirculatory water and outputting recirculatory water from an encased environment. The outputs can be varied and may include: a negatively electrostatically enhanced water species processed select product gas output, a flue gas processed select product gas output, a varied retention time processed select product gas output, a select product gas processed in at least a preliminary reformation coil and a secondary reformation coil output, a select product gas processed with a recycled incompletely pyrolytically decomposed carbonaceous material output, and a select product gas processed with a recycled incompletely reformed carbonaceous material output, among others.

The input can also have ferried configurations. As shown, one type of input can include a pneumatic propellant system (245). This could use flue gas and be a flue gas propellant system, synthesis gas and be a product synthesis gas propellant system. As such either flue gas or synthesis gas might be used for propelling materials such as feedstock solids into the reactor environments. Thus the system may have a pneumatically propelled feedstock solids carbonaceous material input that may even pneumatically propel solids up into an areas such as the feed plenum. By pneumatically propelling the feedstock, the input may act as a dispersionary feedstock solids carbonaceous material input (237) that disperses a feedstock. It may also subject it to a gas, such as for oxygen depletion, pre-heating, or the like.

As shown by running the materials up an incline, the system may include an accretive feedstock energy system (245) through which the system may operate for feedstock energy accretively propelling of the feedstock. Thus the feedstock has higher energy (potential or kinetic) after input. This system may also be an accretive feedstock potential energy input system (248) that causes an increase in the potential energy so that the feedstock can fall down from one platform to another by gravity without needing additional energy or drive mechanisms. The embodiment shown involves an inclined feedstock solids carbonaceous material input (249) that drives the feedstock solids carbonaceous material up an incline. This incline may even be vertical if desired such as for space saving reasons or the like.

In the embodiment shown, the input is shown as a coaxial feed system (250). This type of the system can operate for coaxially feeding and coaxially propelling a feedstock in one path and something else in a perhaps surrounding path. In one embodiment in this may involve outer coaxially feeding a flue gas and inner coaxially feeding a feedstock solids. These may even be established in opposite coaxial flows so that one flows up and the other down, or one flows left and the other right. As shown there may be an inner feedstock pathway and an outer flue gas pathway. These two opposite flow direction pathways may serve to put feedstock in and to exit flue gas or the like. While at the same time pre-heating the material and providing a feedstock coaxial pre-heater system (250) that may precondition it for ultimate processing. In order to permit the pressure differential required from a feedstock, due to the higher pressure processing reactor, the system may include one or more continuous feed, pressure differential venturi injectors.

Figure 19:
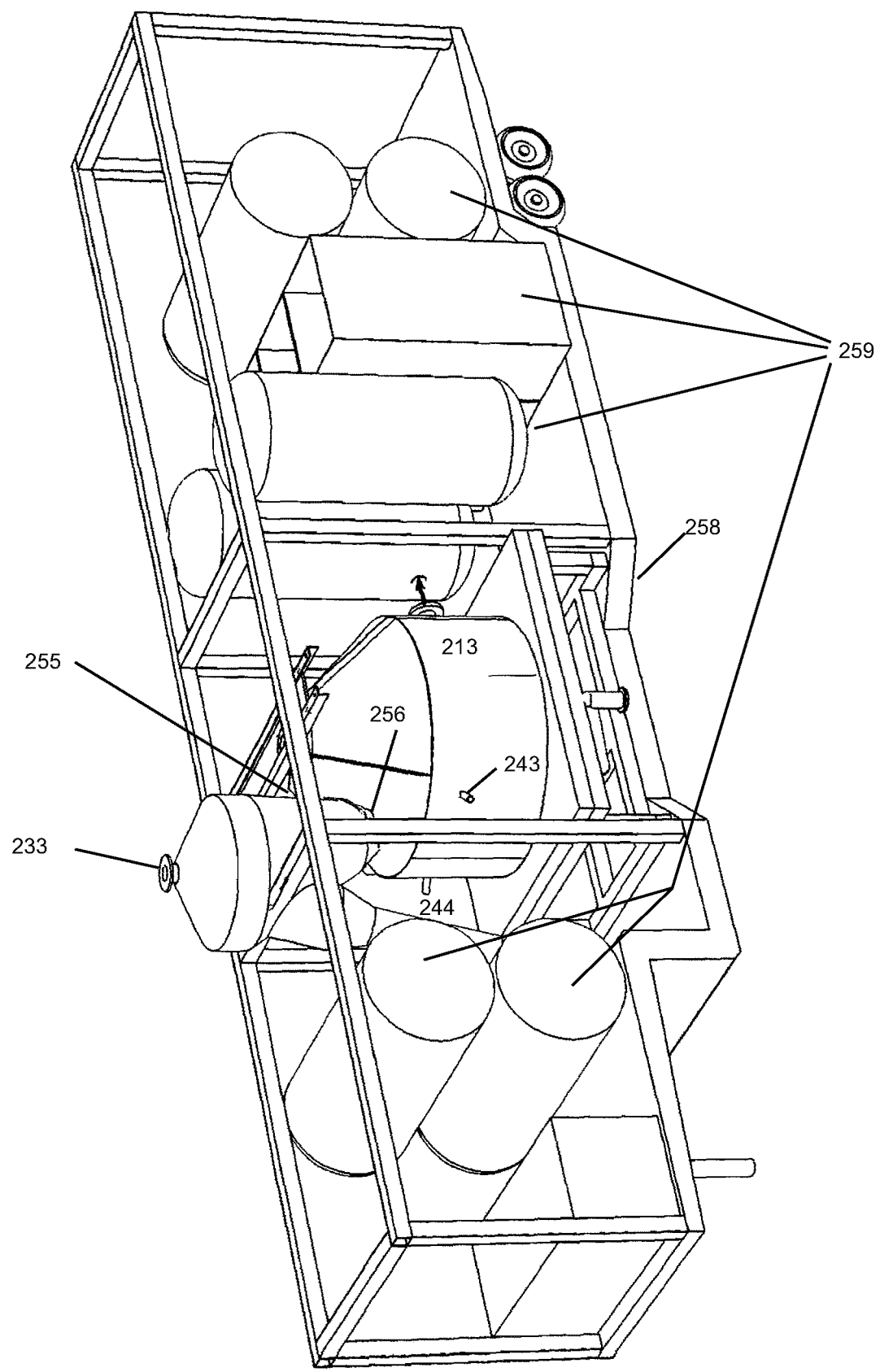
FIG. 19 is a perspective view of a trailerable embodiment of the present inventive technology.
Figure 20:
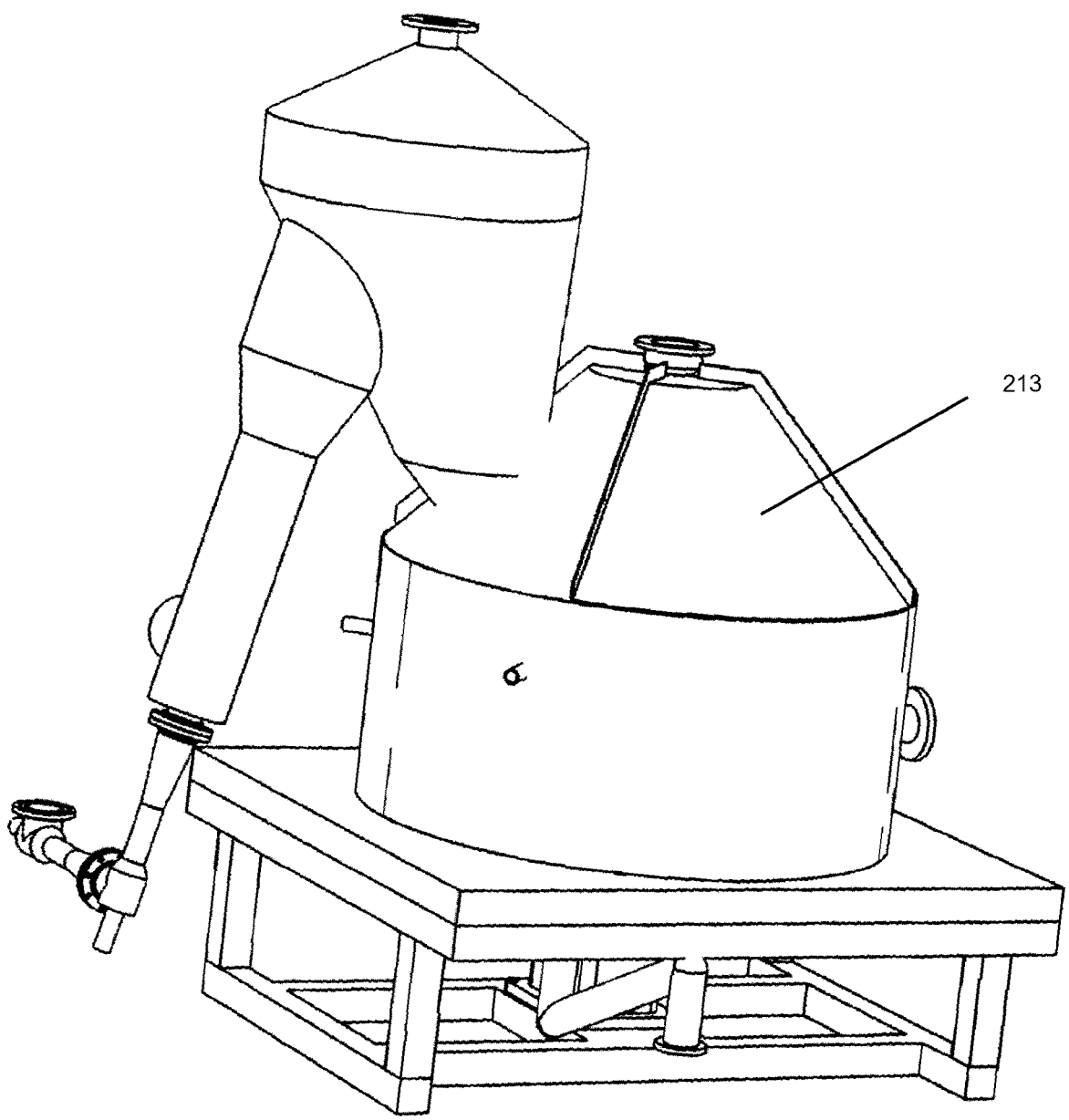
FIG. 20 is a perspective view of a portion of a "pod" embodiment of the present inventive technology.

As mentioned earlier, it may be advantageous to utilize water, and perhaps even negative electrostatically enhanced water for processing. This may be through use of a recirculatory negatively electrostatically enhanced water species treatment system (259). There may be one or more negatively electrostatically enhanced water species injectors perhaps positioned adjacent at least one of the platforms so that the water or steam can appear in the process at the desired location. These injectors may even be sidewall negative electrostatically enhanced water species injectors (253) that are positioned along the sidewall such as that one carousel location. This sidewall may be an inner or outer sidewall. There may even be one or more driveshaft negative electrostatically enhanced water species injectors (254) that act to disburse water or steam from in the vicinity of the driveshaft. This can aid in providing steam at the inner and outer locations of the carousel environment. As shown in FIG. 11, the entire water treatment process can be accomplished external to the encased area. There may even be at a trailer adjacent recirculatory negatively electrostatically enhanced water species treatment system (259) that would transport FIG. 11 water treatment system. It should be understood that although this is shown as attached on one trailer, such a system can be entirely separate and perhaps even on a separate trailer or otherwise. As such an embodiment could present a separately portable recirculatory negatively electrostatically enhanced water species treatment system. There could also be an adjacent treatment system such as shown in FIG. 19 where the water treatment components are adjacent the processor and may be on one or either side.

As may be appreciated, it may be desirable to make a portable or at least movable system. This could be configured such as on a trailer base (258). In order to permit transportation of the largest possible system, designed include a disabling collapse element (255). Such an element could fold-down, detach, or separate elements or components to permit transporting the entire system. Embodiments may permit compactly transportive collapsing parts of the system and perhaps even collectively moving a substantial portion of the gasifier system. Once moved the collapsed portions may be reassembled thus re-establishing the system in an operative state. Various portions can be made collapsible. These could include: a repositionable carbonaceous feedstock input, a detachable carbonaceous feedstock input, a separable carbonaceous feedstock input, a collapsible inclined carbonaceous feedstock input, a collapsible inclined carbonaceous feedstock input, a collapsible feed plenum, and the like. As shown, one aspect that can facilitate as compacted design is possible, may include having an off center feedstock solids carbonaceous material input (256). Collapsing the system can include collapsing at least a potion of a recirculatory water system. This may occur by repositioning at least one water tank, by detaching at least a portion of a recirculatory system, by separating, collapsing, or otherwise reducing in size aspects of the water system.

Of course, it may be desirable to transport the system. This may occur on a trailer or perhaps even on a low center section trailer (258). Thus as shown, the processor may be positioned at least partially in a low center section of a trailer base. The entire system could be on one or more trailers. As shown a particularly compact system is configured to be put entirely on a single road transportable trailer. Thus an extremity of system on the trailer base may be collapsed to reduce at least one operable condition external dimension for transport. In this manner the system may be sized from both the perspectives of providing a large or a small system. These designs can be configured to be sized for process rates such as: at least about 25 tons per day, at least about 50 tons per day, at least about 100 tons per day, at least about 150 tons per day, at least about 200 tons per day, and at least about 250 tons per day up to about 500 tons per day.

As may be easily understood from the foregoing, the basic concepts of the present inventive technology may be embodied in a variety of ways. It may involve both select product gas generation techniques as well as devices to accomplish the appropriate select product gas generation. In this application, the select product gas generation techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this patent application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Apparatus claims may not only be included for the device described, but also method or process claims may be included to address the functions the invention and each element performs. Neither the description nor the terminology is intended to limit the scope of the claims that will be included in any subsequent patent application.

It should also be understood that a variety of changes may be made without departing from the essence of the inventive technology. Such changes are also implicitly included in the description. They still fall within the scope of this inventive technology. A broad disclosure encompassing both the explicit embodiment(s) shown, the great variety of implicit alternative embodiments, and the broad methods or processes and the like are encompassed by this disclosure and may be relied upon when drafting the claims for any subsequent patent application. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of the invention both independently and as an overall system.

Further, each of the various elements of the inventive technology and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the inventive technology, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this inventive technology is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "filter" should be understood to encompass disclosure of the act of "filtering"—whether explicitly discussed or not—and, conversely, were there effectively disclosure of the act of "filtering", such a disclosure should be understood to encompass disclosure of a "filter" and even a "means for filtering". Such changes and alternative terms are to be understood to be explicitly included in the description.

Any patents, publications, or other references mentioned in this application for patent are hereby incorporated by reference. Any priority case(s) claimed by this application is hereby appended and hereby incorporated by reference. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated by reference. Finally, all references listed in the following are hereby appended and hereby incorporated by reference, however, as to each of the above, to the extent that such information or statements incorporated by reference might be considered inconsistent with the patenting of this/these inventive technology such statements are expressly not to be considered as made by the applicant(s).

Thus, the applicant(s) should be understood to have support to claim and make a statement of invention to at least: i) each of the process devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) the various combinations and permutations of each of the elements disclosed, xii) each potentially dependent claim or concept as a dependency on each and every one of the independent claims or concepts presented, and xiii) all inventions described herein.

With regard to claims whether now or later presented for examination, it should be understood that for practical reasons and so as to avoid great expansion of the examination burden, the applicant may at any time present only initial claims or perhaps only initial claims with only initial dependencies. Support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible.

Finally, any claims set forth at any time are hereby incorporated by reference as part of this description of the inventive technology, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

What is claimed is:

1. A method for select synthesis gas generation from solid carbonaceous materials comprising the steps of:
    inputting a feedstock solids carbonaceous material to a coaxial feed system;
    pneumatically propelling said feedstock solids carbonaceous material in the coaxial feed system by outer coaxially feeding a flue gas or synthesis gas and inner coaxially feeding the feedstock solids carbonaceous material such that the feedstock solids carbonaceous material is pneumatically and accretively propelled up an incline to increase its potential energy;
    subjecting said feedstock solids carbonaceous material to a pressurized environment;
    increasing a temperature within said pressurized environment to which said feedstock solids carbonaceous material is subjected;
    processing said feedstock solids carbonaceous material in a gasifier system;
    generating at least some components of a select product gas in response to said step of processing; and
    outputting at least some select product gas from said gasifier system.

2. A method for select synthesis gas generation from solid carbonaceous materials as described in claim 1 wherein the step of processing said feedstock solids carbonaceous material in a gasifier system comprises the step of:
    pyrolytically decomposing said feedstock solids carbonaceous material to create pyrolytically decomposed carbonaceous material; and
    carbonaceously reforming said pyrolytically decomposed carbonaceous material.

3. A method for select synthesis gas generation from solid carbonaceous materials as described in claim 1 wherein the step of pneumatically propelling said feedstock solids carbonaceous material comprises the step of flue gas propelling said feedstock solids carbonaceous material for processing within said gasifier system.

4. A method for select synthesis gas generation from solid carbonaceous materials as described in claim 1 wherein the step of pneumatically propelling said feedstock solids carbonaceous material comprises the step of product synthesis gas propelling said feedstock solids carbonaceous material for processing within said gasifier system.

5. A method for select synthesis gas generation from solid carbonaceous materials as described in claim 1 wherein the step of inputting a feedstock solids carbonaceous material comprises the step of pre-heating said feedstock solids carbonaceous material prior to processing within said gasifier system.

6. A method for select synthesis gas generation from solid carbonaceous materials as described in claim 1 wherein said steps of coaxially feeding to input said feedstock solids carbonaceous material comprise the step of establishing opposite coaxial flows.

7. A method for select synthesis gas generation from solid carbonaceous materials comprising the steps of:
    inputting a feedstock solids carbonaceous material to a coaxial feed system;
    dispersively propelling said feedstock solids carbonaceous material in the coaxial feed system by outer coaxially feeding a flue gas or synthesis gas and inner coaxially feeding the feedstock solids carbonaceous material such that the feedstock solids carbonaceous material is dispersively and accretively propelled up an incline to increase its potential energy;
    subjecting said feedstock solids carbonaceous material to a pressurized environment;
    increasing a temperature within said pressurized environment to which said feedstock solids carbonaceous material is subjected;
    processing said feedstock solids carbonaceous material in a gasifier system;
    generating at least some components of a select product gas in response to said step of processing; and
    outputting at least some select product gas from said gasifier system.

8. A method for select synthesis gas generation from solid carbonaceous materials as described in claim 7 wherein the step of processing said feedstock solids carbonaceous material in a gasifier system comprises the step of:
    pyrolytically decomposing said feedstock solids carbonaceous material to create pyrolytically decomposed carbonaceous material; and
    carbonaceously reforming said pyrolytically decomposed carbonaceous material.

9. A method for select synthesis gas generation from solid carbonaceous materials as described in claim 7 wherein the step of dispersively propelling said feedstock solids carbonaceous material for processing within said gasifier system comprises the step of flue gas propelling said feedstock solids carbonaceous material for processing within said gasifier system.

10. A method for select synthesis gas generation from solid carbonaceous materials as described in claim 7 wherein the step of dispersively propelling said feedstock solids carbonaceous material for processing within said gasifier system comprises the step of product synthesis gas propelling said feedstock solids carbonaceous material for processing within said gasifier system.

11. A method for select synthesis gas generation from solid carbonaceous materials as described in claim 7 wherein the step of inputting a feedstock solids carbonaceous material comprises the step of pre-heating said feedstock solids carbonaceous material prior to processing within said gasifier system.

12. A method for select synthesis gas generation from solid carbonaceous materials as described in claim 7 wherein said steps of coaxially feeding to input said feedstock solids carbonaceous material comprise the step of establishing opposite coaxial flows.

\* \* \* \* \*